(12) United States Patent
Onoe

(10) Patent No.: US 9,653,107 B2
(45) Date of Patent: May 16, 2017

(54) HOLOGRAM RECORDING AND PLAYBACK DEVICE AND HOLOGRAM PLAYBACK METHOD

(71) Applicant: HITACHI CONSUMER ELECTRONICS CO., LTD., Yokohama-shi, Kanagawa (JP)

(72) Inventor: Shinsuke Onoe, Tokyo (JP)

(73) Assignee: HITACHI CONSUMER ELECTRONICS CO., LTD., Kanagawa (JP)

( * ) Notice: Subject to any disclaimer, the term of this patent is extended or adjusted under 35 U.S.C. 154(b) by 0 days.

(21) Appl. No.: 14/781,054

(22) PCT Filed: Apr. 8, 2013

(86) PCT No.: PCT/JP2013/060574
§ 371 (c)(1),
(2) Date: Sep. 29, 2015

(87) PCT Pub. No.: WO2014/167619
PCT Pub. Date: Oct. 16, 2014

(65) Prior Publication Data
US 2016/0042757 A1    Feb. 11, 2016

(51) Int. Cl.
*G11B 7/0065* (2006.01)
*G11B 7/08* (2006.01)
*G03H 1/22* (2006.01)
*G11B 7/085* (2006.01)
*G11B 19/20* (2006.01)
(Continued)

(52) U.S. Cl.
CPC ............ *G11B 7/083* (2013.01); *G03H 1/2286* (2013.01); *G11B 7/08564* (2013.01); *G11B 19/20* (2013.01); *G03H 1/12* (2013.01); *G03H 1/265* (2013.01); *G11B 7/0037* (2013.01);
(Continued)

(58) Field of Classification Search
None
See application file for complete search history.

(56) References Cited

U.S. PATENT DOCUMENTS

2008/0231927 A1    9/2008  Bates et al.
2009/0207710 A1    8/2009  Ayres et al.

FOREIGN PATENT DOCUMENTS

JP    2005-321750 A    11/2005
JP    2010-521711 A    6/2010
WO    2008/126301 A1    10/2008

OTHER PUBLICATIONS

International Search Report of PCT/JP2013/060574.

*Primary Examiner* — Brian Butcher
(74) *Attorney, Agent, or Firm* — Mattingly & Malur, PC

(57) ABSTRACT

A hologram recording and playback device is provided with: a medium rotation unit which rotates a hologram recording medium around a predetermined rotational axis; a movement unit which is capable of moving the position of the medium rotation unit within a plane that is perpendicular to the rotational axis; an orthogonal incident angle modification unit which is capable of modifying an orthogonal incident angle; a medium rotation control unit which controls the medium rotation unit so as to rotate the hologram recording medium; an eccentricity compensation unit which performs positioning control of the movement unit; an orthogonal incident angle control unit which controls the orthogonal incident angle modification unit; and an orthogonal incident angle calculation unit which calculates the orthogonal incident angle.

16 Claims, 31 Drawing Sheets

(51) Int. Cl.
    *G11B 7/0037*        (2006.01)
    *G11B 7/00*          (2006.01)
    *G03H 1/26*          (2006.01)
    *G11B 7/095*         (2006.01)
    *G03H 1/12*          (2006.01)
(52) U.S. Cl.
    CPC .......... *G11B 7/0065* (2013.01); *G11B 7/0953* (2013.01); *G11B 2007/0009* (2013.01)

CHANGE OF ORTHOGONAL INCIDENT ANGLE

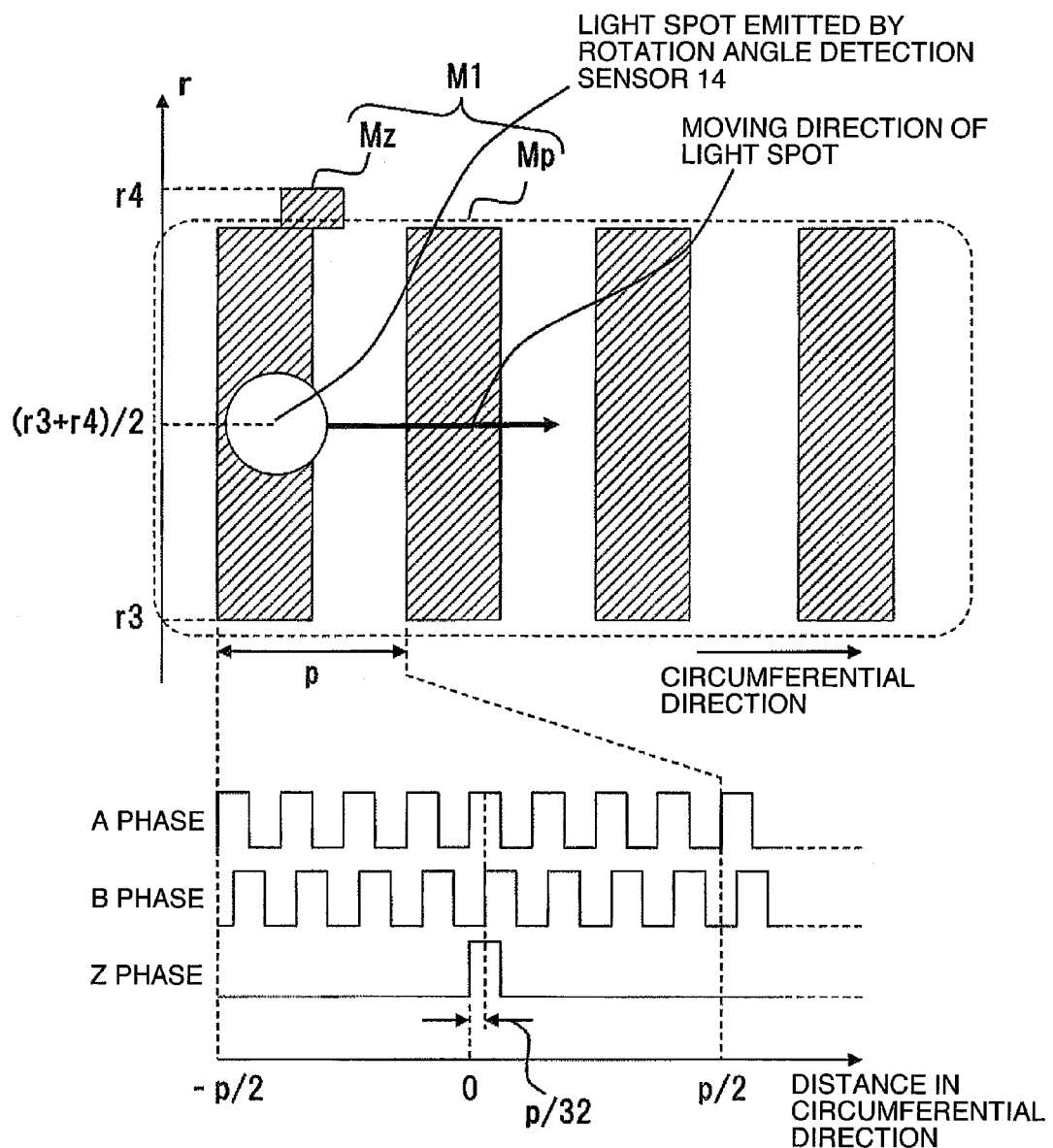

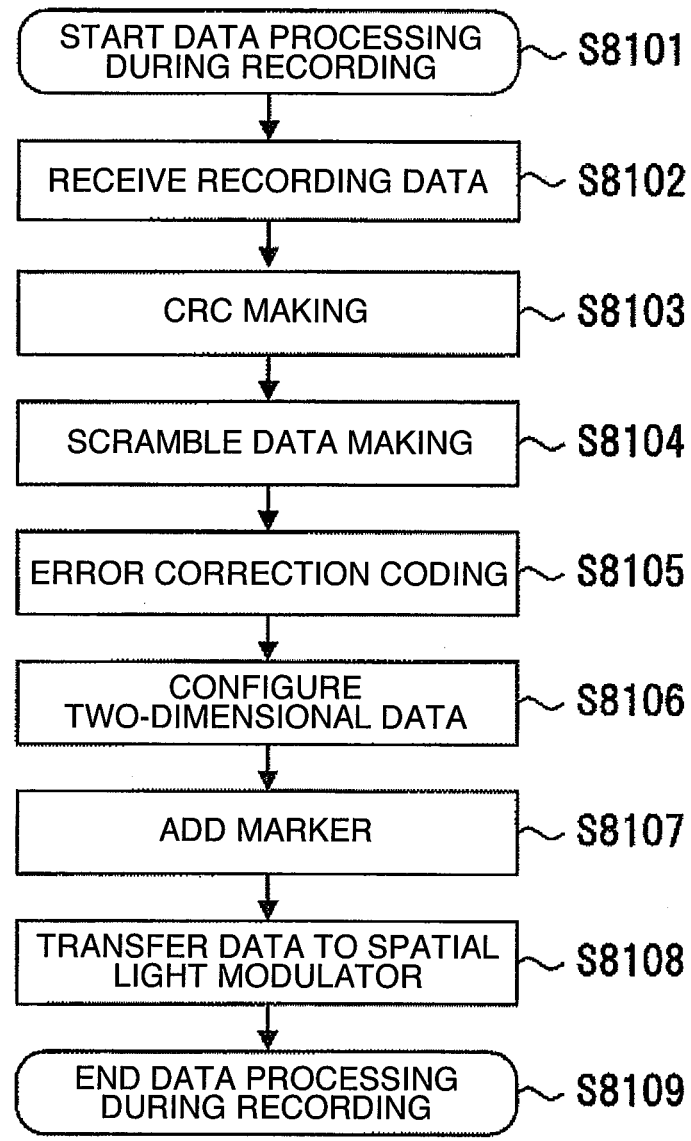

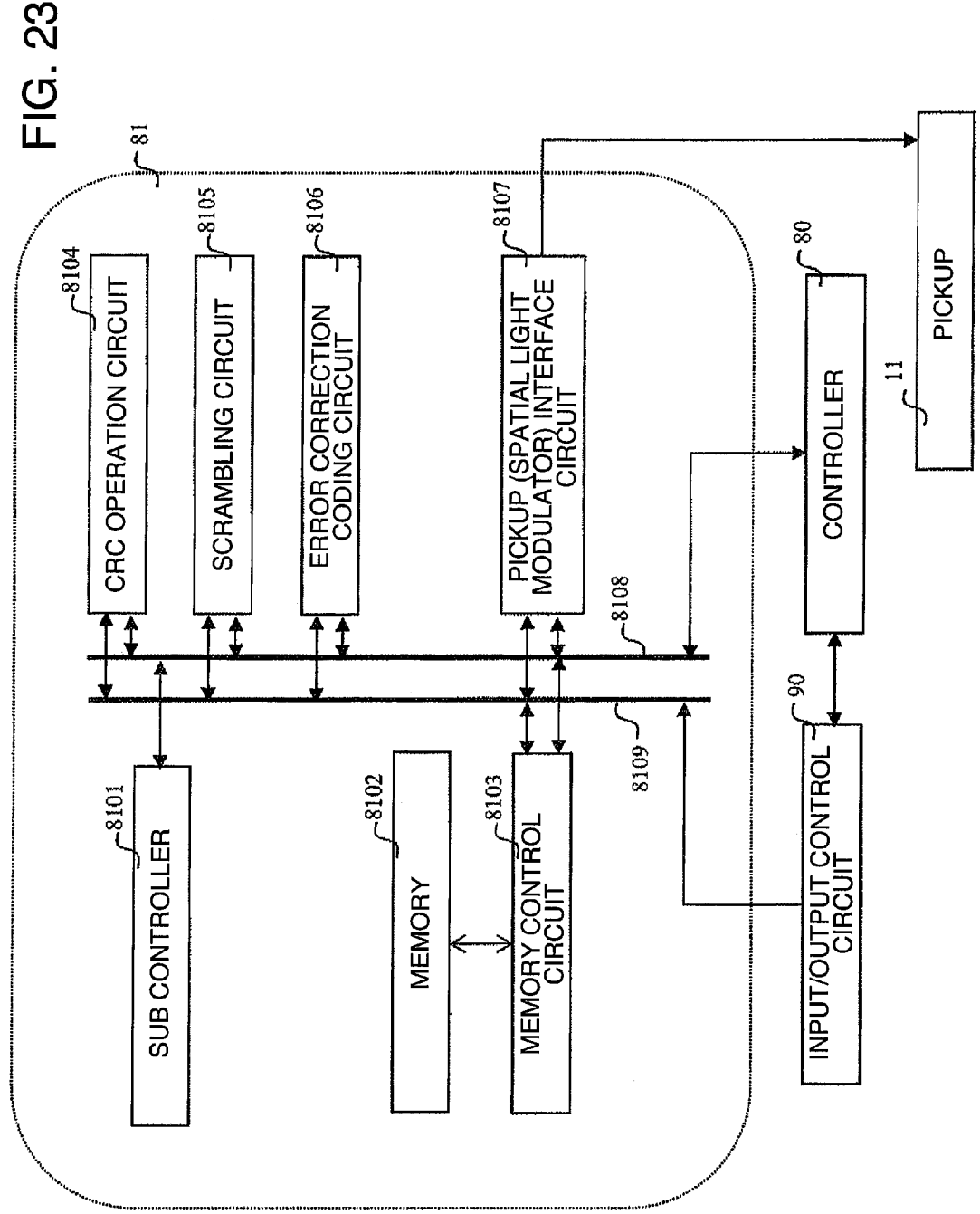

HOLOGRAM RECORDING AND PLAYBACK DEVICE AND HOLOGRAM PLAYBACK METHOD

TECHNICAL FIELD

The present invention relates to a device that performs recording and playback using holography and a hologram playback method.

BACKGROUND ART

Currently, it has become possible to commercialize an optical disk having a recording capacity of about 50 GB even for a consumer use by a Blu-ray Disc™ standard using a blue-violet semiconductor laser. Hereafter, it is desired to increase the capacity to the same extent of an HDD (Hard Disk Drive) capacity of 100 GB to 1 TB even for an optical disk.

However, in order to realize such a very high density in an optical disk, a density increasing technology by a new method that is different from a density increasing technology by wavelength shortening and objective lens NA increase is needed.

While a study regarding a storage technology of the next generation is being made, a hologram recording technology of recording digital information utilizing holography is attracting attention.

The hologram recording technology is a technology of recording information in a recording medium by superimposing signal light having information of pagedata two-dimensionally modulated by a spatial light modulator with reference light inside a recording medium and generating refractive index modulation inside the recording medium by an interference fringe pattern generated at the time.

When playing back the information, when the recording medium is irradiated with the reference light used during recording, a hologram recorded on the recording medium acts like a diffraction grating and generates diffracted light. The diffracted light is played back as the same light as the recorded signal light including phase information.

The played-back signal light is two-dimensionally detected at a high speed using a photodetector such as a CMOS or a CCD. In this way, the hologram recording technology makes it possible to record two-dimensional information in an optical recording medium at once by one hologram and reproduce the information further, and since two or more pieces of pagedata can be overwritten at a certain location of the recording medium, a large capacity of information can be recorded and played back at a high speed.

A configuration of a hologram recording and playback device is described in Patent Literature 1 for example. The literature describes that "a shape of a recording medium 1 has a disk shape for example, and is fixed to a spindle motor 200 by a clamp mechanism, and by rotational drive of the spindle motor 200, an irradiation position of a coherent beam on the recording medium can be moved in a tangential direction. The spindle motor 200 is fixed to a thread motor 201, and by rotational feed by the thread motor 201, the irradiation position of the coherent beam on the recording medium can be moved also in a radial direction."

CITATION LIST

Patent Literature

PATENT LITERATURE 1: Japanese Patent No. 4963509

SUMMARY OF INVENTION

Technical Problem

One great advantage of hologram recording is a point that a large capacity of data can be recorded. However, in the case of pursuing increase of a recording capacity, it is needed to improve accuracy of positioning control of position to be irradiated with signal light and reference light more than before.

In the case of a configuration of fixing a hologram recording medium to a spindle motor like the configuration in Patent Literature 1, as one example, eccentricity becomes a problem. The eccentricity denotes non-coincidence of a rotation center of the spindle motor and a center of a disk-like hologram recording medium. The eccentricity is caused by a combination of the eccentricity of the hologram recording medium itself and the eccentricity of a hologram recording medium fixing unit attached to a rotary shaft of the spindle motor, both of which are generated in a manufacturing step. Therefore, there is a characteristic that, every time the hologram recording medium is inserted to a hologram recording and playback device, a degree of the eccentricity changes.

In the configuration in Patent Literature 1, a position to be irradiated with the signal light and the reference light is changed by moving on the hologram recording medium by controlling a radius r by the thread motor and a rotation angle $\theta$ by the spindle motor respectively.

A problem in the case that the eccentricity exists will be described using FIG. 25. Here, for simplification, it is considered that recording is performed without existence of the eccentricity during recording and the eccentricity exists during playback. FIG. 25(a) illustrates an ideal reference light irradiation position in the case that there is no eccentricity, and the case of playing back a hologram recorded at the radius r and the rotation angle $\theta$ is considered. A point O is the center of the disk-like hologram recording medium, and a point P is the ideal reference light irradiation position. Here, since it is defined that recording is performed without existence of the eccentricity during recording, the hologram is recorded at the point P.

On the other hand, FIG. 25(b) illustrates a hologram playback position in the case that the eccentricity exists. By the eccentricity, a state that a rotation center sp0 of the spindle motor does not coincide with a center O of the disk-like hologram recording medium is indicated. At the time, in the case of a mechanism structure of determining the radius r with the rotation center sp0 of the spindle motor as a reference, the reference light irradiation position becomes a position P'. Since the hologram is actually recorded at the point P, an appropriate position is not irradiated with the reference light during playback. In this way, the reference light irradiation position P' is shifted by a portion $\Delta p$ of the eccentricity.

In a conventional technology, by controlling an amount $\Delta p$ of the eccentricity generated due to the manufacturing step, a problem is prevented from occurring even when the difference $\Delta p$ is generated. That is, the amount $\Delta p$ of the eccentricity is reduced so that the hologram can be played back even when the reference light irradiation position is shifted by $\Delta p$. For that, the eccentricity amount needs to be smaller than a positioning permissible amount $\Delta p\_th$ of the reference light irradiation position.

In this way, the first problem in the case that the eccentricity exists is degradation of hologram playback quality due to a shift of the reference light irradiation position by $\Delta p$.

However, on the other hand, high density recording is demanded in the hologram, too. In the case of achieving the high density recording, the positioning permissible amount $\Delta p\_th$ of the reference light irradiation position becomes small. As a result, it becomes difficult to perform manufacturing so as to make the amount $\Delta p$ of the eccentricity be smaller than the positioning permissible amount $\Delta p\_th$ of the reference light irradiation position.

In this case, when the reference light irradiation position is P', the hologram cannot be appropriately played back. Therefore, it becomes necessary to perform a positioning operation called seek again in order to play back a target hologram. The second problem in the case that the eccentric exists is decline of a playback transfer rate due to a hologram playback failure.

The case that recording is performed without existence of the eccentricity during recording and the eccentricity exists during playback is described above, however, actually the eccentric may exist during recording. When FIG. 25(b) is replaced for the time of recording to give description, the point P is an ideal hologram recording position and the point P' is an actual hologram recording position. In the case that the eccentricity exists during recording, a recording position of the hologram assumed to be recorded at the radius r and the rotation angle θ is shifted. In the initial description for the time of playback, it is described assuming that the hologram is recorded at the point P which is the ideal position, however, in the case that the eccentricity exists during recording and it is different from the eccentricity during playback, a position where the hologram is actually recorded is not the point P and is a different position in FIG. 25(b). That is, when the eccentricity during recording is also taken into consideration, the above-described first and second problems become more remarkable. However, the eccentricity of a medium is not taken into consideration at all in Patent Literature 1.

In this way, since demand for the positioning permissible amount $\Delta p\_th$ of the reference light irradiation position becomes severe when performing high density recording of the hologram, it becomes difficult to achieve suitable recording and playback to a hologram recording medium by a conventional technology.

Therefore, an objective of the present invention is to provide a hologram recording and playback device that achieves suitable recording and/or playback to a hologram recording medium.

Solution to Problem

The above-described problems are solved by an invention described in the claims, for example.

Advantageous Effects of Invention

According to the present invention, suitable recording and/or playback to a hologram recording medium can be achieved.

BRIEF DESCRIPTION OF DRAWINGS

FIG. 15 is a diagram for illustrating a mark for angle detection and signals outputted from a rotation angle detection sensor in the embodiment 1.

FIG. 22(a) is a data processing flow during recording.

FIG. 23 is a block diagram of a signal generation circuit inside the hologram recording and playback device.

DESCRIPTION OF EMBODIMENTS

Hereinafter, embodiments of the present invention will be described using drawings.

Embodiment 1

Figure 1:
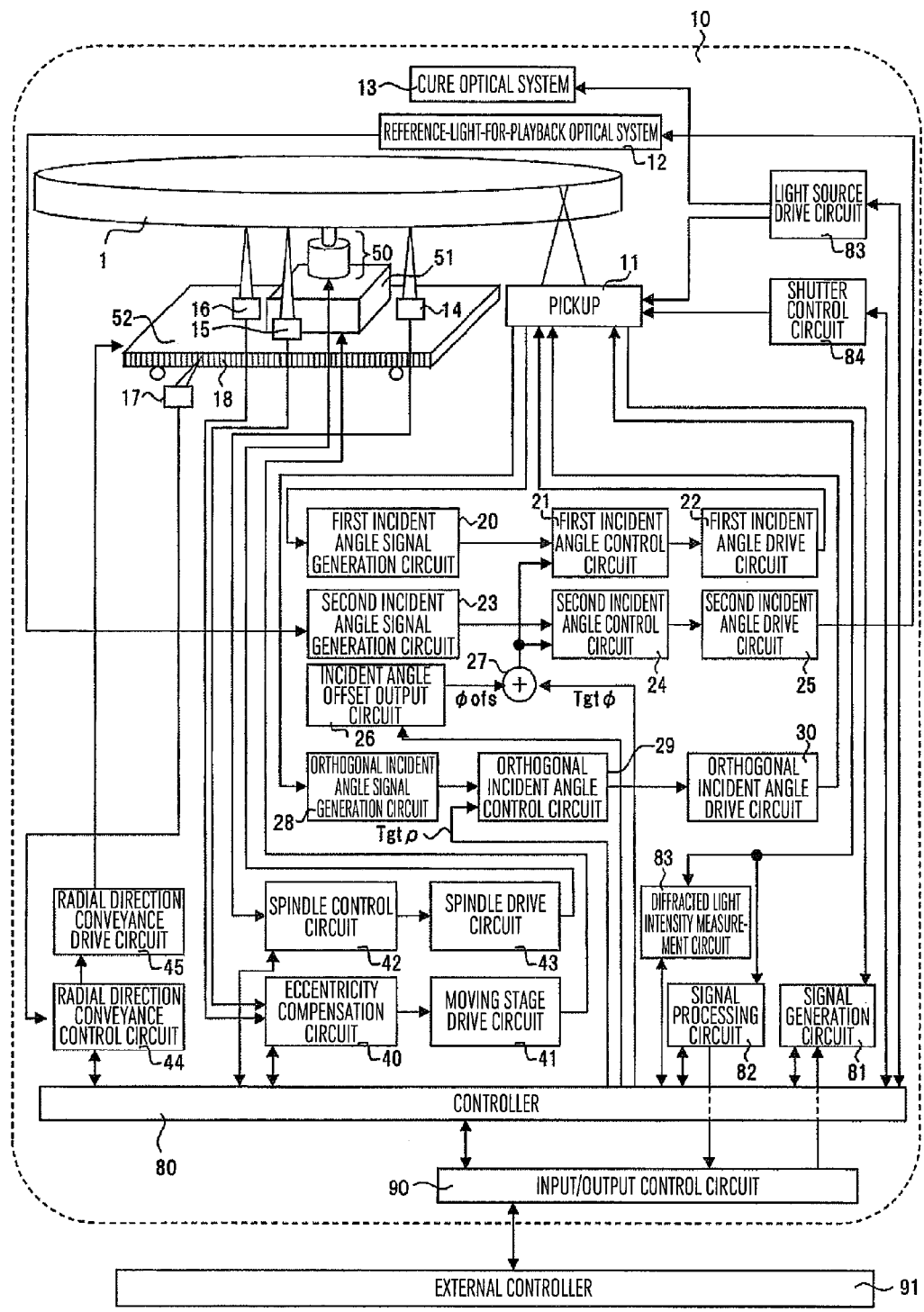
FIG. 1 is a block diagram illustrating a hologram recording and playback device in an embodiment 1.

The embodiment of the present invention will be described according to the accompanying drawings. FIG. 1 is a block diagram illustrating a recording and playback device of a hologram recording medium that records and/or plays back digital information using holography.

A hologram recording and playback device 10 is connected with an external controller 91 through an input/output control circuit 90. In the case of recording information in a hologram recording medium 1, the hologram recording and playback device 10 receives information signals to be recorded from the external controller 91 by the input/output control circuit 90. In the case of playing back information from the hologram recording medium 1, the hologram recording and playback device 10 transmits played-back information signals to the external controller 91 by the input/output control circuit 90.

The hologram recording medium 1 in the present embodiment has a disk shape. Further, the hologram recording medium 1 in the present embodiment has two kinds of marks of a predetermined pattern. One is a mark for angle detection, and is a mark for detecting a rotation angle of the hologram recording medium. The other one is a mark for eccentricity detection, and is a mark for detecting a position of the hologram recording medium 1. Details of these marks will be described later.

The hologram recording and playback device 10 includes a pickup 11, a reference-light-for-playback optical system 12, a cure optical system 13, a rotation angle detection sensor 14, a first eccentricity detection sensor 15, a second eccentricity detection sensor 16, a radial position detection sensor 17, a spindle motor 50, a moving stage 51, and a radial direction conveyance unit 52.

The spindle motor 50 has a medium attaching/detaching unit (not shown in the figure) capable of attaching and detaching the hologram recording medium 1 to/from a rotary shaft thereof, and the hologram recording medium 1 can be rotated by the spindle motor 50. Simultaneously, the hologram recording medium 1 can be moved in a radial direction with a position of the pickup 11 as a reference by the radial direction conveyance unit 52.

The moving stage 51, the rotation angle detection sensor 14, the first eccentricity detection sensor 15 and the second eccentricity detection sensor 16 are all fixed to a movable part of the radial direction conveyance unit 52. Further, the spindle motor 50 is fixed to a movable part of the moving stage 51.

As a result, to a predetermined base member (not shown in the figure) to which the pickup 11 is fixed, the radial direction conveyance unit 52 drivable in the radial direction is loaded. Onto the movable part of the radial direction conveyance unit 52, the moving stage 51, the first eccentricity detection sensor 15, the second eccentricity detection sensor 16 and the rotation angle detection sensor 14 are fixed. Onto the movable part of the moving stage 51, the spindle motor 50 is fixed. To the rotary shaft of the spindle motor 50, the hologram recording medium 1 having predetermined marks can be fixed.

A mechanical loading order is described as follows paying attention to the movable part. That is, a mechanism is loaded with the predetermined base member to which the pickup 11 is fixed, the radial direction conveyance unit 52 to the movable part of which the moving stage 51, the first eccentricity detection sensor 15, the second eccentricity detection sensor 16 and the rotation angle detection sensor 14 are fixed, the spindle motor 50, and the hologram recording medium 1 having the predetermined marks, in the order.

The moving stage 51 in the present embodiment is a movable stage of orthogonal two axes, and is movable within a plane which is roughly in parallel with a recording surface of the hologram recording medium 1. In the present embodiment, one movable axis is taken in the same direction as a conveyance direction of the radial direction conveyance unit 52 and defined as a Y axis, and the other movable axis orthogonal to it is defined as an X axis.

A position to be irradiated with signal light and/or reference light is determined by a position of the pickup 11, and is a position fixed to the device. In the present embodiment, the spindle motor 50, the movable part of the radial direction conveyance unit 52 and the moving stage 51 function as means that changes the position on the hologram recording medium 1 to be irradiated with the signal light and/or the reference light.

The rotation angle detection sensor 14 detects a rotation angle of the hologram recording medium 1 using the mark for angle detection provided on the hologram recording medium 1. An output signal of the rotation angle detection sensor 14 is inputted to a spindle control circuit 42. In the case of changing the rotation angle at which the signal light and the reference light are emitted, the spindle control circuit 42 generates a drive signal on the basis of the output signal of the rotation angle detection sensor 14 and a command signal from a controller 80, and drives the spindle motor 50 through a spindle drive circuit 43. Thus, the rotation angle of the hologram recording medium 1 can be controlled.

Also, to the movable part of the radial direction conveyance unit 52, a scale 18 having a predetermined pattern is fixed. The radial position detection sensor 17 detects a position of the movable part of the radial direction conveyance unit 52 using the scale 18. In the case of changing a radial position for irradiation with the signal light and the reference light, a radial direction conveyance control circuit 44 generates a drive signal on the basis of the output signal of the radial position detection sensor 17 and the command signal from the controller 80, and drives the radial direction conveyance unit 52 through a radial direction conveyance drive circuit 45. Thus, the hologram recording medium 1 is conveyed in the radial direction. Thus, the radial position for the irradiation with the signal light and the reference light can be controlled.

The first eccentricity detection sensor 15 and the second eccentricity detection sensor 16 detect a position of the hologram recording medium 1 using the mark for eccentricity detection provided on the hologram recording medium 1. Output signals of the first eccentricity detection sensor 15 and the second eccentricity detection sensor 16 are inputted to an eccentricity compensation circuit 40. The eccentricity compensation circuit 40 generates a drive signal for compensating eccentricity, and drives the moving stage 51 through a moving stage drive circuit 41. While details of the first eccentricity detection sensor 15, the second eccentricity detection sensor 16 and the eccentricity compensation circuit 40 will be described later, by the configuration, the hologram recording and playback device 10 in the present embodiment is operated such that the hologram recording medium 1 is positioned with the mark for eccentricity detection as a reference.

The pickup 11 plays a role of irradiating the hologram recording medium 1 with the reference light and the signal light and recording digital information on the recording medium utilizing holography. At the time, information signals to be recorded are sent to a spatial light modulator to be described later inside the pickup 11 through a signal generation circuit 81 by the controller 80, and the signal light is modulated by the spatial light modulator.

In the case of playing back information recorded on the hologram recording medium 1, a light wave that makes the reference light emitted from the pickup 11 be incident on the hologram recording medium 1 in a direction opposite to that during recording is generated in the reference-light-for-playback optical system 12. Diffracted light that is played back by the reference light for playback is detected by a photodetector 226 to be described later inside the pickup 11, and signals are played back by a signal processing circuit 82.

Also, light intensity of the diffracted light played back by the reference light for playback is measured by a diffracted light intensity measurement circuit 85. The diffracted light intensity measurement circuit 85 by the present embodiment can measure the intensity of the diffracted light as a luminance on the basis of the signals from the photodetector 226, and can measure a luminance gravity center of the diffracted light received at the photodetector 226. In the present description, in this way, the luminance detected in the photodetector 226 can be interpreted as the intensity of the diffracted light.

Further, an angle at which the reference light is made incident on the hologram recording medium 1 is controlled by a first incident angle control circuit 21, a second incident angle control circuit 24, and an orthogonal incident angle control circuit 29. Here, regarding the angle at which the reference light is made incident on the hologram recording medium 1, in the present description, an "incident angle" and an "orthogonal incident angle" are defined. Hereinafter, description will be given using FIG. 8.

Figure 8A:
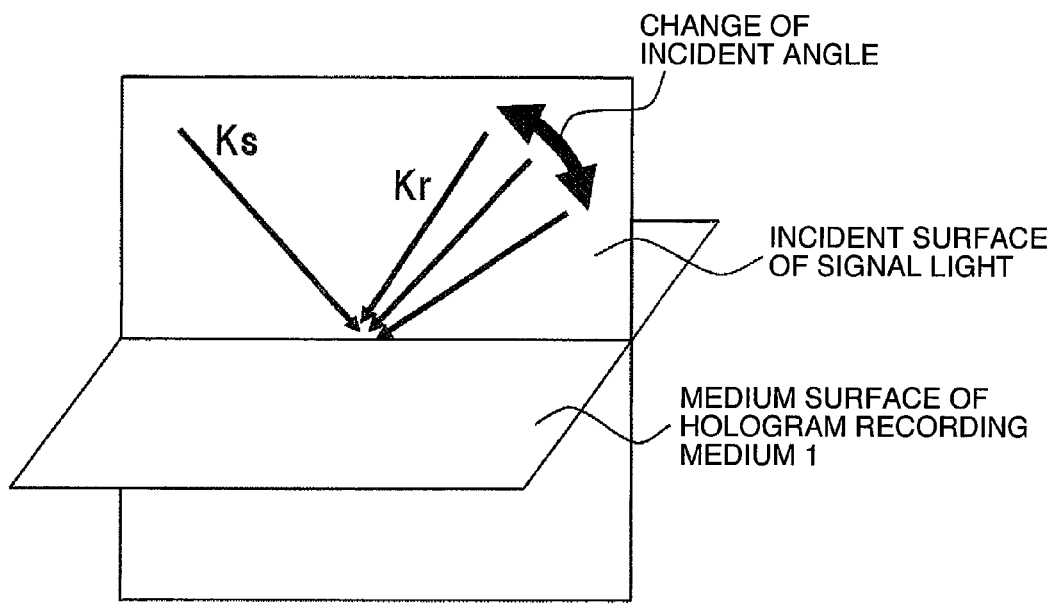
FIG. 8(a) is a diagram illustrating an incident angle and an orthogonal incident angle in the present description.
Figure 8B:
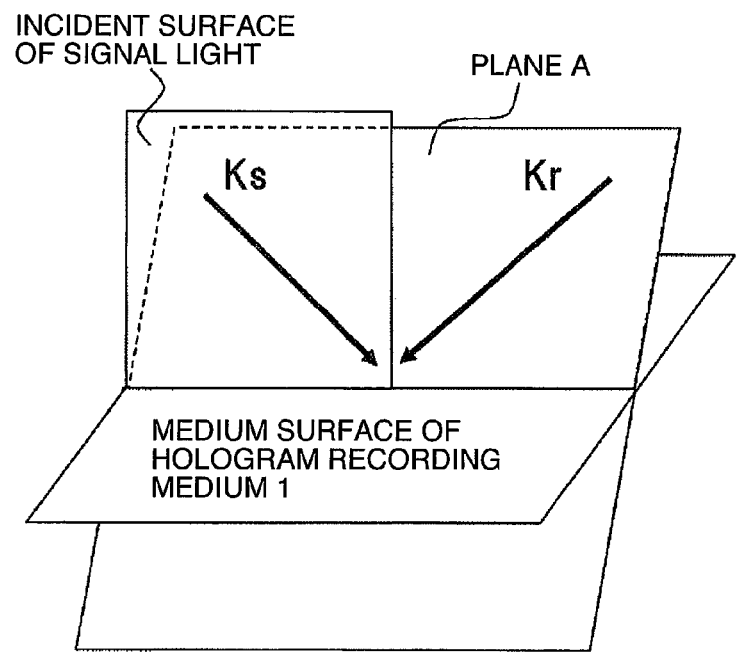
FIG. 8(b) is a diagram illustrating an incident angle and an orthogonal incident angle in the present description.
Figure 8C:
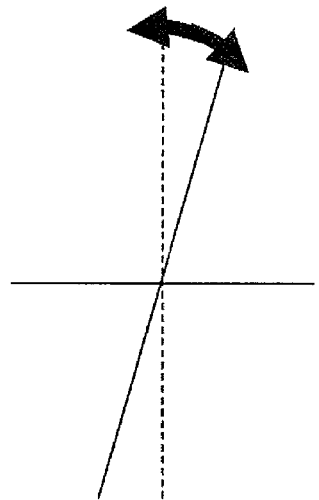
FIG. 8(c) is a diagram illustrating an incident angle and an orthogonal incident angle in the present description.

FIG. 8(*a*) is a diagram illustrating a wave number vector Ks of the signal light and a wave number vector Kr of the reference light during recording and a medium surface of the hologram recording medium 1. An incident surface of the signal light is stipulated as a plane including the wave number vector Ks of the signal light and a normal vector of the hologram recording medium 1. In the case that the device is an ideal state, the wave number vector Kr of the reference light exists within the incident surface of the signal light, and FIG. 8(*a*) illustrates the state. At the time, as illustrated in FIG. 8(*a*), within the incident surface of the signal light, an angle of the wave number vector Kr of the reference light can be changed. This change of the angle within the incident surface of the reference light is called "the change of the incident angle" in the present description.

Next, "the change of the orthogonal incident angle" will be described. FIG. 8(*b*) and FIG. 8(*c*) are diagrams for describing it. FIG. 8(*b*) illustrates a state that the orthogonal incident angle is changed from the state in FIG. 8(*a*). Also, FIG. 8(*c*) illustrates a state of viewing FIG. 8(*b*) from the side.

As can be seen from FIG. 8(*b*), when the orthogonal incident angle of the reference light is changed, the wave number vector Kr of the reference light exists not on the incident surface of the signal light, but on a plane A in FIG. 8(*b*). That is, "the change of the orthogonal angle" means changing the angle at which the reference light is made incident on the hologram recording medium 1, in a direction orthogonal to the incident surface of the signal light.

In the state of changing the orthogonal incident angle as in FIG. 8(*b*), "the change of the incident angle" means the change of the angle within the plane A of the reference light.

As is clear from FIG. 8(*c*), a changing direction of the incident angle (that is, a direction included in the plane A) and a changing direction of the orthogonal incident angle (a direction of an arrow in FIG. 8(*c*)) surely orthogonally intersect.

The controller 80 outputs a command value Tgtφ of the incident angle of the reference light to be controlled, and a command value Tgtρ of the orthogonal incident angle. An incident angle offset output circuit 26 outputs a predetermined value φofs according to an instruction from the controller 80. An incident angle offset adder 27 adds the command value Tgtφ of the incident angle from the controller 80 and the value φofs outputted by the incident angle offset output circuit 26.

A first incident angle signal generation circuit 20 generates signals to be used for controlling the incident angle of the reference light from output signals of the pickup 11. The first incident angle control circuit 21 generates drive signals using the output signals of the first incident angle signal generation circuit 20 and the output signals of the incident angle offset adder 27. The drive signals outputted from the first incident angle control circuit 21 are supplied to an actuator 221 to be described later inside the pickup 11 through a first incident angle drive circuit 22.

Here, an operation of the first incident angle control circuit 21 will be described using FIG. 9. The output signals of the first incident angle signal generation circuit 20 are signals indicating the incident angle of the reference light reflected at a galvano mirror 220, and the incident angle thereof is defined as Detφ. In the incident angle offset adder 27, the command value Tgtφ and the incident angle offset φofs are added.

The first incident angle control circuit 21 has two inputs. The first input is the detected incident angle Detφ of the reference light, and the second input is the output signal of the incident angle offset adder 27. In the first incident angle control circuit 21, the drive signals are generated such that a value of the first input coincides with a value of the second input.

By this operation, when the incident angle offset φofs outputted by the incident angle offset output circuit 26 is zero for example, control is carried out so that the incident angle of the reference light reflected at the galvano mirror 220 becomes the command value Tgtφ. Also, when the incident angle offset φofs is other than zero, control is carried out so that the incident angle of the reference light reflected at the galvano mirror 220 becomes (Tgtφ+φofs). From this, by setting a minute incident angle offset, the incident angle of the reference light can be finely adjusted by the incident angle offset output circuit 26.

Also, a second incident angle signal generation circuit 23 generates signals to be used for controlling the incident angle of the reference light from output signals of the reference-light-for-playback optical system 12. The second incident angle control circuit 24 generates drive signals using the output signals of the second incident angle signal generation circuit 23 and the output signals of the incident angle offset adder 27. The drive signals outputted from the second incident angle control circuit 24 are supplied to an actuator 224 to be described later inside the reference-light-for-playback optical system 12 through a second incident angle drive circuit 25.

By driving the actuator 221 and the actuator 224 in this way, the incident angle of the reference light to be made incident on the hologram recording medium 1 is controlled.

An orthogonal incident angle signal generation circuit 28 generates signals to be used for controlling the orthogonal incident angle of the reference light from the output signals of the pickup 11. The orthogonal incident angle control circuit 29 generates drive signals using the output signals of the orthogonal incident angle signal generation circuit 28 and the command value Tgtρ of the orthogonal incident angle from the controller 80. The drive signals outputted from the orthogonal incident angle control circuit 29 are supplied to an actuator 219 to be described later inside the pickup 11 through an orthogonal incident angle drive circuit 30. By driving the actuator 219 in this way, the orthogonal incident angle of the reference light to be made incident on the hologram recording medium 1 is controlled.

Figure 9:
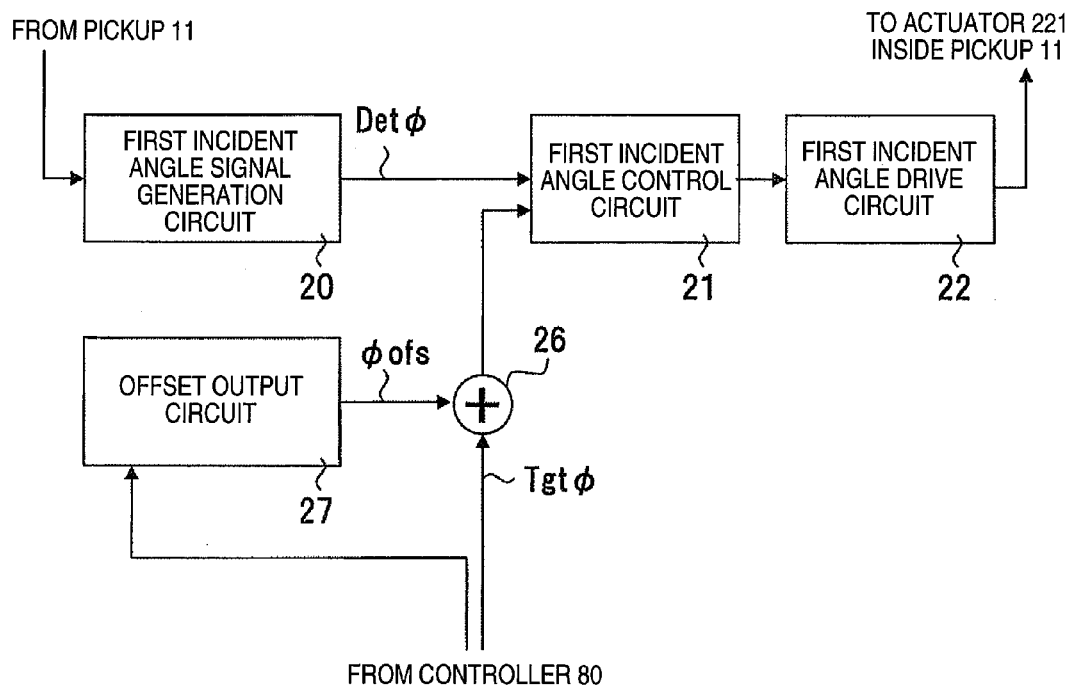
FIG. 9 is a diagram illustrating a first incident angle control circuit 21 in the embodiment 1.

The operations of the second incident angle control circuit 24 and the orthogonal incident angle control circuit 29 are similar to that of the first incident angle control circuit 21 described using FIG. 9.

In the case that an angle indicated from the controller 80 to the orthogonal incident angle control circuit 29 is a reference position (the command value of the orthogonal incident angle Tgtρ=0), the reference light passes through the same surface as the incident surface of the signal light, to be the state illustrated in FIG. 8(a). On the other hand, in the case that the angle indicated from the controller 80 to the orthogonal incident angle control circuit 29 is other than the reference position, the reference light is made incident on the tile in the direction orthogonal to the incident surface of the signal light, to be the state illustrated in FIG. 8(b) as one example.

Irradiation time of the reference light and the signal light with which the hologram recording medium 1 is to be irradiated can be adjusted by controlling opening/closing time of a shutter inside the pickup 11 by the controller 80 through a shutter control circuit 84.

The cure optical system 13 plays a role of generating an optical beam used for precure and postcure of the hologram recording medium 1. The precure is a preceding process of performing irradiation with a predetermined optical beam before irradiating a desired position with the reference light and the signal light, when recording information at the desired position inside the hologram recording medium 1. The postcure is a post-process of performing irradiation with the predetermined optical beam so as to disable additional write at the desired position, after recording the information at the desired position inside the Hologram recording medium 1. It is preferable that the optical beam used in the precure and the postcure needs to be incoherent light, that is, the light of low coherence.

A predetermined light source drive current is supplied from a light source drive circuit 83 to light sources inside the pickup 11 and the cure optical system 13, and the light beam can be emitted with a predetermined light quantity from the individual light sources.

Also, for the pickup 11 and the cure optical system 13, some optical system configurations or all the optical system configurations may be gathered into one and simplified. Also, regarding the rotation angle detection sensor 14, the first eccentricity detection sensor 15, and the second eccentricity detection sensor 16, some of the sensors or all the sensors may be integrated and configured as a single sensor.

Figure 2:
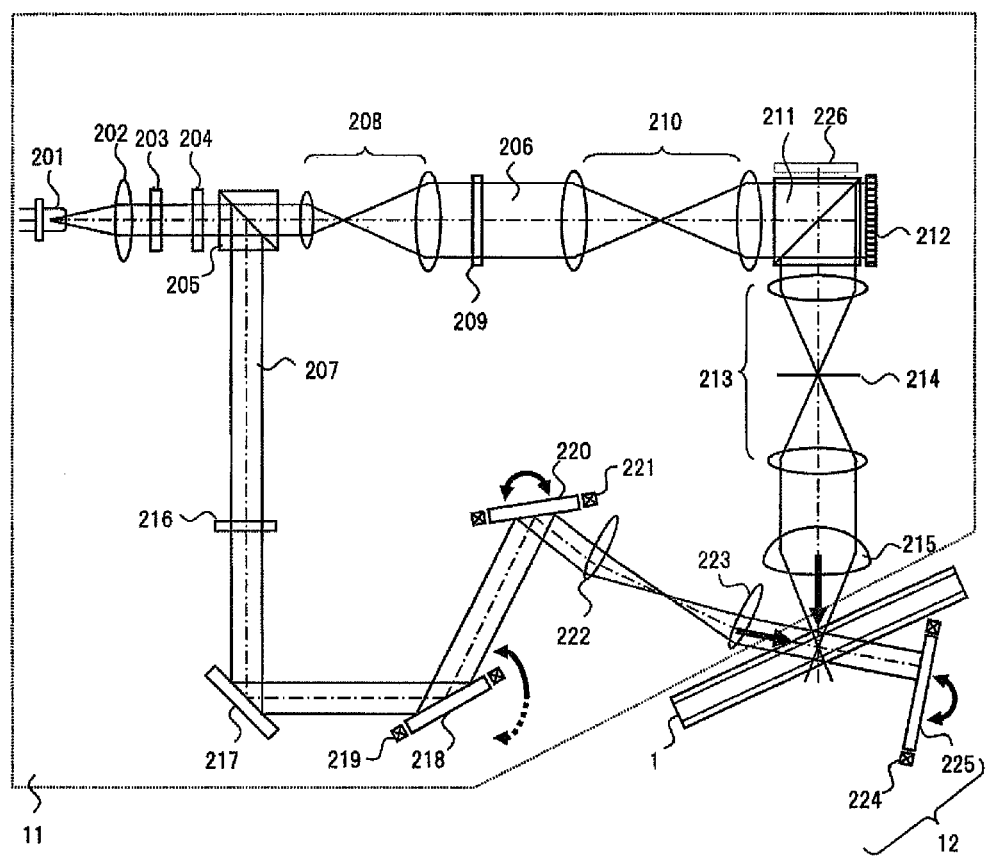
FIG. 2 is a diagram illustrating a recording principle of the hologram recording and playback device.

FIG. 2 illustrates a recording principle in one example of a basic optical system configuration of the pickup 11 and the reference-light-for-playback optical system 12 in the hologram recording and playback device 10. The reference-light-for-playback optical system 12 is composed of the actuator 224 and a galvano mirror 225.

The light beam emitted from a light source 201 is transmitted through a collimate lens 202 and is made incident on a shutter 203. When the shutter 203 is open, the light beam passes through the shutter 203 and then, after a polarization direction is controlled so that a light quantity ratio of p polarized light and s polarized light becomes a desired ratio by an optical element 204 configured by a ½ wavelength plate or the like for example, is made incident on a PBS (Polarization Beam Splitter) prism 205.

The light beam transmitted through the PBS prism 205 functions as signal light 206, and after a light beam diameter is enlarged by a beam expander 208, is transmitted through a phase mask 209, a relay lens 210 and a PBS prism 211 and made incident on a spatial light modulator 212.

The signal light to which information is added by the spatial light modulator 212 is reflected at the PBS prism 211, and is propagated through a relay lens 213 and a space filter 214. Thereafter, the signal light is converged to the hologram recording medium 1 by an objective lens 215.

On the other hand, the light beam reflected at the PBS prism 205 functions as reference light 207, is set to a predetermined polarization direction according to the time of recording or the time of playback by a polarization direction conversion element 216, and is then made incident on the galvano mirror 220 through a mirror 217 and a galvano mirror 218. For the galvano mirror 220, an angle within a paper surface is adjustable by the actuator 221 so that the incident angle of the reference light to be made incident on the hologram recording medium 1 after passing through a lens 222 and a lens 223 can be set at a desired angle. In order to set the incident angle of the reference light, instead of the galvano mirror, an element that converts a wavefront of the reference light may be used.

Further, for the galvano mirror 218, an angle in a paper surface vertical direction is adjustable by the actuator 219 so that the orthogonal incident angle of the reference light to be made incident on the hologram recording medium 1 after passing through the lens 222 and the lens 223 can be set at a desired angle.

By making the signal light and the reference light be incident so as to be superimposed on each other on the hologram recording medium 1 in this way, an interference fringe pattern is formed inside the recording medium, and information is recorded by writing the pattern to the recording medium. Also, since the incident angle of the reference light to be made incident on the hologram recording medium 1 can be changed by the galvano mirror 220, recording by angle multiplexing is possible.

Hereinafter, in holograms recorded changing the incident angle of the reference light in the same area, the hologram corresponding to each incident angle is called a page, and a set of the pages angle-multiplexed in the same area is called a book.

Figure 3:
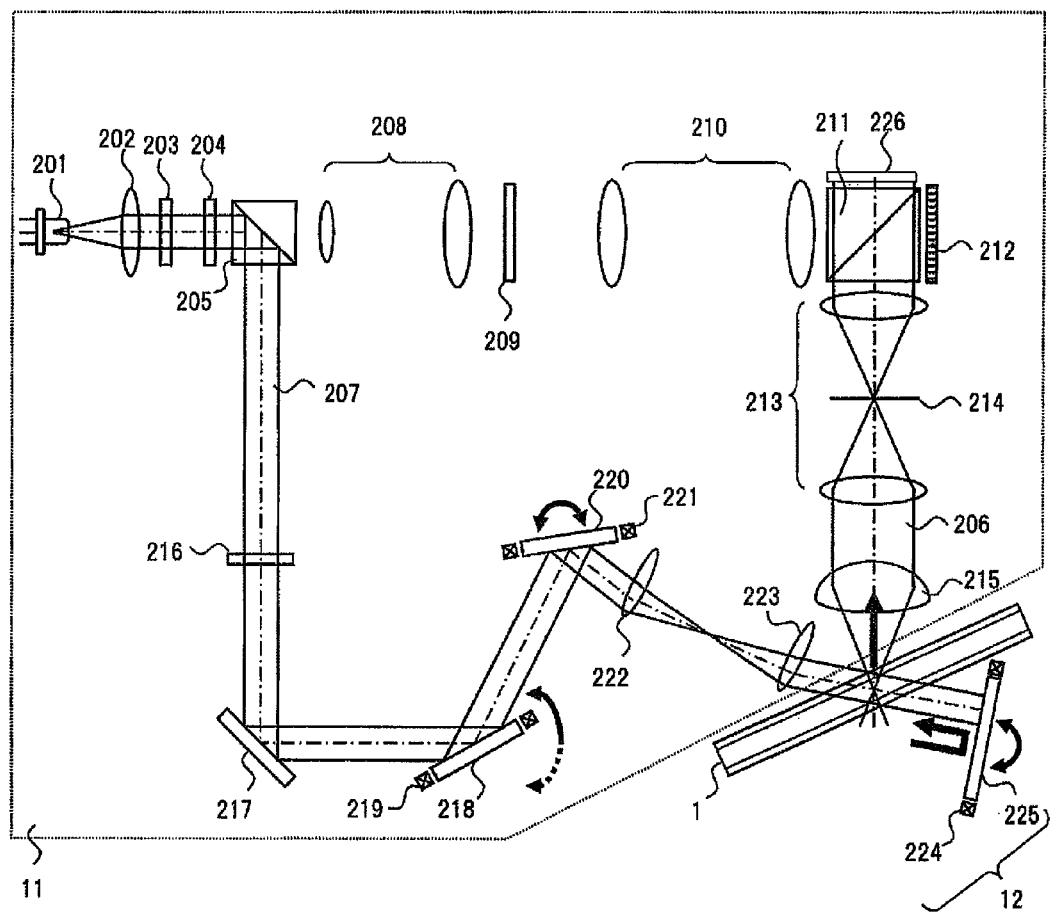
FIG. 3 is a diagram illustrating a playback principle of the hologram recording and playback device.

FIG. 3 illustrates a playback principle in one example of the basic optical system configuration of the pickup 11 and the reference-light-for-playback optical system 12 in the hologram recording and playback device 10. In the case of playing back the recorded information, as described above, by making the reference light be incident on the hologram recording medium 1 and reflecting the light beam transmitted through the hologram recording medium 1 by the galvano mirror 225 that is angle-adjustable by the actuator 224, the reference light for playback is generated.

The diffracted light played back by the reference light for playback is propagated through the objective lens 215, the relay lens 213 and the space filter 214. Thereafter, the diffracted light is transmitted through the PBS prism 211 and is made incident on the photodetector 226, and the recorded signals can be played back. As the photodetector 226, an imaging element such as a CMOS image sensor or a CCD image sensor can be used for example, however, it may be any element as long as pagedata can be played back.

In the present embodiment, the first incident angle signal generation circuit 20 receives output signals of an angle detection sensor (not shown in the figure) provided in the actuator 221 as the input, generates signals indicating the incident angle of the reference light reflected at the galvano mirror 220, and generates them as the signals to be used in control of the incident angle. Similarly, regarding the reference-light-for-playback optical system 12, the second incident angle signal generation circuit 23 receives output signals of an angle detection sensor (not shown in the figure) provided in the actuator 224 as the input, generates signals indicating the incident angle of the reference light reflected at the galvano mirror 225, and generates them as the signals to be used in control of the incident angle.

The orthogonal incident angle signal generation circuit 28 receives output signals of an angle detection sensor (not shown in the figure) provided in the actuator 219 as the input, generates signals indicating the orthogonal incident angle of the reference light reflected at the galvano mirror 218, and generates them as the signals to be used in control of the orthogonal incident angle. For the angle detection sensors provided in the actuator 221, the actuator 224 and the actuator 219, for example, an optical type encoder may be used.

Now, in a recording technology utilizing the principle of angle multiplexing of the holography, an allowable error for the shift of the incident angle of the reference light tends to be extremely small. Therefore, the configuration may be such that, without using the angle detection sensor provided in the actuator 221, a mechanism of detecting a shift amount of the incident angle of the reference light is separately provided inside the pickup 11 and the first incident angle signal generation circuit 20 receives the output signals of the mechanism as the input and generates the signals to be used in control of the incident angle of the reference light. It is the same for the second incident angle signal generation circuit 23 and the orthogonal incident angle signal generation circuit 28, too.

FIG. 4 illustrate flowcharts of recording and playback in the hologram recording and playback device 10. Here, especially processes regarding recording and playback utilizing holography will be described. In the present description, a process after insertion of the hologram recording medium 1 to the hologram recording and playback device 10 to completion of preparation of recording or playback is called a setup process. A process of recording information in the hologram recording medium 1 from a preparation completed state is called a recording process, and a process of playing back the information recorded in the hologram recording medium 1 from the preparation completed state is called a playback process.

Figure 4C:
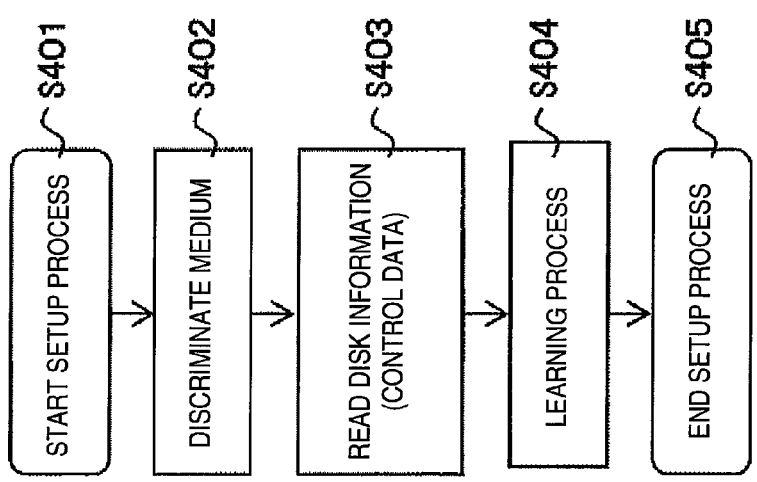
FIG. 4(c) is a flowchart of a playback process in the hologram recording and playback device.
Figure 4B:
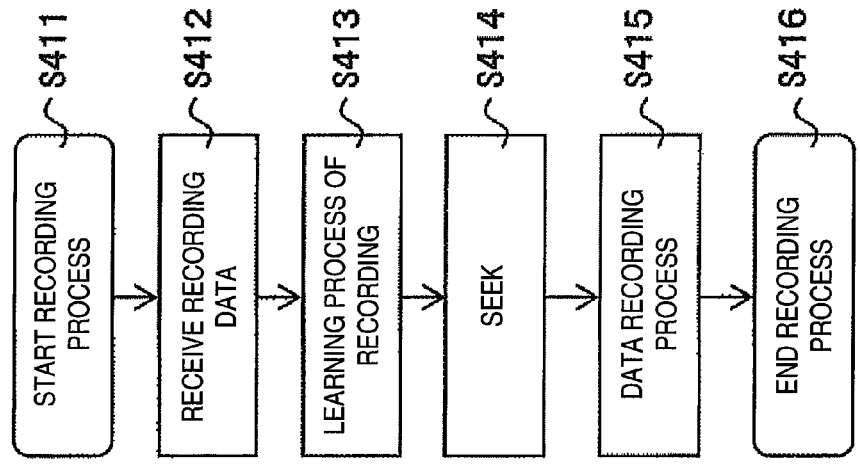
FIG. 4(b) is a flowchart of a recording process in the hologram recording and playback device.
Figure 4A:
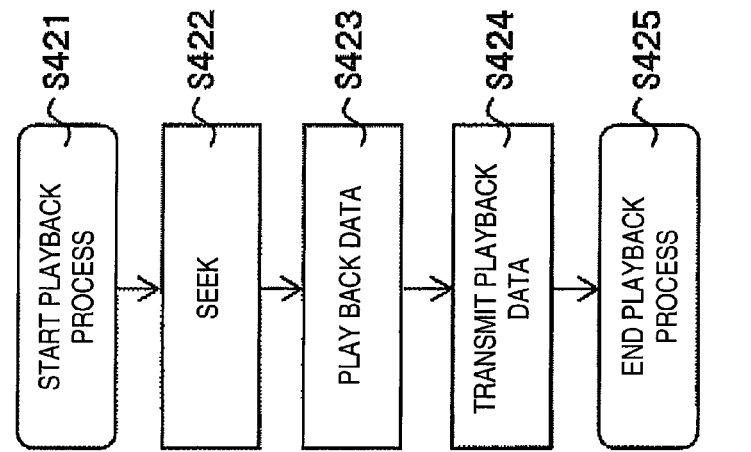
FIG. 4(a) is a flowchart to completion of preparation of recording or playback in the hologram recording and playback device.

FIG. 4(a) illustrates a flowchart of the setup process, FIG. 4(b) illustrates a flowchart of the recording process, and FIG. 4(c) illustrates a flowchart of the playback process.

As illustrated in FIG. 4(a), when the setup process is started (step S401), the hologram recording and playback device 10 performs medium discrimination of discriminating whether or not an inserted medium is a medium to record or play back digital information utilizing holography for example (step S402).

When it is determined that it is the hologram recording medium 1 to record or play back digital information utilizing holography as a result of the medium discrimination, the hologram recording and playback device 10 reads control data provided in the hologram recording medium 1 (step S403), and acquires information related to the hologram recording medium 1 for example, and information related to various kinds of setting conditions during the time of recording and playback for example.

After the control data is read, various kinds of adjustments according to the control data and a learning process (step S404) related to the pickup 11 are performed. Thus, the hologram recording and playback device 10 completes the preparation of recording or playback, and ends the setup process (step S405).

In the present embodiment, it is assumed that the learning process in step S404 includes a process of turning on eccentricity compensation control to be described later, and the eccentricity compensation control is turned on at all times thereafter.

Next, the process from the preparation completed state to recording of information will be described using the flowchart in FIG. 4(b). When the recording process is started (step S411), the hologram recording and playback device 10 receives recording data (step S412), and sends two-dimensional data according to the data to the spatial light modulator 212 inside the pickup 11.

Thereafter, in order to record high-quality information in the hologram recording medium 1, various kinds of learning processes for recording such as power optimization of the light source 201 and optimization of exposure time by the shutter 203 are performed beforehand as needed (step S413).

Thereafter, in a seek operation (step S414), using the spindle control circuit 42, the radial direction conveyance control circuit 44 and the eccentricity compensation circuit 40, the spindle motor 50, the radial direction conveyance unit 52 and the moving stage 51 are controlled. Thus, the hologram recording medium 1 is positioned so that a predetermined position of the hologram recording medium 1 is irradiated with the light beams emitted from the pickup 11 and the cure optical system 13. In the case that the hologram recording medium 1 has address information, the address information is played back, whether or not it is positioned at a target position is confirmed, and when it is not arranged at the target position, a shift amount from the predetermined position is calculated, and a positioning operation is repeated. A flowchart of the seek operation in the present embodiment will be described later.

Thereafter, a data recording process of recording data to be recorded in the hologram recording medium 1 as a hologram is performed (step S415). Details of the data recording process will be described later. When the data recording process is completed, the recording process is ended (step S416). The data may be verified as needed.

The process from the preparation completed state to playback of recorded information will be described using the flowchart in FIG. 4(*c*). When the playback process is started (step S421), the hologram recording and playback device 10 first positions the hologram recording medium 1 so that the predetermined position of the hologram recording medium 1 is irradiated with the light beams emitted from the pickup 11 and the reference-light-for-playback optical system 12, using the spindle control circuit 42, the radial direction conveyance control circuit 44 and the eccentricity compensation circuit 40 in the seek operation (step S422). In the case that the hologram recording medium 1 has the address information, the address information is played back, whether or not it is positioned at the target position is confirmed, and when it is not arranged at the target position, the shift amount from the predetermined position is calculated, and the positioning operation is repeated.

Thereafter, the reference light is emitted from the pickup 11, the information recorded in the hologram recording medium 1 is read from the two-dimensional data detected in the photodetector 226 (step S423), and playback data is transmitted (step S424). When transmission of the playback data is completed, the playback process is ended (step S425).

Figure 22B:
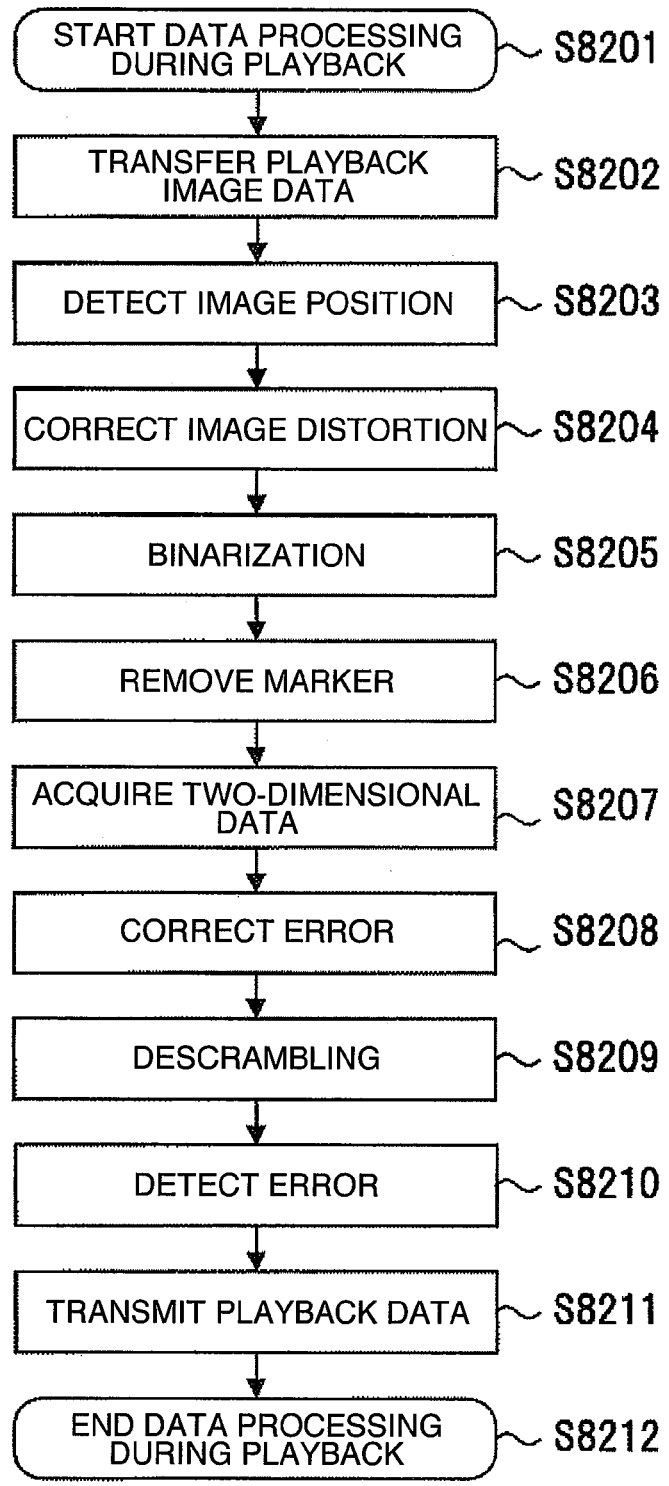
FIG. 22(b) is a data processing flow during playback.

FIG. 22 illustrate data processing flows during recording and playback, FIG. 22(*a*) illustrates a recording data processing flow in the signal generation circuit 81 after a recording data reception process S412 in the input/output control circuit 90 to conversion to the two-dimensional data on the spatial light modulator 212, and FIG. 22(*b*) illustrates a playback data processing flow in the signal processing circuit 82 after detection of the two-dimensional data in the photodetector 226 to a playback data transmission process S424 in the input/output control circuit 90.

Using FIG. 22(*a*), the data processing flow during recording will be described. When data processing during recording is started (step S8101), the signal generation circuit 81 receives recording data (step S8102). Then, the recording data is divided into a plurality of data rows, and the individual data rows are made into CRC so as to detect errors during playback (step S8103). Subsequently, for the purposes of making the number of ON pixels and the number of OFF pixels be almost equal and preventing repetition of the same pattern, scrambling of adding pseudo random number data rows to the data rows is executed (step S8104). Thereafter, error correction coding of Reed-Solomon codes or the like is performed so as to correct errors during playback (step S8105). Then, the data row is converted to M×N two-dimensional data, and by repeating it for one piece of pagedata, the two-dimensional data for one page is configured (step S8106). A marker to be a reference in image position detection and image distortion correction during playback is added to the two-dimensional data configured in this way (step S8107), and the data is transferred to the spatial light modulator 212 (step S8108). Thus, the data processing during recording is completed (step S8109).

Next, using FIG. 22(*b*), the data processing flow during playback will be described. When data processing during playback is started (step S8201), playback image data detected in the photodetector 226 is transferred to the signal processing circuit 82 (step S8202). Then, an image position is detected with the marker included in the image data as a reference (step S8203), and further, distortion such as inclination/magnification/distortion of images is corrected (step S8204). Thereafter, binarization is performed (step S8205), and the marker is removed (step S8206). Subsequently, the two-dimensional data for one page is acquired (step S8207). After converting the two-dimensional data obtained in this way into a plurality of data rows, an error correction process is performed, and parity data rows are removed (step S8208). Next, descrambling is performed (step S8209), and an error detection process by CRC is performed (step S8210). Finally, playback data generated by eliminating CRC parity is transmitted through the input/output control circuit 90 (step S8211). Thus, the data processing during playback is completed (step S8212).

FIG. 23 is a block diagram of the signal generation circuit 81 of the hologram recording and playback device 10.

When input of recording data to the input/output control circuit 90 is started, the input/output control circuit 90 notifies the controller 80 of the fact that the input of the recording data is started. The controller 80 receives the notice, and instructs the signal generation circuit 81 to perform the recording process of the data for one page inputted from the input/output control circuit 90. A processing instruction from the controller 80 is notified through a control line 8108 to a sub controller 8101 inside the signal generation circuit 81. Receiving the notice, the sub controller 8101 controls the individual signal processing circuits through the control line 8108 so as to operate the individual signal processing circuits in parallel. First, to a memory control circuit 8103, control is performed so as to store the recording data inputted from the input/output control circuit 90 through a data line 8109 to a memory 8102. When the recording data stored in the memory 8102 reaches a certain fixed amount, the control of making the recording data into CRC is performed in a CRC operation circuit 8104. Then, to the data made into the CRC, the control of executing scrambling of adding pseudo random number data rows in a scrambling circuit 8105 and performing error correction coding of adding parity data rows in an error correction coding circuit 8106 is performed. Finally, a pickup interface circuit 8107 is made to read the error correction coded data from the memory 8102 in an arrangement order of the two-dimensional data on the spatial light modulator 212, the marker to be a reference during playback is added, and then the two-dimensional data is transferred to the spatial light modulator 212 inside the pickup 11.

Figure 24:
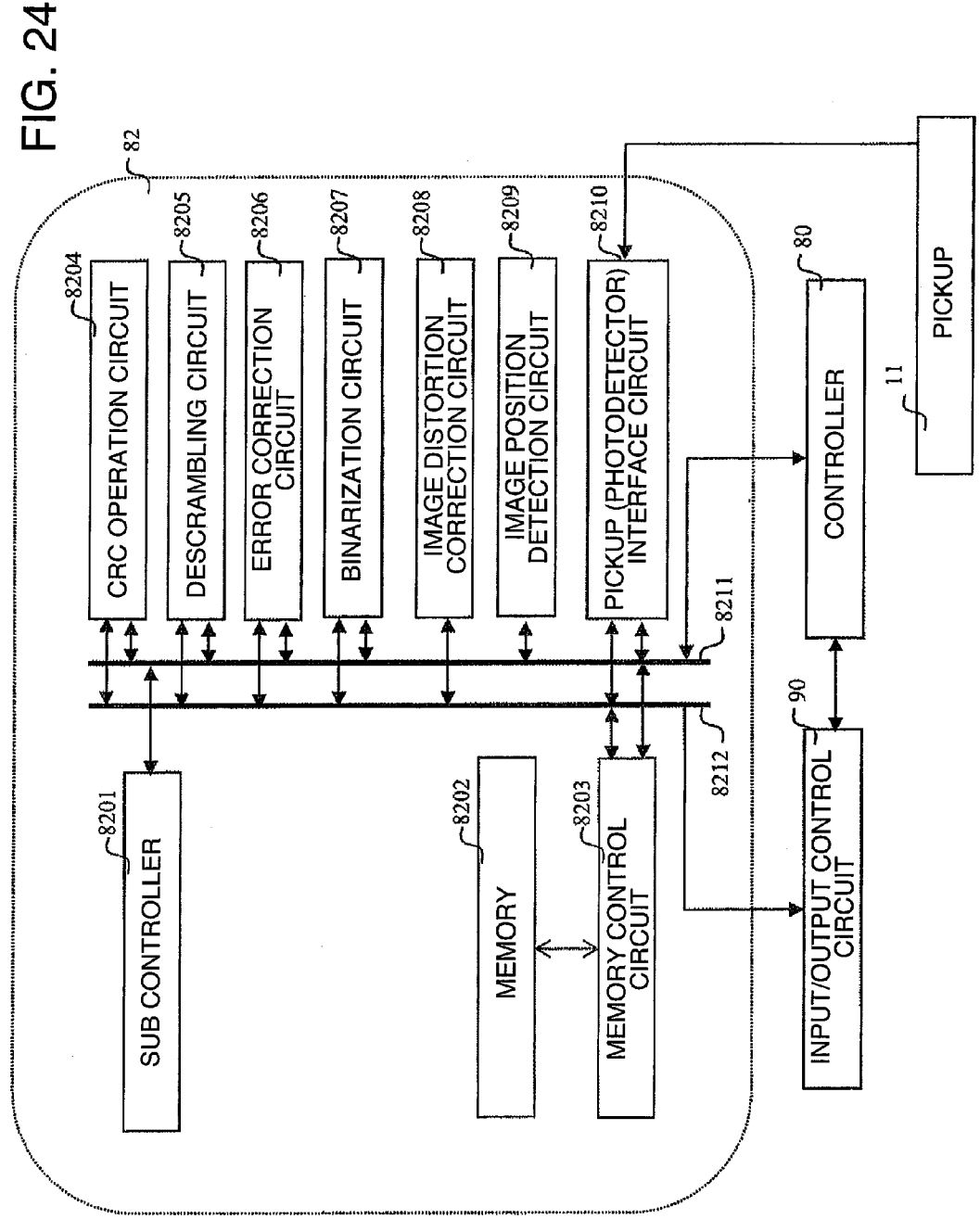
FIG. 24 is a block diagram of a signal processing circuit inside the hologram recording and playback device.
Figure 25A:
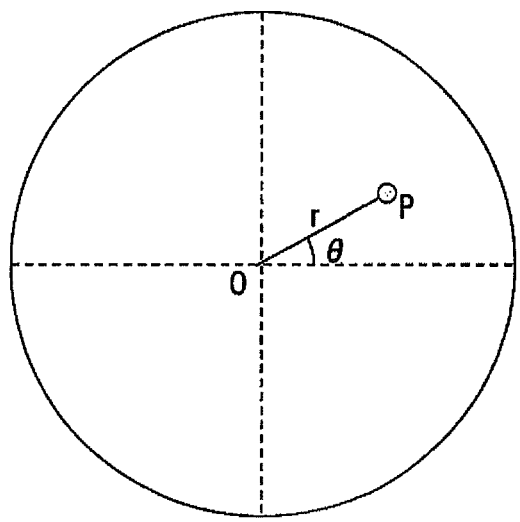
FIG. 25(a) is a diagram for illustrating the case that eccentricity does not exist.
Figure 25B:
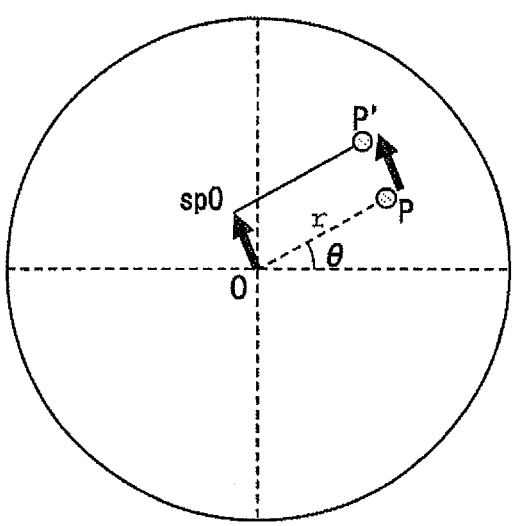
FIG. 25(b) is a diagram for illustrating the case that eccentricity exists.

FIG. 24 is a block diagram of the signal processing circuit 82 of the hologram recording and playback device 10.

When the photodetector 226 inside the pickup 11 detects image data, the controller 80 instructs the signal processing circuit 82 to perform a playback process of the data for one page inputted from the pickup 11. The processing instruction from the controller 80 is notified through a control line 8211 to a sub controller 8201 inside the signal processing circuit 82. Receiving the notice, the sub controller 8201 controls the individual signal processing circuits through the control line 8211 so as to operate the individual signal processing circuits in parallel. First, to a memory control circuit 8203, control is performed so as to store the image data inputted from the pickup 11 through a pickup interface circuit 8210 to a memory 8202. When the data stored in the memory 8202 reaches a certain fixed amount, the control of detecting the marker from the image data stored in the memory 8202 and extracting a valid data range is performed in an image position detection circuit 8209. Then, using the detected marker, in an image distortion correction circuit 8208, the control of correcting the distortion, such as the inclination/magnification/distortion of the images and converting the image data to an expected two-dimensional data size is performed. The control of binarizing each bit data of a plurality of bits configuring the size-converted two-dimensional data by determining "0" and "1" in a binarization circuit 8207, and storing the data in an arrangement of output of playback data on the memory 8202 is performed. Next, errors included in each data row is corrected in an error correction circuit 8206, scrambling of adding the pseudo random number data rows is canceled in a descrambling circuit 8205, and then it is confirmed that no error is included inside the playback data on the memory 8202 in a CRC operation circuit 8204. Thereafter, the playback data is transferred from the memory 8202 to the input/output control circuit 90.

Figure 13:
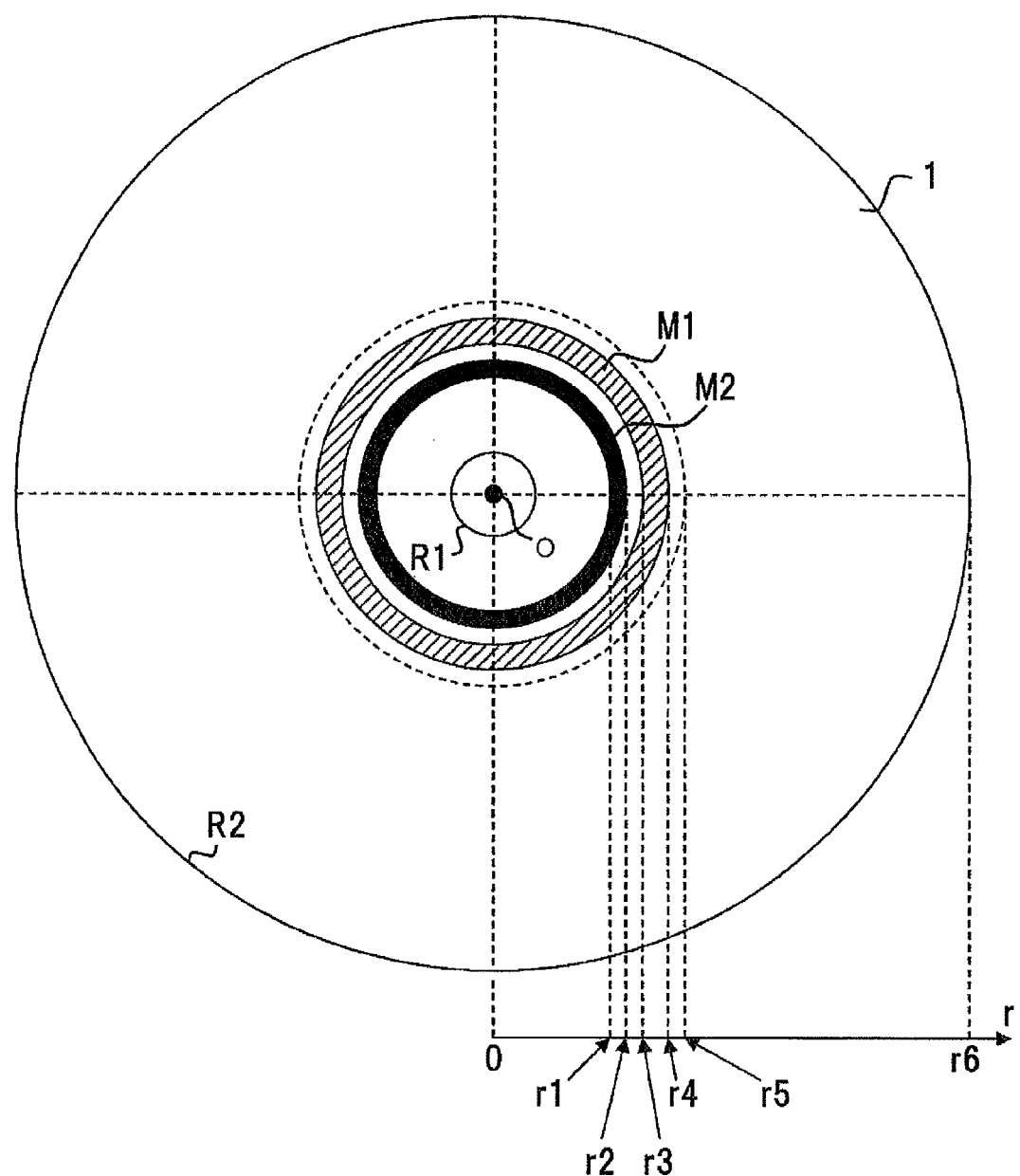
FIG. 13 is a diagram illustrating a hologram recording medium in the embodiment 1.

Next, two kinds of marks provided on the hologram recording medium 1 in the present embodiment will be described using FIG. 13. FIG. 13 illustrates the hologram recording medium 1, a circle R1 illustrates the innermost circumference of the medium, and a circle R2 illustrates the outermost circumference of the medium. A point O in FIG. 13 illustrates a geometrical center of the hologram recording medium 1. Also, in the following description, a variable r is a variable indicating a radius measured from the point O.

As illustrated in FIG. 13, in an area on an inner circumferential side of the hologram recording medium 1, a predetermined mark indicated by M2 is provided in the area of r1≤r≤r2, and a predetermined mark indicated by M1 is provided in the area of r3≤r≤r4. Also, an area to record user data as the hologram in the hologram recording medium 1 is r5≤r≤r6. That is, the marks M1 and M2 are provided more on the inner circumferential side than the area to record the user data as the hologram.

The mark M1 is the mark for angle detection, and the mark M2 is the mark for eccentricity detection. Next, using FIG. 14, fixing positions of the sensors that detect these two marks will be described.

Figure 14:
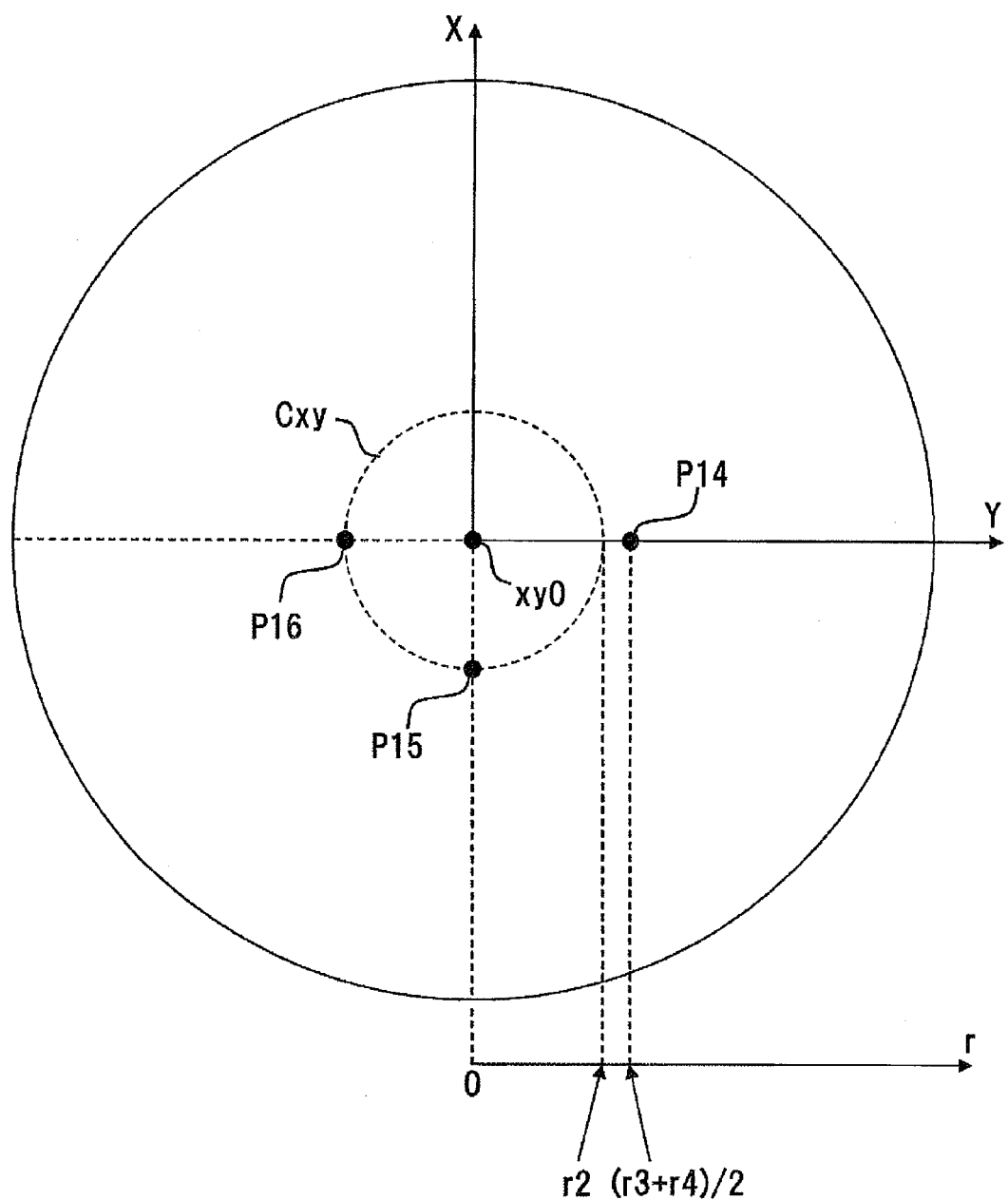
FIG. 14 is a diagram for illustrating a fixing position of each sensor in the embodiment 1.

As illustrated in FIG. 1, the moving stage 51, the rotation angle detection sensor 14, the first eccentricity detection sensor 15, and the second eccentricity detection sensor 16 are all fixed to the movable part of the radial direction conveyance unit 52. FIG. 14 is a diagram for illustrating the fixing positions of these individual sensors in the case that the movable part of the radial direction conveyance unit 52 is a reference.

A point xy0 indicates a drive reference position of the moving stage 51. For example, when movable ranges in an X direction and a Y direction of the moving stage 51 are both ±1 mm, a point moved from a movable end in a minus direction to a plus direction by 0.5 mm regarding an X axis and moved from the movable end in the minus direction to the plus direction by 0.5 mm regarding a Y axis is the point xy0. That is, when the movable part of the moving stage 51 is at the drive reference position xy0, it is assumed that the rotary shaft of the spindle motor 50 is positioned right above xy0.

As illustrated in the figure, a lateral direction in the figure is the Y axis, and a longitudinal direction is the X axis. A point P14 indicates a sensor center of the rotation angle detection sensor 14. Similarly, a point P15 indicates a sensor center of the first eccentricity detection sensor 15, and a point P16 indicates a sensor center of the second eccentricity detection sensor 16. P15 and P16 exist on a circle Cxy of a radius r2 with the point xy0 at the center. Here, in the present embodiment, "sensor center" denotes a center position of a light spot emitted by the sensor. Also, for example, arranging the rotation angle detection sensor 14 so that the center position of the light spot emitted by the rotation angle detection sensor 14 coincides with the point P14 is expressed as "arranging the rotation angle detection sensor 14 at the point P14".

From FIG. 14 and FIG. 13, when the movable part of the moving stage 51 is at the drive reference position xy0 and there is no eccentricity in the hologram recording medium 1, the rotation angle detection sensor 14 is positioned at the center of the mark M1 for angle detection provided in the area of r3≤r≤r4. Also, when the movable part of the moving stage 51 is at the drive reference position xy0 and there is no eccentricity in the hologram recording medium 1, the first eccentricity detection sensor 15 and the second eccentricity detection sensor 16 are positioned at an edge of the outer circumference of the mark M2 for eccentricity detection provided in the area of r1≤r≤r2.

Subsequently, features of the individual marks and signals outputted from the individual sensors will be described.

FIG. 15 is a schematic diagram of the mark M1 for angle detection and a diagram illustrating the signals outputted from the rotation angle detection sensor 14. As illustrated in FIG. 15, the mark M1 for angle detection is composed of a mark Mp for which a reflection part and a non-reflection part are repeated in a predetermined cycle p, and a mark Mz provided only once in one rotation of the medium. The mark Mz is a mark for generating Z phase signals to be described later, and the mark Mp is a mark for generating A phase signals and B phase signals to be described later.

As schematically illustrated in FIG. 15, detection light of a predetermined wavelength is emitted from the rotation angle detection sensor 14, and the light spot is generated on the mark Mp. The rotation angle detection sensor 14 detects the rotation angle by detecting light reflected at the mark Mp. In the case that the light spot emitted from the rotation angle detection sensor 14 to the mark Mp advances in a right direction of the figure, three kinds of signals illustrated in the figure are obtained as the output signals of the rotation angle detection sensor 14. The A phase signals and the B phase signals are rectangular waves outputted for eight cycles while moving through the cycle p of the mark Mp. Phases of the A phase signals and the B phase signals are different at 90 degrees, and the size of the phase changes depending on a moving direction of the light spot emitted to the mark Mp. That is, in the case that the light spot emitted to the mark Mp advances in the right direction of FIG. 15, output is such that the phase of the B phase signals is advanced by 90 degrees compared to the A phase signals. On the contrary, in the case that the light spot emitted to the mark Mp advances in a left direction of FIG. 15, the output is such that the phase of the B phase signals is delayed by 90 degrees compared to the A phase signals. Further, the Z phase signals are generated from the light spot (not shown in the figure) emitted to the mark Mz, and output a pulse of the same width as the A phase signals only once in the case that the medium is rotated once.

The A phase signals, the B phase signals and the Z phase signals are in a general output form as output signals of an incremental type encoder, and the rotation angle of the medium can be obtained from these three signals in the configuration of the present embodiment. As one example, an angle to be 0 degree is determined by the Z phase signals, and from the A phase signals and the B phase signals, by accumulating increase and decrease of the rotation angle, a present angle is computed. Since a phase difference between the A phase signals and the B phase signals is 90 degrees, the minimum resolution of the rotation angle detection sensor 14 in the present embodiment is an amount equivalent to ¼ of the cycle of the A phase signals, and is p/32 by distance conversion on the mark Mp. In order to convert a distance on the mark Mp to the rotation angle, since an arc and a radius in a sector are known, a center angle of the arc is obtained by calculation.

While the rotation angle detection sensor 14 is described by the configuration in FIG. 15 here, the present invention is not limited thereto. For example, it may be a sensor using a detection principle of an absolute type encoder. Or, while it is assumed that the A phase signals or the like which are the output signals of the rotation angle detection sensor 14 are logical signals (rectangular waves), it may be a sensor that outputs analog signals (sine waves, for example) capable of obtaining information equivalent to an angle.

The configuration of the incremental type encoder illustrated in FIG. 15 becomes a rotary encoder when the mark Mp is arranged in a circular shape, but becomes a line encoder when it is arranged in a straight line. That is, this system is usable also as a sensor that measures not only the rotation angle but also displacement in one direction. The radial position detection sensor 17 in the present embodiment is an incremental type line encoder. That is, in the above description, the rotation angle detection sensor 14 may be replaced with the radial position detection sensor 17, and further, the mark M1 for angle detection provided on the hologram recording medium 1 may be replaced with a predetermined pattern of the scale 18 fixed to the movable part of the radial direction conveyance unit 52. The A phase signals, the B phase signals and the Z phase signals are outputted similarly from the radial position detection sensor 17.

Next, features of the mark M2 for eccentricity detection and signals outputted from the first eccentricity detection sensor 15 and the second eccentricity detection sensor 16 will be described. The first eccentricity detection sensor 15 and the second eccentricity detection sensor 16 are just attached at different positions and are the ones of the same kind as the sensors. Therefore, the first eccentricity detection sensor 15 will be described below.

Figure 16A:
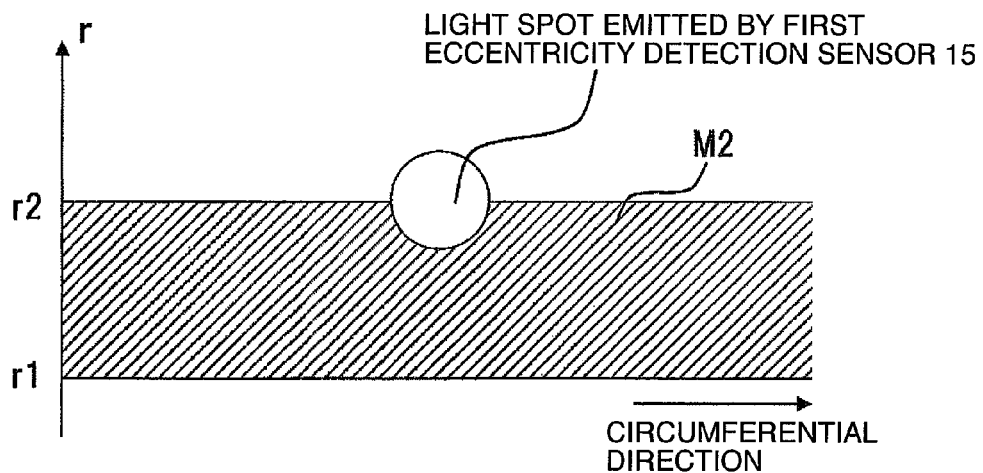
FIG. 16(a) is a diagram for illustrating a mark for eccentricity detection in the embodiment 1.

FIG. 16(a) is a schematic diagram of the mark M2 for eccentricity detection. For the mark M2 for eccentricity detection, a metal film is deposited over the area of r1≤r≤r2, and functions as a reflection part. That is, a hatched part in the figure is the reflection part and the other part is a non-reflection part. Also, the detection light of the predetermined wavelength is emitted from the first eccentricity detection sensor 15, and the light spot is generated on the mark M2. The first eccentricity detection sensor 15 detects the light reflected at the mark M2.

The sensor center of the first eccentricity detection sensor 15 is fixed at the position of the radius r2. Therefore, when the movable part of the moving stage 51 is at the drive reference position xy0 and there is no eccentricity in the hologram recording medium 1, the light spot emitted by the first eccentricity detection sensor 15 is positioned at the edge of the outer circumference of the mark M2 for eccentricity detection provided in the area of r1≤r≤r2 as illustrated in FIG. 16(a).

Figure 16B:
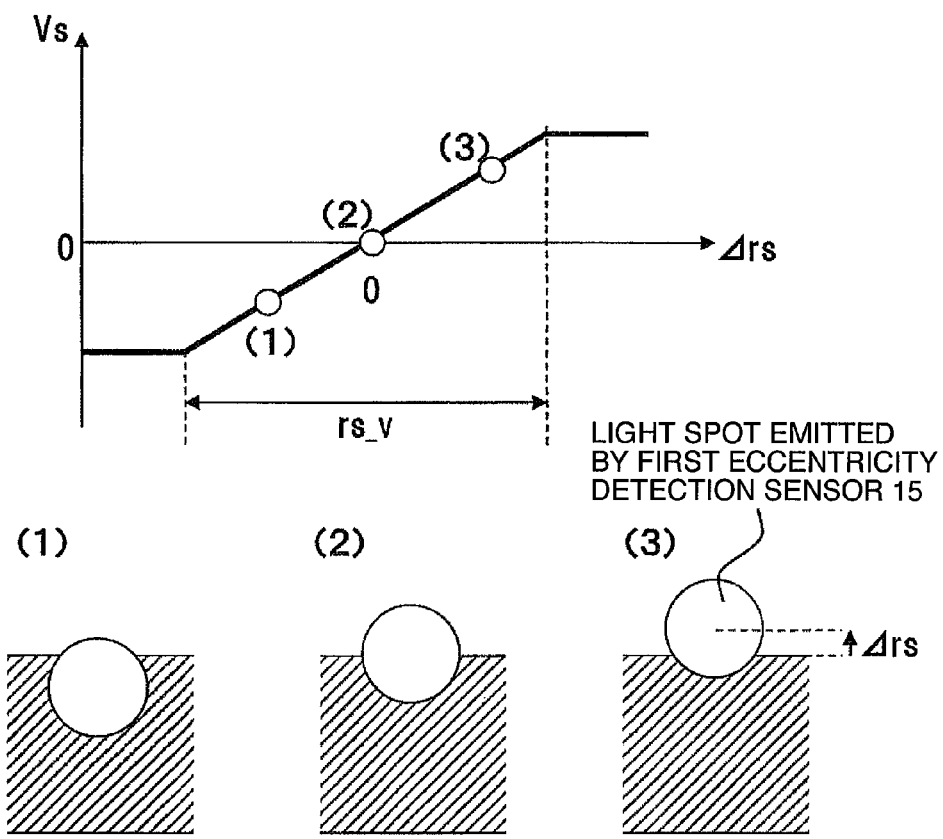
FIG. 16(b) is a diagram illustrating an output signal of a first eccentricity detection sensor in the embodiment 1.

FIG. 16(b) is a diagram illustrating the output signal of the first eccentricity detection sensor 15. There is one output signal from the first eccentricity detection sensor 15, and a voltage according to a relative positional relation between the light spot generated by the detection light and the mark M2 for eccentricity detection is outputted.

In the case that the movable part of the moving stage 51 is not at the drive reference position xy0, or in the case that there is the eccentricity in the hologram recording medium 1, as illustrated in (1) or (3) of FIG. 16(b), the light spot emitted by the first eccentricity detection sensor 15 and the edge of the outer circumference of the mark M2 for eccentricity detection may be shifted in a radial direction. A difference between relative positions in the radial direction of the light spot emitted by the first eccentricity detection sensor 15 and the edge of the outer circumference of the mark M2 for eccentricity detection is indicated by Δrs. In the case that Δrs exists, a light quantity of light which is reflected at the mark M2 for eccentricity detection and returns to the first eccentricity detection sensor 15 changes. By detecting it, a sensor that outputs the voltage according to the relative positional relation between the light spot and the mark M2 for eccentricity detection can be achieved.

A relation between the difference Δrs between the relative positions in the radial direction and an output voltage Vs from the first eccentricity detection sensor 15 is illustrated in FIG. 16(b). That is, in a predetermined detection range rs_v, the output voltage Vs is a voltage proportional to the difference Δrs between the relative positions in the radial direction of the first eccentricity detection sensor 15 and the mark M2 for eccentricity detection. Also, when the output voltage Vs becomes zero, the light spot emitted by the first eccentricity detection sensor 15 is positioned at the edge of the outer circumference of the mark M2 for eccentricity detection. Regarding the first eccentricity detection sensor 15, a direction of taking Δrs is a negative direction of the X axis.

As illustrated in FIG. 14, the first eccentricity detection sensor 15 is arranged on the X axis in orthogonal coordinate axes with the drive reference position xy0 as an origin. Also, the second eccentricity detection sensor 16 is arranged on the Y axis in the orthogonal coordinate axes with the drive reference position xy0 as the origin. By orthogonally arranging the sensors capable of detecting the relative position with the mark M2 for eccentricity detection, the position of the mark M2 for eccentricity detection can be detected. Further, when the moving stage 51 can be controlled so as to turn the output voltages of both sensors to zero, the position of the hologram recording medium 1 can be controlled so that the edge of the mark M2 for eccentricity detection is positioned right above both sensors (that is, the center of the light spot emitted by both sensors is positioned at the edge of the mark M2 for eccentricity detection).

While the rotation angle detection sensor 14, the first eccentricity detection sensor 15 and the second eccentricity detection sensor 16 all emit the light spot to the hologram recording medium 1 as the detection light for detecting the mark, it is preferable that a wavelength of the detection light is different from a wavelength of the reference light. Since the wavelength of the signal light and the wavelength of the reference light are the same, it may be expressed that it is different from the wavelength of the signal light. This is because when a non-recorded hologram recording medium is irradiated with the light of the wavelength close to the wavelength of the reference light, it is known that playback quality in the case of recording a hologram at the irradiation position thereafter is degraded. In the case that the wavelength of the signal light and the wavelength of the reference light are both 405 nm for example, as the detection light, for example, the light of the wavelength being 650 nm which is different from the wavelength of the reference light by 100 nm or more can be used.

Next, the configurations of the individual control circuits in the present embodiment will be described.

Figure 17:
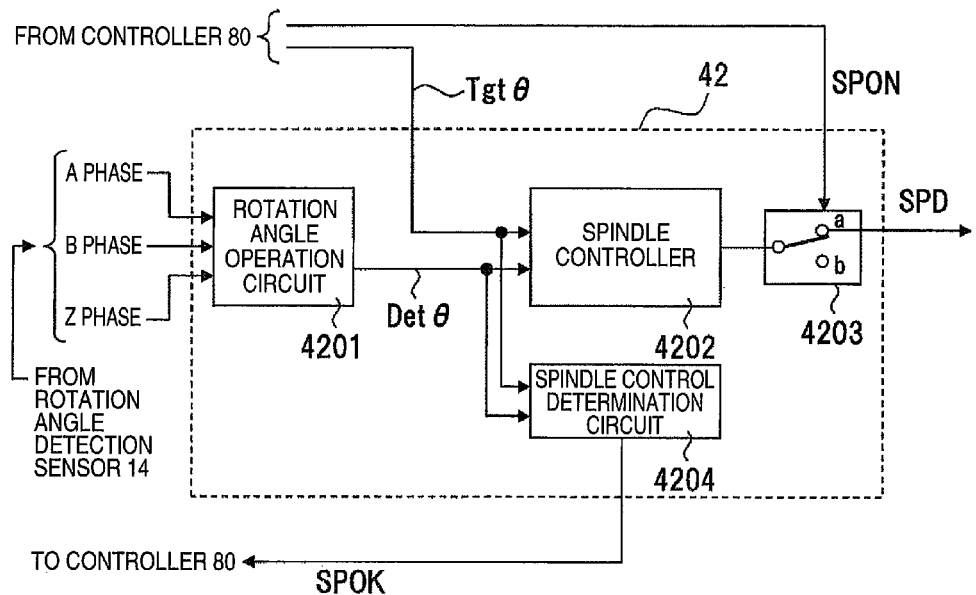
FIG. 17 is a block diagram illustrating a configuration of a spindle control circuit in the embodiment 1.

The configuration of the spindle control circuit 42 in the present embodiment will be described using FIG. 17. The spindle control circuit 42 is composed of a rotation angle operation circuit 4201, a spindle controller 4202, a spindle output control switch 4203, and a spindle control determination circuit 4204. The spindle control circuit 42 controls the spindle motor 50 so that the rotation angle of the hologram recording medium 1 becomes an angle command value Tgtθ from the controller 80, on the basis of the command signal from the controller 80. This control is called spindle control in the present description.

The rotation angle operation circuit 4201 receives the A phase signal, the B phase signal and the Z phase signal outputted by the rotation angle detection sensor 14 as the input, computes a rotation angle Detθ of the hologram recording medium 1 at present from the three signals, and outputs it as a Detθ signal. The spindle controller 4202 receives the Detθ signal and an angle command Tgtθ signal from the controller 80 as the input, and outputs a drive signal for controlling the spindle motor 50.

The spindle output control switch 4203 receives the output signal of the spindle controller 4202 as the input, and controls whether or not to output the output signal of the spindle controller 4202 according to a control signal SPON from the controller 80. When the SPON signal is High, the spindle output control switch 4203 selects a terminal (a), and outputs the output signal of the spindle controller 4202 as an SPD signal. On the other hand, when the SPON signal is Low, the spindle output control switch 4203 selects a terminal b, outputs a reference potential as the SPD signal, and does not output the output signal of the spindle controller 4202. As a result, the SPON signal becomes a signal that instructs ON/OFF of the spindle control. Also, the spindle output control switch 4203 functions as a switch that switches ON/OFF of the spindle control. The SPD signal outputted from the spindle output control switch 4203 is amplified by the spindle drive circuit 43, and the spindle motor 50 is controlled.

The spindle control determination circuit 4204 receives the Detθ signal and the Tgtθ signal as the input, determines whether or not the rotation angle of the hologram recording medium 1 is a value near the angle command value Tgtθ, and performs output as a SPOK signal. It is assumed that, in the case that the rotation angle of the hologram recording medium 1 is the value near the angle command value Tgtθ, the SPOK signal becomes High. The spindle control determination circuit 4204 can be achieved, for example, by being a circuit that measures elapsed time after a difference between the present angle Detθ detected by the rotation angle detection sensor 14 and the angle command value Tgtθ becomes a predetermined threshold or smaller, and makes a determination by continuation of the measured time for the predetermined time or longer. The SPOK signal which is a determination result is inputted to the controller 80. Therefore, the controller 80 can determine whether or not the rotation angle of the hologram recording medium 1 is the value near the angle command value Tgtθ. That is, the spindle control determination circuit 4204 functions as a circuit that determines convergence of the spindle control.

Figure 18:
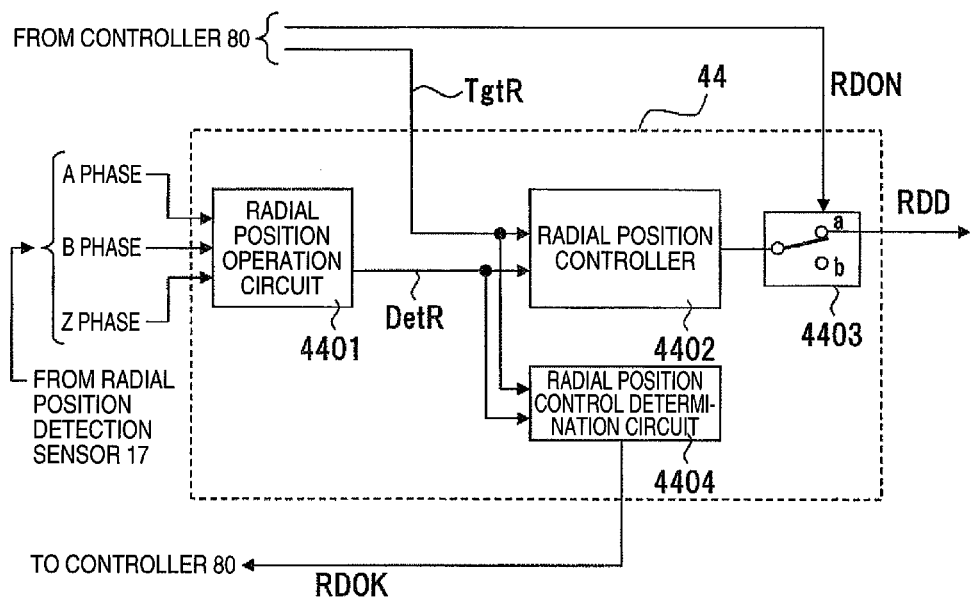
FIG. 18 is a block diagram illustrating a configuration of a radial direction conveyance control circuit in the embodiment 1.

The configuration of the radial direction conveyance control circuit 44 in the present embodiment will be described using FIG. 18. The radial direction conveyance control circuit 44 is composed of a radial position operation circuit 4401, a radial position controller 4402, a radial position output control switch 4403, and a radial position control determination circuit 4404. The radial direction conveyance control circuit 44 controls the radial direction conveyance unit 52 so that the position of the movable part of the radial direction conveyance unit 52 becomes a position command value TgtR from the controller 80, on the basis of the command signal from the controller 80. This control is called radial position control in the present description. As is clear from comparison between FIG. 17 and FIG. 18, the configuration of the radial direction conveyance control circuit 44 is similar to the configuration of the spindle control circuit 42.

The radial position operation circuit 4401 receives the A phase signal, the B phase signal and the Z phase signal outputted by the radial position detection sensor 17 as the input, computes a radial position DetR of the hologram recording medium 1 at present from the three signals, and outputs it as a DetR signal. The radial position controller 4402 receives the DetR signal and a radial position command TgtR signal from the controller 80 as the input, and outputs a drive signal for controlling the radial direction conveyance unit 52.

The radial position output control switch 4403 receives the output signal of the radial position controller 4402 as the input, and controls whether or not to output the output signal of the radial position controller 4402 according to a control signal RDON from the controller 80. When the RDON signal is High, the radial position output control switch 4403 selects a terminal c, and outputs the output signal of the radial position controller 4402 as an RDD signal. On the other hand, when the RDON signal is Low, the radial position output control switch 4403 selects a terminal d, outputs a reference potential as the RDD signal, and does not output the output signal of the radial position controller 4402. As a result, the RDON signal becomes a signal that instructs ON/OFF of the radial position control. Also, the radial position output control switch 4403 functions as a switch that switches ON/OFF of the radial position control. The RDD signal outputted from the radial position output control switch 4403 is amplified by the radial direction conveyance drive circuit 45, and the radial direction conveyance unit 52 is controlled.

The radial position control determination circuit 4404 receives the DetR signal and the TgtR signal as the input, determines whether or not the radial position of the hologram recording medium 1 is a value near the radial position command value TgtR, and performs output as an RDOK signal. It is assumed that, in the case that the radial position of the hologram recording medium 1 is the value near the radial position command value TgtR, the RDOK signal becomes High. The radial position control determination circuit 4404 can be achieved, for example, by being a circuit that measures elapsed time after a difference between the present radial position DetR detected by the radial position detection sensor 17 and the radial position command value TgtR becomes a predetermined threshold or smaller, and makes a determination by continuation of the measured time for the predetermined time or longer. The RDOK signal which is a determination result is inputted to the controller 80. Therefore, the controller 80 can determine whether or not the radial position of the hologram recording medium 1 is the value near the radial position command value TgtR. That is, the radial position control determination circuit 4404 functions as a circuit that determines convergence of the radial position control.

The spindle control determination circuit 4204 in the present embodiment is configured to measure the elapsed time after the difference between the present angle Detθ and the angle command value Tgtθ becomes the predetermined threshold or smaller, and make a determination by the continuation of the measured time for the predetermined time or longer. However, the spindle control determination circuit 4204 may be a different configuration as long as whether or not the rotation angle of the hologram recording medium 1 is the value near the angle command value Tgtθ can be determined. For example, the configuration may be such that, when the present angle Detθ becomes equal to the angle command value Tgtθ even once, the SPOK signal is made High at the point of time. It is similar for the radial position control determination circuit 4404.

The configuration of the eccentricity compensation circuit 40 and the moving stage drive circuit 41 in the present embodiment will be described using FIG. 19. The eccentricity compensation circuit 40 is composed of an X axis compensator 4001, an X axis output control switch 4002, a Y axis compensator 4003, a Y axis output control switch 4004, and an eccentricity compensation determination circuit 4005. Also, the moving stage drive circuit 41 is composed of an X axis drive circuit 4101 and a Y axis drive circuit 4102. The eccentricity compensation circuit 40 controls the moving stage 51 so that the hologram recording medium 1 is positioned with the mark for eccentricity detection as a reference, on the basis of the command signal from the controller 80. This control is called eccentricity compensation control in the present description.

The output signal of the first eccentricity detection sensor 15 is inputted to the X axis compensator 4001, and a drive signal for driving the X axis of the moving stage 51 is generated. The X axis output control switch 4002 receives the output signal of the X axis compensator 4001 as the input, and controls whether or not to output the output signal of the X axis compensator 4001 according to a control signal XYON from the controller 80. When the XYON signal is High, the X axis output control switch 4002 selects a terminal (a), and outputs the output signal of the X axis compensator 4001 as an XD signal. On the other hand, when the XYON signal is Low, the X axis output control switch 4002 selects a terminal b, outputs a reference potential as the XD signal, and does not output the output signal of the X axis compensator 4001. The XD signal outputted from the X axis output control switch 4002 is amplified by the X axis drive circuit 4101, and the X axis of the moving stage 51 is controlled.

The output signal of the second eccentricity detection sensor 16 is inputted to the Y axis compensator 4003, and a drive signal for driving the Y axis of the moving stage 51 is generated. The Y axis output control switch 4004 receives the output signal of the Y axis compensator 4003 as the input, and controls whether or not to output the output signal of the Y axis compensator 4003 according to the control signal XYON from the controller 80. When the XYON signal is High, the Y axis output control switch 4004 selects the terminal c, and outputs the output signal of the Y axis compensator 4003 as a YD signal. On the other hand, when the XYON signal is Low, the Y axis output control switch 4004 selects the terminal d, outputs a reference potential as the YD signal, and does not output the output signal of the Y axis compensator 4003. The YD signal outputted from the Y axis output control switch 4004 is amplified by the Y axis drive circuit 4102, and the Y axis of the moving stage 51 is controlled.

The eccentricity compensation determination circuit 4005 receives the output signal of the first eccentricity detection sensor 15 and the output signal of the second eccentricity detection sensor 16 as the input, determines whether or not positioning of the hologram recording medium 1 with the mark for eccentricity detection as a reference is completed, and performs output as an XYOK signal. It is assumed that, in the case that positioning of the hologram recording medium 1 with the mark for eccentricity detection as a reference is completed, the XYOK signal becomes High. The XYOK signal is inputted to the controller 80. Therefore, the controller 80 can determine whether or not positioning of the hologram recording medium 1 with the mark for eccentricity detection as a reference is completed. That is, the eccentricity compensation determination circuit 4005 functions as a circuit that determines convergence of the eccentricity compensation control.

Here, control performed in the X axis compensator 4001 and the Y axis compensator 4003 will be described. First, the eccentricity compensation determination circuit 4005 is an attached circuit. Therefore, as is clear from FIG. 19, for a control system related to the eccentricity compensation circuit 40 and the moving stage drive circuit 41, a control system related to the X axis, which is indicated by a broken line (A), and a control system related to the Y axis, which is indicated by a broken line (B), are independent. That is, while the output signal of the first eccentricity detection sensor 15 and the output signal of the second eccentricity detection sensor 16 are inputted to the eccentricity compensation circuit 40, only the output signal of the first eccentricity detection sensor 15 is used in the control of the X axis of the moving stage 51, and similarly only the output signal of the second eccentricity detection sensor 16 is used in the control of the Y axis of the moving stage 51.

In the X axis compensator 4001, the control is performed so that a voltage of the output signal of the first eccentricity detection sensor 15 that is inputted becomes zero. In the Y axis compensator 4003, the control is performed so that a voltage of the output signal of the second eccentricity detection sensor 16 that is inputted becomes zero. These are general feedback control, and the X axis compensator 4001 and the Y axis compensator 4003 can be achieved by a general CPU for example.

As described using FIG. 16 and FIG. 14, turning both of the output voltage of the first eccentricity detection sensor 15 and the output voltage of the second eccentricity detection sensor 16 to zero is equivalent to controlling the position of the hologram recording medium 1 so as to position the edge of the mark M2 for eccentricity detection right above both sensors. Therefore, by the operations of the X axis compensator 4001 and the Y axis compensator 4003 described above, the position of the hologram recording medium 1 can be controlled so as to position the edge of the mark M2 for eccentricity detection right above both sensors.

The case that there is eccentricity in the hologram recording medium 1 is, when describing it using FIG. 13, the case that the geometrical center of the circle R1 at the innermost circumference of the medium does not coincide with O. Even in that case, the moving stage 51 controls the position of the hologram recording medium 1 using the mark M2 for eccentricity detection. Specifically, the control is performed so that the geometrical center O of the mark M2 for eccentricity detection coincides with the drive reference position of the moving stage 51.

Here, the position to be irradiated with the signal light and/or the reference light is a position fixed to the device. Therefore, even in the case that there is the eccentricity, the operation is performed so as to position the hologram recording medium 1 with the mark for eccentricity detection as a reference. This can be rephrased that the control can be performed so as to irradiate a position for which the eccentricity is cancelled with the signal light and/or the reference light.

Figure 19:
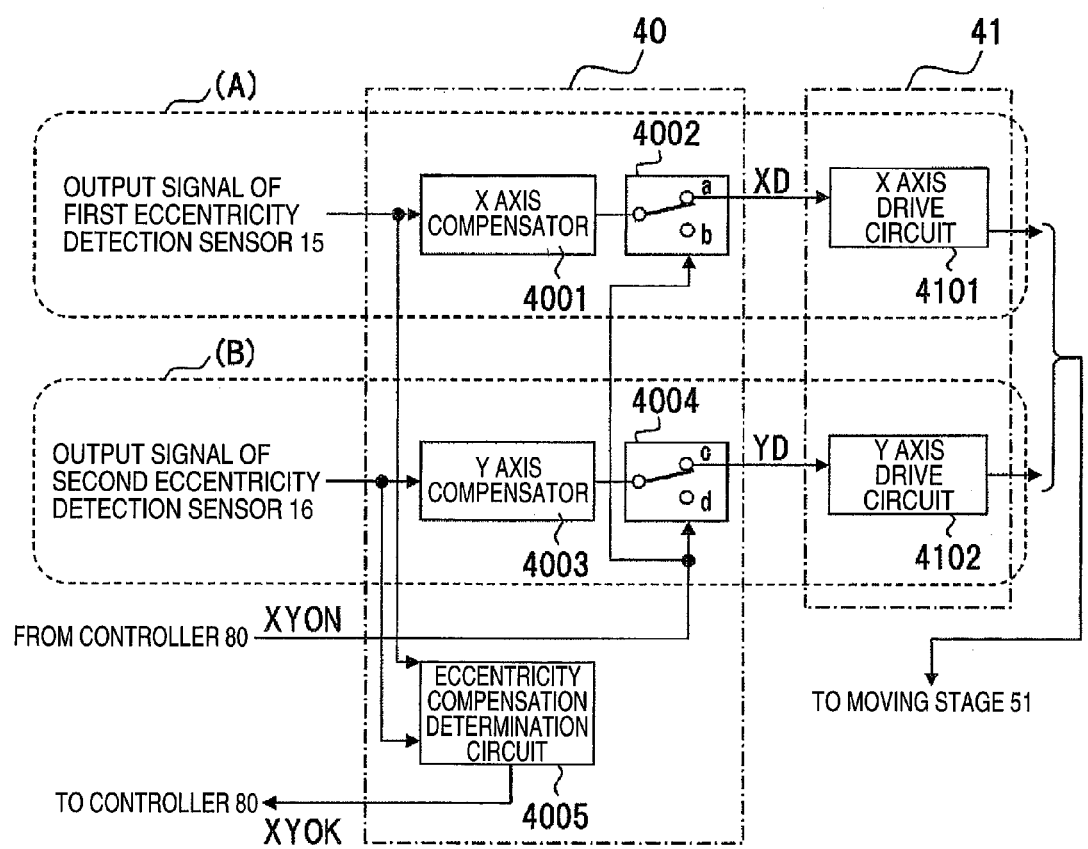
FIG. 19 is a block diagram illustrating a configuration of an eccentricity compensation circuit and a moving stage drive circuit in the embodiment 1.

However, as described in FIG. 19, in order to independently control the X axis and the Y axis, there is limitation regarding arrangement of the sensors. In the present embodiment, the first eccentricity detection sensor 15 and the second eccentricity detection sensor 16 are arranged orthogonally regarding the drive reference position xy0, and the orthogonally intersecting direction is the same as a direction of a drive axis of the moving stage 51. Next, a reason to adopt such a configuration will be described.

Figure 20A:
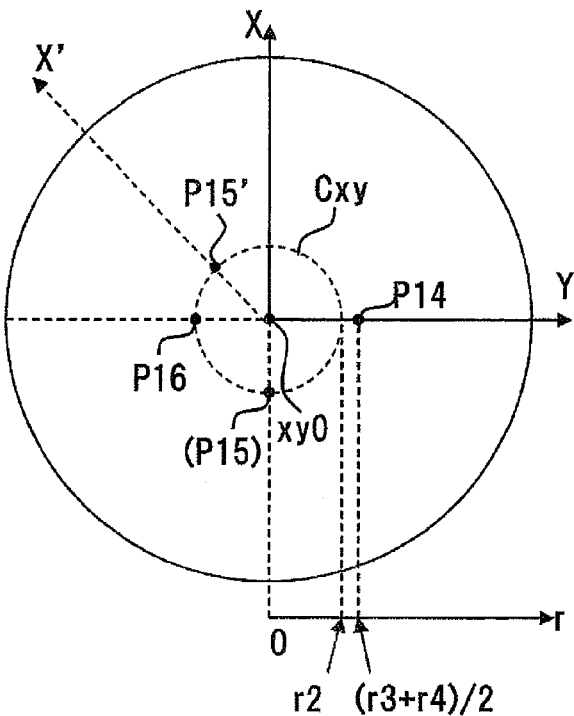
FIG. 20(a) is a diagram for illustrating the case of changing the fixing position of the first eccentricity detection sensor.

As one example, as illustrated in FIG. 20(a), the case that the fixing position of the first eccentricity detection sensor 15 is changed to P15' is considered. Only the fixing position of the first eccentricity detection sensor 15 is different from the case of FIG. 14. It is assumed that P15' is on a straight line forming 45 degrees with a Y axis negative direction. In FIG. 20(a), a direction forming 45 degrees with the Y axis negative direction is indicated as an X' axis.

Also, as a prerequisite of the following description, the spindle control circuit 42, the radial direction conveyance control circuit 44 and the eccentricity compensation circuit 40 are of the configuration in common with the description so far. That is, the configuration is such that, on the basis of the output signal of the first eccentricity detection sensor 15, the eccentricity compensation circuit 40 drives the X axis of the moving stage 51.

Figure 20B:
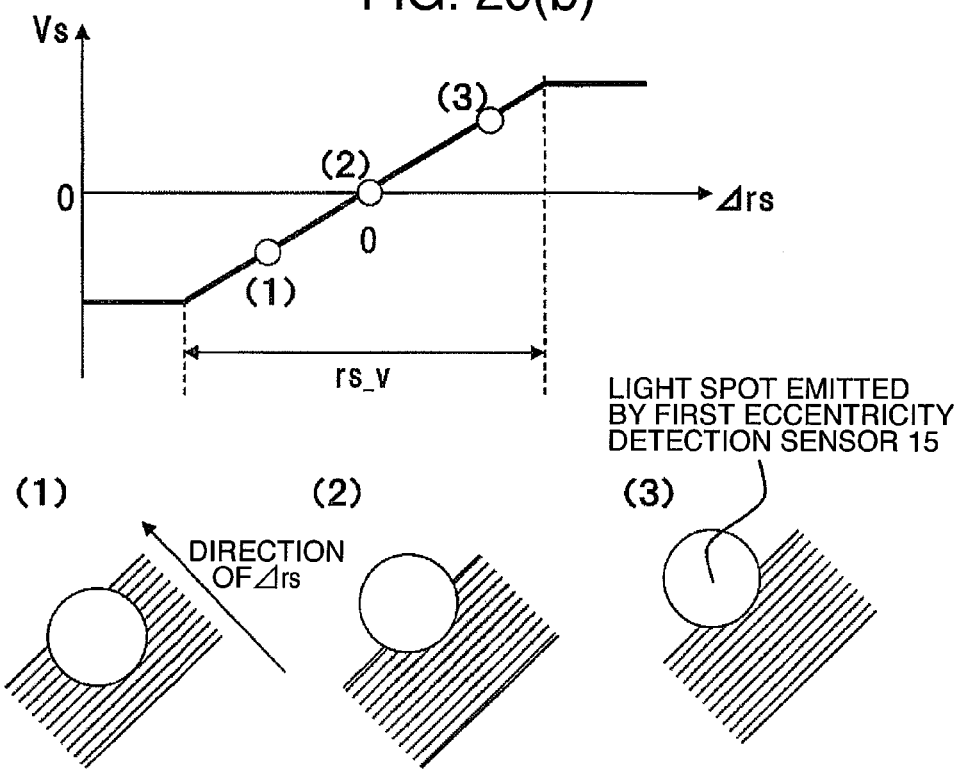
FIG. 20(b) is a diagram for illustrating the output signal of the first eccentricity detection sensor in the case of changing the fixing position of the first eccentricity detection sensor.

The output signal of the first eccentricity detection sensor 15 in the case of arranging the first eccentricity detection sensor 15 at the position P15' is as illustrated in FIG. 20(b). That is, the direction of taking Δrs is not the X axial direction but is an X' axial direction. When the way of taking Δrs is changed like this, a relation between Δrs and the output voltage Vs becomes the same as that in the case of FIG. 16(b).

However, when actually performing the control, the control system needs to be independent near a target point of the control. Specifically, in the case of FIG. 20(a), a situation that the hologram recording medium 1 is moved to left for a minute distance is considered. In this case, only Y axis needs to be moved by the moving stage 51. However, in the case of FIG. 20(a), the edge of the mark M2 for eccentricity detection is inclined by 45 degrees near the point P15'. Therefore, in the case that the hologram recording medium 1 is moved to the left for the minute distance, the output of the first eccentricity detection sensor 15 also fluctuates. As a result, there is a possibility that the control by the eccentricity compensation circuit 40 is not converged. Further in the worst case, there is a possibility that the control of two axes that are the X axis and the Y axis by the moving stage 51 oscillates. This becomes a problem especially in the case that a response speed of the control system of the X axis and a response speed of the control system of the Y axis are equal.

On the other hand, in the case that the first eccentricity detection sensor 15 is arranged at the position P15 as in the configuration of the present embodiment, the situation that the hologram recording medium 1 is moved to the left for the minute distance similarly is considered. In this case, it is clear that displacement in the X axial direction of the edge of the mark M2 for eccentricity detection near the point P15 is roughly zero, since a tangent of the circle Cxy becomes parallel to the Y axis at the point P15. Therefore, in the case of the configuration of the present embodiment, the X axis is scarcely driven, and only the Y axis is driven. Therefore, the problem does not occur in the configuration of the present embodiment.

As a result of performing such an operation simultaneously for the X axis and the Y axis, the control of the two axes by the moving stage 51 is converged to a preferable position without oscillating. From the above, it is suitable to arrange the first eccentricity detection sensor 15 and the second eccentricity detection sensor 16 orthogonally regarding the drive reference position xy0.

As is clear from the description above, the limitation regarding the arrangement of the sensors is that the tangent of the circle Cxy at the point P15 and the point P16 which are the points to arrange the eccentricity detection sensors are parallel to the drive axis of the moving stage 51.

Next, a seek process S414 in the present embodiment will be described using a flowchart in FIG. 5. The flowchart is the same for a seek process S422, too. Here, in seek in the case that the hologram recording medium 1 has the disk shape as in the present embodiment, the radius r and the rotation angle θ are parameters. Hereinafter, a drive axis of the radius r is called an r axis, and a drive axis of the rotation angle θ is called a θ axis.

In the present embodiment, the eccentricity compensation control is started by making the XYON signal High in a learning process step S404 performed before the seek process S414. Therefore, at the point of starting the seek process S414, the eccentricity compensation control is an ON state.

When the seek process is started (step S501), a difference between coordinates (r, θ) where a hologram of a target address is positioned and a present position is calculated, and a moving amount is calculated for the r axis and the θ axis (step S502). Next, whether or not the moving amount of the r axis is other than zero is determined (step S503). When the moving amount of the r axis is other than zero (in the case of Yes in step S503), the radial position control is turned ON by making the RDON signal High, the command value TgtR is changed, and the movement of the r axis is started (step S504). Following step S504, the process shifts to step S505 to be described later. Also, when the moving amount of the r axis is zero (in the case of No in step S503), the process shifts to step S505 without performing step S504.

In step S505, whether or not the moving amount of the θ axis is other than zero is determined. When the moving amount of the θ axis is other than zero (in the case of Yes in step S505), the spindle control is turned ON by making the SPON signal High, the command value Tgtθ is changed, and the movement of the θ axis is started (step S506). Following step S506, the process shifts to step S507 to be described later. Also, when the moving amount of the θ axis is zero (in the case of No in step S505), the process shifts to step S507 without performing step S506.

In step S507, whether or not the movement is completed is determined. Here, it is determined that the movement is completed by the fact that the RDOK signal, the SPOK signal and the XYOK signal are all at a High level.

In the case of determining that the movement is not completed (In the case of No in step S507), the process returns to step S507. That is, when any one of the RDOK signal, the SPOK signal and the XYOK signal is at a Low level, it is not determined that the movement is completed, and an operation of standing by until all the three signals are simultaneously turned to the High level is performed.

When it is determined that the movement is completed (in the case of Yes in step S507), by making both of the RDON signal and the SPON signal Low, the radial position control and the spindle control are turned OFF and the movement is ended (step S508).

Subsequently, the controller 80 changes the incident angle of the reference light by outputting the command value Tgtφ of the incident angle of the reference light (step S509). The command value Tgtφ to be outputted here is the incident angle corresponding to the page of the hologram positioned in the seek process.

Next, whether or not it is the seek process during playback is determined (step S510). In the case of not being the seek process during playback (in the case of No in step S510), the process advances to step S518 to be described later, and the seek process is ended. In the case of the seek during playback (in the case of Yes in step S510), the seek process is not ended here, and the seek process is continued until positioning is correctly performed at the target address by the address information obtained by playing back the recorded hologram finally. This is because the seek during recording is the seek to a non-recording part and the address information cannot be obtained.

In the case of the seek during playback (in the case of Yes in step S510), an orthogonal incident angle optimization process is performed (step S511). Details of the orthogonal incident angle optimization process will be described later.

After step S511, whether or not the light quantity of the diffracted light is larger than a threshold L_th is determined (step S512). In the case that the light quantity of the diffracted light is larger than the threshold L_th (in the case of Yes in step S512), whether or not the hologram can be played back is determined (step S513).

In the case that the light quantity of the diffracted light is smaller than the threshold L_th (in the case of No in step S512) and in the case that the light quantity of the diffracted light is larger than the threshold L_th but the hologram is no good for playback (in the case of No in step S513), it means that positioning cannot be correctly performed. Therefore, based on a predetermined retry parameter, r axis and θ axis retry values are calculated (step S514) and the process returns to step S502. Thus, retry seek of moving to the vicinity of positioning is performed.

In the case that the hologram can be played back (in the case of Yes in step S513), the address information included in the played-back hologram is acquired (step S515). Subsequently, whether or not the acquired address is the target address is determined (step S516). In the case that the acquired address is not the target address (in the case of No in step S516), it means that positioning cannot be correctly performed. Therefore, a difference between the coordinates (r, θ) of the acquired address and the coordinates (r, θ) of the target address is calculated (step S517), and the process returns to step S502. Thus, the retry seek based on the address information of the hologram is performed.

In the case that the acquired address is the target address (in the case of Yes in step S516), the seek process is ended (step S518).

Here, in the flowchart of the present embodiment, there is a specific feature in that, in the case of the seek of driving only the θ axis with the moving amount of the r axis being zero for example, even when the spindle control is converged to the vicinity of the angle command value Tgtθ and the SPOK signal is High, if the XYOK signal outputted by the eccentricity compensation determination circuit 4005 is not High, the spindle control is not turned OFF (that is, the output signal of the spindle controller 4202 is continuously outputted as the SPD signal). In the configuration of a conventional technology not having a circuit corresponding to the eccentricity compensation circuit 40 in the present embodiment, the SPOK signal functions as a convergence determination circuit for the spindle control, and when the SPOK signal becomes High, the spindle control can be purely turned OFF. However, in the present embodiment, this is not done. The reason will be described later.

Figure 6:
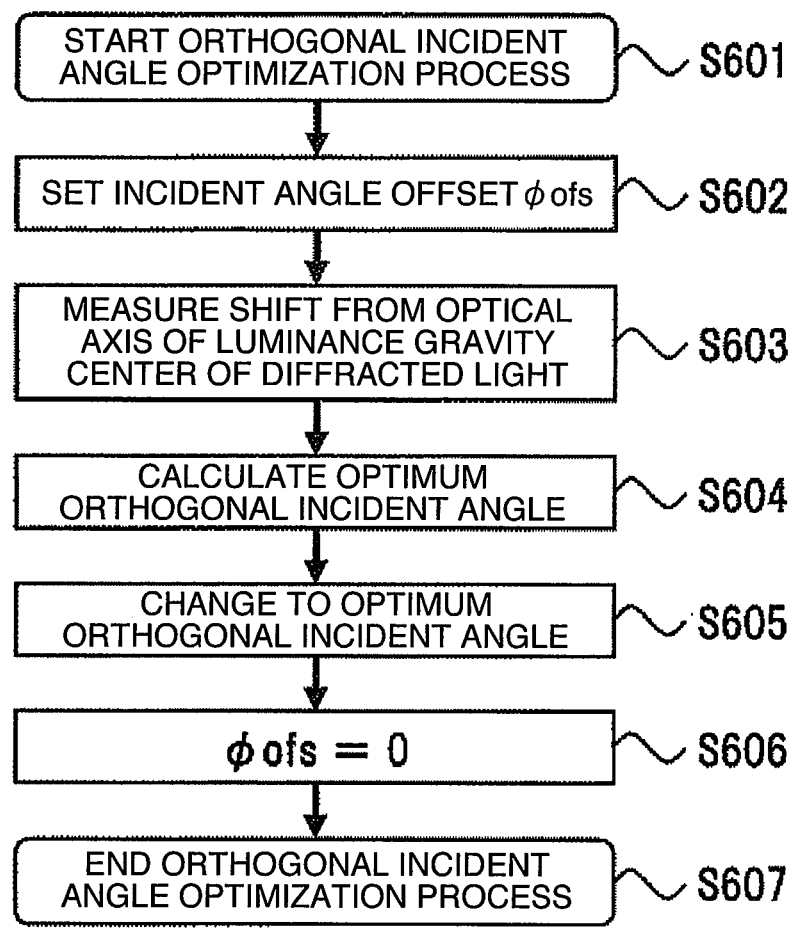
FIG. 6 is a flowchart of an orthogonal incident angle optimization process in the embodiment 1.

Next, the orthogonal incident angle optimization process in the present embodiment will be described using a flowchart in FIG. 6.

When the orthogonal incident angle optimization process is started (step S601), the controller 80 instructs the incident angle offset output circuit 26 to set the incident angle offset φofs at a predetermined value.

Figure 5:
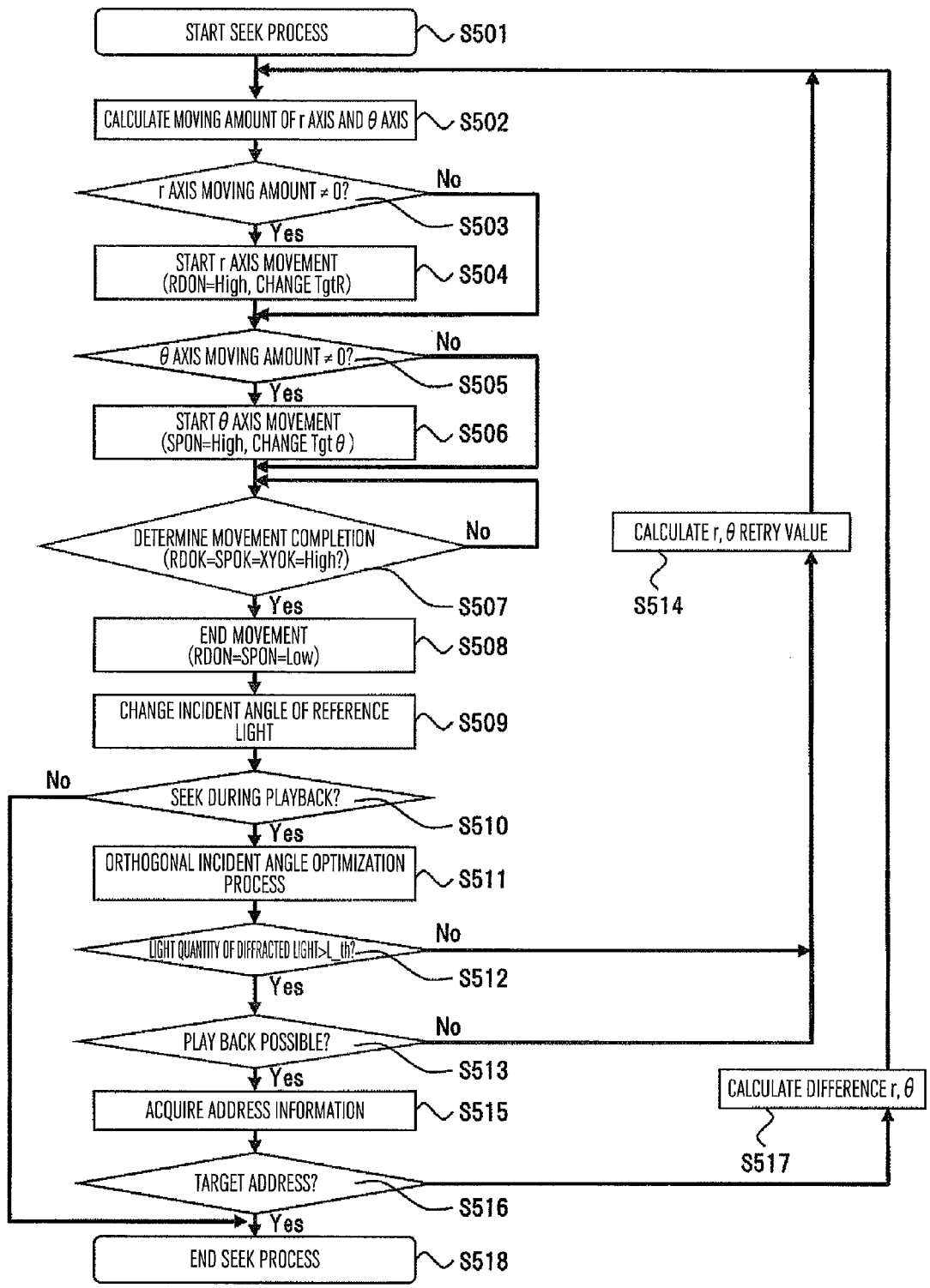
FIG. 5 is a flowchart of a seek process in the embodiment 1.

Thus, the state of being shifted further by φofs is attained for the incident angle of the reference light changed in step S508 in FIG. 5 which is the flowchart of the seek process. That is, the incident angle offset output circuit 26 outputs a value other than zero as the incident angle offset φofs so that the incident angle can be shifted by φofs and controlled.

Subsequently, using the diffracted light intensity measurement circuit 85, the shift from an optical axis of the luminance gravity center of the diffracted light is measured (step S603). Then, the controller 80 calculates an optimum orthogonal incident angle from the shift of the luminance gravity center of the diffracted light (step S604). In this way, in the present embodiment, the controller 80 functions as means that calculates the orthogonal incident angle.

In step S604, the state is that the incident angle of the reference light is shifted by a known value φofs. When the orthogonal incident angle is shifted in the state that the incident angle of the reference light is shifted, it is observed as a phenomenon that the luminance gravity center is shifted in the photodetector 226 in the present embodiment. This will be described using FIG. 7.

Figure 7A:
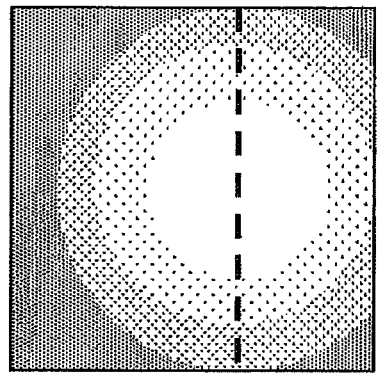
FIG. 7(a) illustrates a luminance distribution of a photodetector in the case that an orthogonal incident angle of reference light is shifted from an optimum value in a minus direction.
Figure 7B:
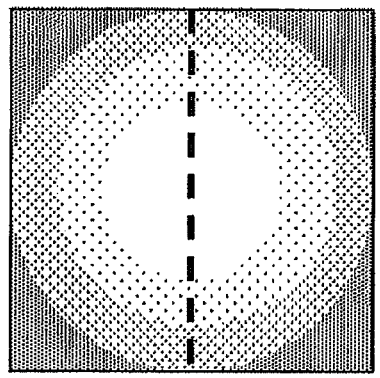
FIG. 7(b) illustrates a luminance distribution of a photodetector in the case that an orthogonal incident angle of reference light is an optimum value.
Figure 7C:
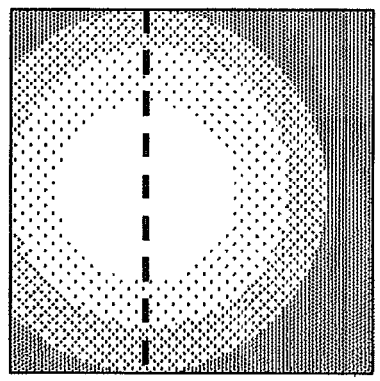
FIG. 7(c) illustrates a luminance distribution of a photodetector in the case that an orthogonal incident angle of reference light is shifted from an optimum value in a plus direction.

FIG. 7 schematically illustrate luminance distributions of the photodetector 226 when the incident angle of the reference light is changed. FIGS. 7(a)-7(c) illustrate the luminance distributions of the photodetector 226 when the orthogonal incident angle is changed in the state that the incident angle of the reference light is shifted in the plus direction from an optimum value by φofs.

FIG. 7(a) illustrates the case that the orthogonal incident angle of the reference light is shifted in the minus direction from the optimum value. Also, FIG. 7(b) illustrates the case that the orthogonal incident angle of the reference light is the optimum value, and FIG. 7(c) illustrates the case that the orthogonal incident angle of the reference light is shifted in the plus direction from the optimum value. The optimum value of the orthogonal incident angle means the orthogonal incident angle at which the intensity of the diffracted light becomes the highest.

In FIG. 7(b), the diffracted light generated from the hologram recording medium 1 passes through the objective lens 215 or the like and is propagated to the photodetector 226, along the optical axis illustrated in FIG. 3. Therefore, the luminance gravity center in the photodetector 226 coincides with the center of a light receiving surface of the photodetector 226.

On the other hand, as in FIG. 7(a) and FIG. 7(c), in the case that the orthogonal incident angle of the reference light is shifted from the optimum value, the diffracted light generated from the hologram recording medium 1 is shifted from the optical axis illustrated in FIG. 3, passes through the objective lens 215 or the like and is propagated to the photodetector 226. As a result, on the photodetector 226, it is observed as a phenomenon that luminance is shifted. That is, the phenomenon that the luminance gravity center is shifted in the photodetector 226 can be rephrased as a phenomenon that the diffracted light is shifted from the optical axis of the optical system and propagated.

Since the incident angle offset ϕofs added to the incident angle of the reference light is known, the shift of the orthogonal incident angle and the shift of the luminance gravity center in the case of the incident angle offset ϕofs for example are experimentally obtained. Thus, the shift from the optimum value of the orthogonal incident angle can be calculated from the shift of the luminance gravity center. Utilizing this, the optimum value of the orthogonal incident angle can be calculated.

After step S604, the controller 80 sets the command value Tgtρ of the orthogonal incident angle of the reference light at the optimum orthogonal incident angle calculated in step S604 (step S605). Thus, the actuator 219 is driven so as to change the orthogonal incident angle of the reference light to the value calculated in step S604. As a result, the orthogonal incident angle of the reference light is changed to the optimum orthogonal incident angle calculated in step S604.

After step S605, the controller 80 instructs the incident angle offset output circuit 26 to set the incident angle offset ϕofs to zero (step S606), and ends the orthogonal incident angle optimization process (step S607).

The order of the setting of the optimum orthogonal incident angle in step S605 and the setting of zero to the incident angle offset ϕofs in step S606 may be reverse. It is just that, in the state that both of the setting of the optimum orthogonal incident angle in step S605 and the setting of zero to the incident angle offset ϕofs in step S606 are completed, the information is played back from the hologram following the seek process.

Next, effects by the present embodiment will be described.

In playback of the hologram, two points that are "positioning" to the hologram when conveying the hologram recording medium 1 and adjustment related to the reference light to satisfy "diffraction conditions" after positioning is completed are important.

The hologram recording and playback device in the present embodiment includes an eccentricity compensation control system to solve the problem of the eccentricity. The eccentricity compensation control is the configuration of driving the moving stage 51 on the basis of the first eccentricity detection sensor 15 and the second eccentricity detection sensor 16. An original use is a detection sensor for compensating the eccentricity in positioning when playing back the hologram, and there exists a sensor having a sufficient detection resolution from the view point.

However, the detection resolution of the first eccentricity detection sensor 15 and the second eccentricity detection sensor 16 is limited, and the present inventor has found that lack of the detection resolution causes a problem peculiar to the hologram recording and playback device. That is, there is the problem that, even when positioning accuracy to the hologram can be improved, the diffraction condition cannot be satisfied. This problem will be described.

For the problem of the eccentricity compensation control system in the case of not using the present invention, FIG. 10 will be described.

Figure 10A:
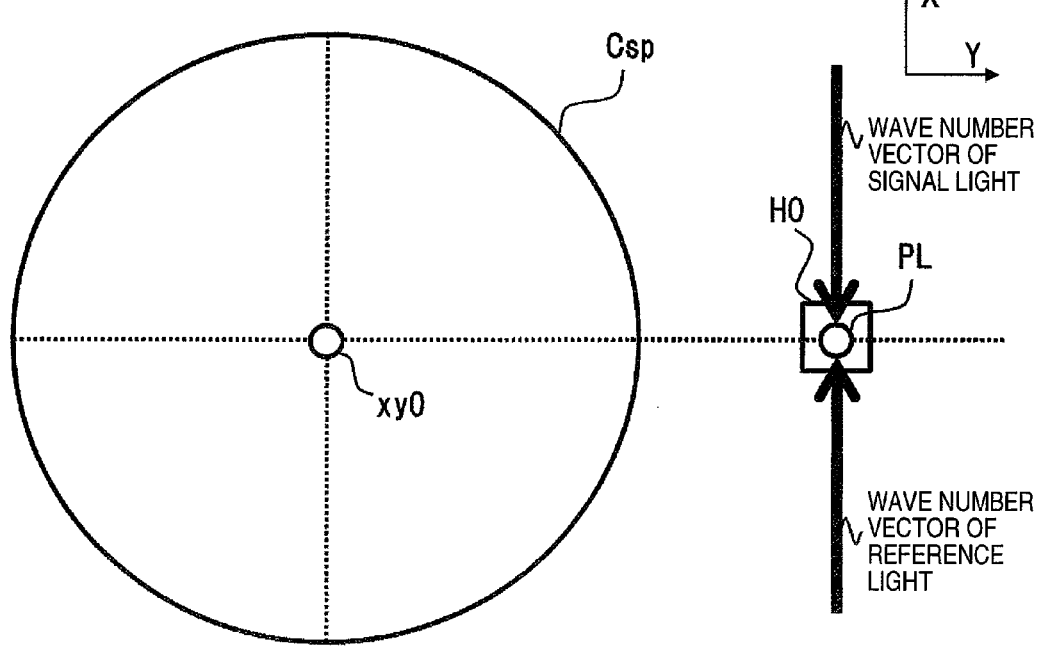
FIG. 10(a) is a diagram illustrating the case that an eccentricity compensation control system is ideally operated.
Figure 10B:
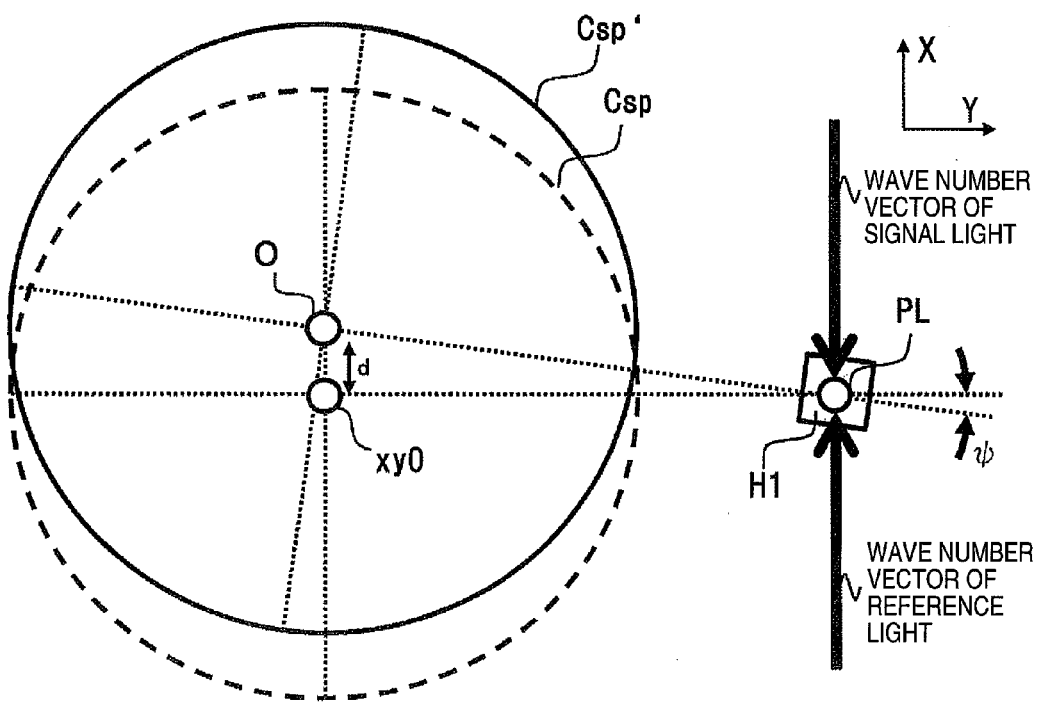
FIG. 10(b) is a diagram illustrating problems in the case of not using the present invention.

FIG. 10(*a*) illustrates the case that the eccentricity compensation control system is ideally operated. A circle Csp illustrates a center line of the mark M1 for angle detection in the case that the eccentricity compensation control system is ideally operated. At the time, the geometrical center of the mark M1 for angle detection coincides with the drive reference position of the moving stage 51.

Also, a point PL indicates the position to be irradiated with the signal light and the reference light, and is a position right below the objective lens. A signal light vector and a reference light vector in the figure illustrate projections projected to a paper surface, and actually, as described in FIG. 8, they are made incident at a predetermined incident angle within a plane vertical to the paper surface of FIG. 10. A quadrangle H0 schematically illustrates a hologram shape in the case that the eccentricity compensation control system is ideally operated.

In contrast, FIG. 10(*b*) illustrates the case that the output resolution of the first eccentricity detection sensor 15 and the second eccentricity detection sensor 16 lacks. In this case, the center line of the mark M1 for angle detection is like a circle Csp' as one example. That is, the state is that the eccentricity compensation control is in sufficient, and the center O of the hologram recording medium 1 may not completely coincide with the drive reference position xy0 of the moving stage 51. FIG. 10(*b*) illustrates the state that the center O of the hologram recording medium 1 is shifted in the X axial direction by a minute amount d.

Here, the hologram recording medium 1 for which the eccentricity compensation control system is ideally operated and the hologram is recorded is considered, and the case of irradiating the hologram with the reference light and playing back information in the state that the eccentricity compensation control is insufficient as in FIG. 10(*b*) is considered.

As described in FIG. 10(*a*), the hologram is recorded in the state that the eccentricity compensation control system is ideally operated, that is, at a position where influence of the eccentricity is completely canceled. In contrast, in the state of FIG. 10(*b*), the center O of the hologram recording medium 1 is shifted in the X axial direction by the minute amount d. At the time, the hologram is rotated on the paper surface like a quadrangle H1. As illustrated in FIG. 10(*b*), an amount of rotation of the hologram is indicated by ϕ.

The present inventor has found that a permissible amount Δϕ_th of the rotation ϕ of the hologram becomes small when performing high density playback of the hologram. Therefore, in the case of not using the present invention, the problem that the rotation ϕ of the hologram exceeds the permissible amount Δϕ_th and the hologram cannot be appropriately played back arises.

In contrast, according to the present invention, the problem is solved by performing the orthogonal incident angle optimization process, and the high density playback of the hologram can be achieved. Next, a reason that the problem which is the rotation of the hologram can be solved by the orthogonal incident angle optimization process will be described.

Figure 11A:
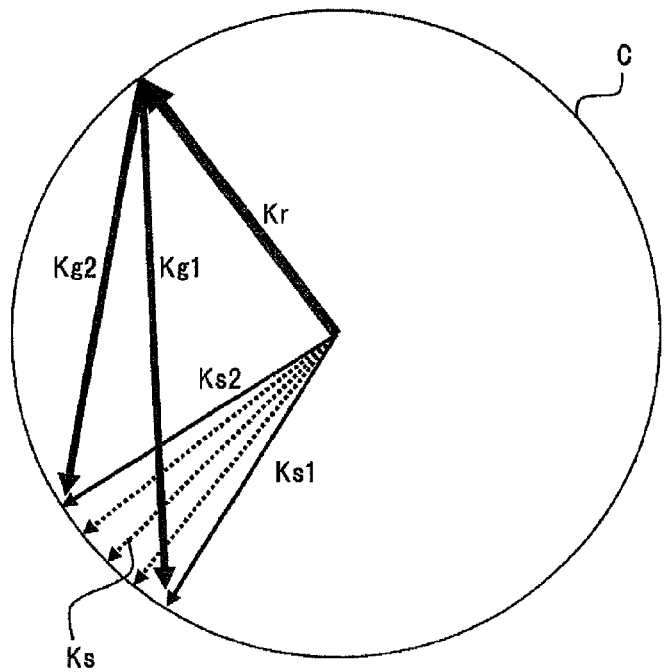
FIG. 11(a) is a diagram in the case of applying a Bragg diffraction condition to playback of a hologram.
Figure 11B:
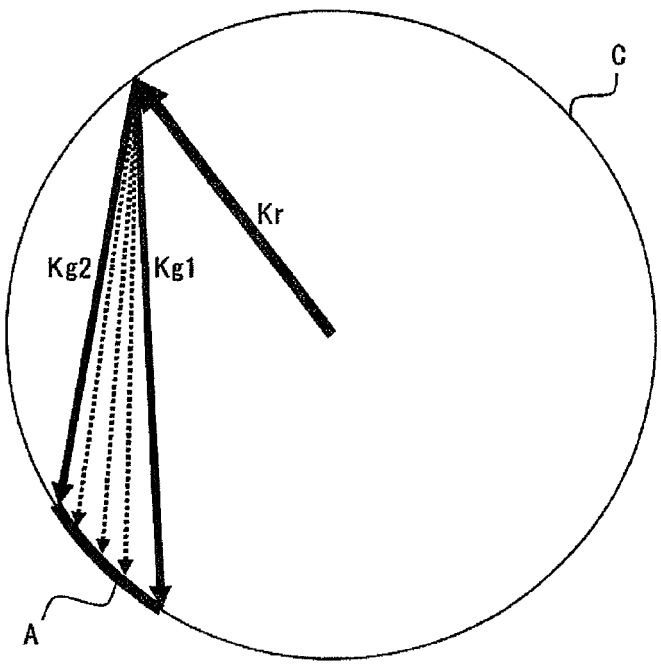
FIG. 11(b) is a diagram illustrating composition of a wave number vector Kr of reference light and a grating vector.

Whether or not the hologram is appropriately played back is known as a Bragg diffraction condition or an Ewald sphere. FIG. 11 is a diagram in the case of applying the Bragg diffraction condition to playback of the hologram. A vector Kr is the wave number vector of the reference light, a vector Ks1 and a vector Ks2 are the wave number vectors of the signal light, and a vector Kg1 and a vector Kg2 are grating vectors. An expression of the wave number vector of the signal light is the expression paying attention to the signal light emitted when recording the hologram, however, when the direction is reversed, it becomes the wave number vector of the diffracted light during playback.

Since the signal light is emitted to the hologram recording medium 1 as convergent light by the objective lens 215 as illustrated in FIG. 2, countless wave number vectors of the signal light exist, and countless grating vectors exist similarly. Also, since the wavelengths of the signal light and the reference light are the same, when a start point of the wave number vector of the reference light and a start point of the wave number vectors of the signal light are made common as in FIG. 11(*a*), distal ends of the vectors are on a circle C.

Here, "the optical axis of the signal light" in the present description is defined. In FIG. 8, while the signal light is indicated by one arrow, the signal light near the hologram recording medium is the convergent light. "The optical axis of the signal light" is defined as the optical axis of the objective lens 215 when using FIG. 2 which is a configuration diagram of the optical system. Also, when giving description in FIG. 11(*a*), it is the center axis of countless wave number vectors of the signal light.

The Bragg diffraction condition in hologram playback can be rephrased as that the wave number vector of the reference light, the wave number vector of the signal light and the grating vector form a closed triangle. Here, as illustrated in FIG. 10(*b*), composition of the wave number vector Kr of the reference light and the grating vectors is considered. As illustrated in FIG. 11(*b*), a set of the distal ends of composite vectors form an arc indicated by A. The Bragg diffraction condition can be rephrased as that A which is the set of the distal ends of the composite vectors coincides with the arc of the circle C.

Figure 12A:
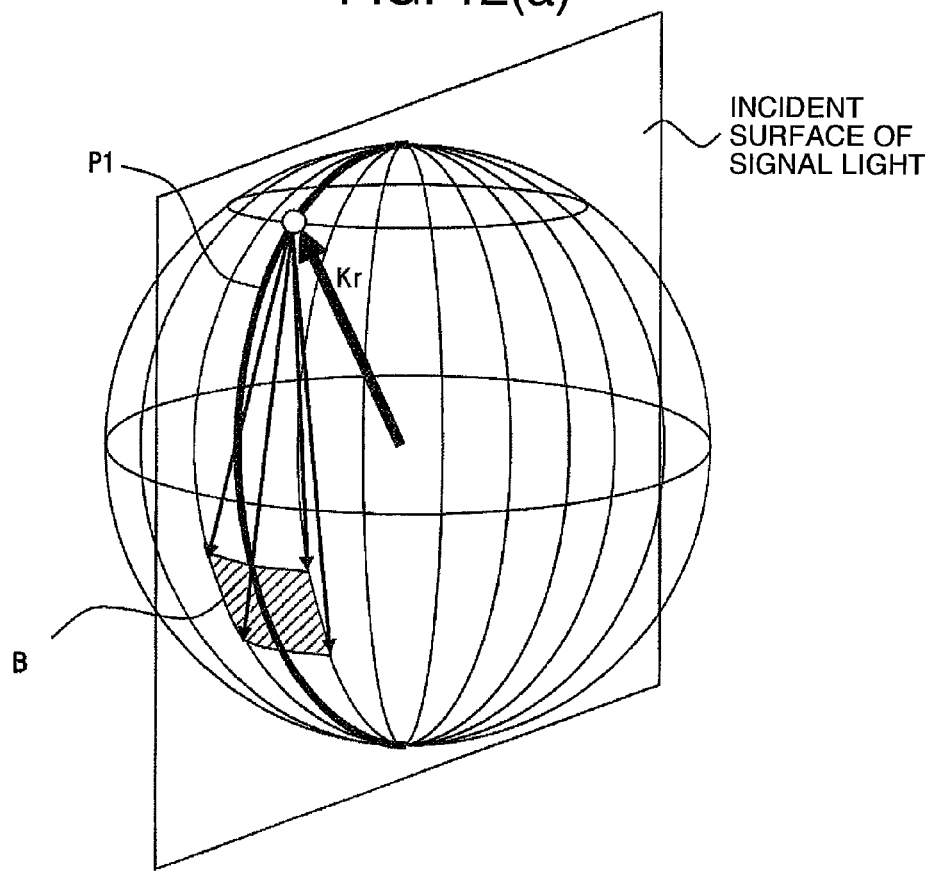
FIG. 12(a) is a diagram illustrating an Ewald sphere.

Next, the Ewald sphere for which this point of view is three-dimensionally expanded is considered. FIG. 12 illustrate the Ewald sphere, and an arc P1 indicates an arc where the incident surface of the signal light and the Ewald sphere intersect. As illustrated in the figure, a part indicated by the arc A in FIG. 11(*b*) corresponds to an area indicated by B in FIG. 12(*a*). By the grating vector, a quadrangular pyramid shape solid whose bottom surface is the area B is formed. The diffraction condition can be rephrased as that the area indicated by B in FIG. 12(*a*) coincides with a spherical surface of the Ewald sphere.

Subsequently, using the Ewald sphere in FIG. 12(*b*), a compensation method in the case that the rotation of the hologram occurs will be described. In the case that the rotation of the hologram occurs, the grating vectors that exist in the medium is rotated as illustrated in FIG. 12(*b*). At the time, the vertex of the quadrangular pyramid and the distal end of the wave number vector Kr of the reference light are separated. Thus, the area formed by the composition of the wave number vector Kr of the reference light and the grating vectors is separated from a spherical surface of the Ewald sphere. That is, the Bragg diffraction condition is not satisfied, and the diffracted light is not appropriately generated from the hologram.

Here, changing the orthogonal incident angle is considered. Changing the orthogonal incident angle is changing an angle at which the reference light is made incident on the hologram recording medium 1 in a direction orthogonal to the incident surface of the signal light, as described in FIG. 8(*b*). This corresponds to making the wave number vector of the reference light exist on a plane including an arc P2, for example, in the Ewald sphere.

For the quadrangular pyramid, the one originally inscribing the Ewald sphere is rotated, so that when it is rotated in the state that a bottom surface B is in contact with the spherical surface of the Ewald sphere as in FIG. 12(*b*), the vertex of the quadrangular pyramid surely gets on the spherical surface of the Ewald sphere.

From the theoretical considerations, in the case of FIG. 12(*b*) for example, it is assumed that the angle of the reference light is changed so that the wave number vector of the reference light is changed to be an arrow illustrated by Kr'. Thus, an area (a bottom surface of the quadrangular pyramid) formed by the composition of the wave number vector of the reference light and the grating vectors can be made to coincide with the spherical surface of the Ewald sphere. That is, the Bragg diffraction condition is satisfied, and the diffracted light is appropriately generated from the hologram.

From FIG. 12(*b*), changing to turn the wave number vector of the reference light to the arrow illustrated by Kr' is almost equal to changing the orthogonal incident angle to make the wave number vector of the reference exist on the plane including the arc P2.

By changing the orthogonal incident angle, since a point T0 which is the distal end of the reference light wave number vector can be moved on a plane P3, the distal end of the reference light wave number vector is movable to a position of a point T1. Thus, compared to the time before changing the orthogonal incident angle, the Bragg diffraction condition gets close, and the light quantity of the diffracted light from the hologram increases.

When considerations are advanced further here, by the occurrence of the rotation of the hologram, a height of the vertex of the quadrangular pyramid is also changed. That is, a point T2 which is the vertex of a triangular pyramid is not on the plane P3. Therefore, in order to most excellently compensate the rotation of the hologram, it is desirable to change not only the orthogonal incident angle but also the incident angle. This will be described in another embodiment to be described later.

In this way, the rotation of the hologram can be compensated by changing the orthogonal incident angle of the reference light.

In the present invention, first, since the eccentricity compensation control system is needed to cancel the influence of the eccentricity of the hologram recording medium 1 and perform "positioning", the configuration suitable for it is provided. Thus, "positioning" accuracy to the hologram is improved, however, just by providing the eccentricity compensation control system, the rotation of the hologram occurs as the problem peculiar to the hologram and "diffraction condition" cannot be satisfied. Therefore, in the present invention, as means for solving it, after executing the eccentricity compensation control, the orthogonal incident angle is optimized.

According to the present embodiment, in the case of providing the eccentricity compensation control system, not only the "positioning" accuracy can be improved but also "diffraction condition" can be satisfied. In this way, a first effect of the present embodiment is a point that the control system which cancels the eccentricity and the diffraction condition can be compatibly achieved.

Also, when using the eccentricity compensation control system of the hologram recording and playback device, the problem that the detection resolution of first eccentricity detection sensor 15 and the second eccentricity detection sensor 16 lacks can be solved. Therefore, large-sized and expensive sensors are not needed as the first eccentricity detection sensor 15 and the second eccentricity detection sensor 16. A second effect of the present embodiment is a point that the device can be miniaturized and costs can be reduced.

Also, as a configuration for canceling the eccentricity, the mechanism is loaded with the radial direction conveyance unit 52 to the movable part of which the moving stage 51 and the sensors are fixed, the spindle motor 50, and the hologram recording medium 1 having the predetermined marks, in the order. A suitable configuration for canceling the eccentricity is in this loading order.

When easiness of achieving the device is not considered, the best configuration for canceling the eccentricity is different from this loading order, and is the configuration of loading the moving stage on the spindle motor. Thus, the eccentricity can be canceled by the simplest method. When giving description using FIG. 18(b), even in the case that the eccentricity exists, the center O of the hologram recording medium can be made to coincide with the rotation center sp0 of the spindle motor. However, it is very difficult to achieve the moving stage in this configuration. The reason is, since the moving stage is to be loaded on the rotary shaft of the rotating spindle motor, it is needed to install, along the rotary shaft, electric wiring of the control system of the moving stage (the wiring connecting the moving stage drive circuit 41 and the moving stage 51 in the present embodiment). To achieve this, an expensive mechanism is needed, and further it is also difficult to prolong a service life of the device.

Therefore, the loading order of the spindle motor 50 and the moving stage 51 becomes the order of loading the spindle motor 50 on the movable part of the moving stage 51 like the configuration of the present embodiment. Also, since a structure is such that the mark provided on the hologram recording medium 1 is on the inner circumferential side, it is preferable that the sensors are fixed to the same member as the moving stage 51, and are transferred in the radial direction integrally with the hologram recording medium 1 by the radial direction conveyance unit 52. As a result, the order is to load the moving stage 51 and the sensors on the movable part of the radial direction conveyance unit 52.

In this way, a third effect of the present embodiment is a point that cancellation of the eccentricity and easiness of achieving the device can be compatibly achieved by contriving a mechanical loading order.

Next, a fourth effect will be described. As described above, the moving stage cannot be loaded on the rotary shaft of the spindle motor, and the configuration is to load the spindle motor on the moving stage. In the case of this configuration, characteristic control is needed also in an aspect of control.

In the case that the moving stage can be loaded on the rotary shaft of the spindle motor, when giving description using FIG. 18(b), the center O of the hologram recording medium can be made to coincide with the rotation center sp0 of the spindle motor. However, in the case of the configuration of the present embodiment, even in the case that the eccentricity exists, the center O of the hologram recording medium cannot be made to coincide with the rotation center sp0 of the spindle motor. In the case of the present embodiment, in the state that the center of the hologram recording medium and the rotation center sp0 of the spindle motor are kept shifted, the center O of the hologram recording medium 1 is made to coincide with the drive reference position xy0 of the moving stage 51. Thus, the control can be performed so that the position where the eccentricity is cancelled can be irradiated with the signal light and/or the reference light.

Figure 21A:
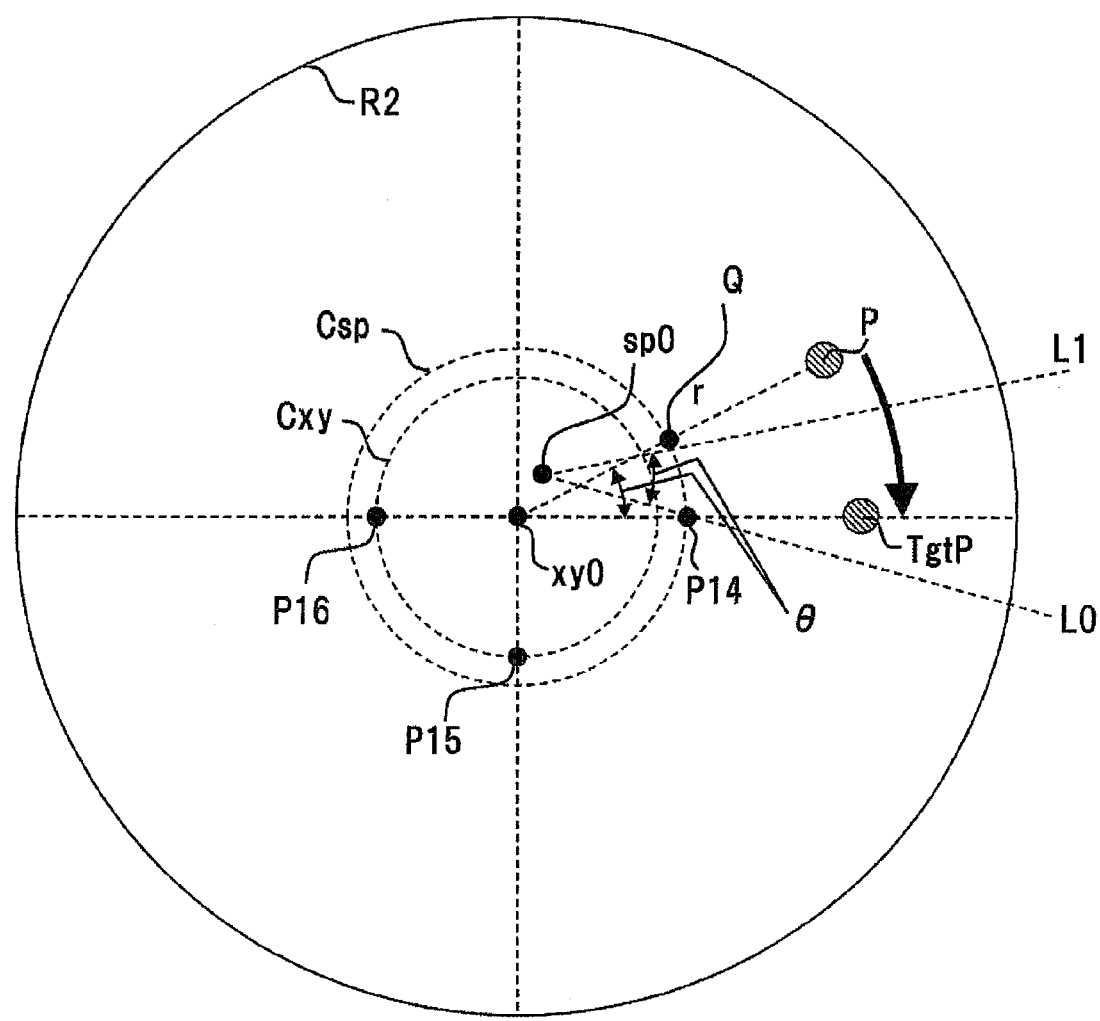
FIG. 21(a) is a diagram for illustrating the case of not using a control method in the embodiment 1.

It will be described using FIG. 21 that the characteristic control is needed when achieving a suitable mechanism loading order like the configuration of the present embodiment. FIG. 21(a) is a schematic diagram illustrating a positional relation between the hologram recording medium 1 and the various kinds of sensors. The circle R2 illustrates the outermost circumference of the hologram recording medium 1, the circle Cxy illustrates the edge of the outer circumference of the mark M2 for eccentricity detection, and the circle Csp illustrates the center line of the mark M1 for angle detection, respectively.

According to the present embodiment, since the center O of the hologram recording medium coincides with the drive reference position xy0 of the moving stage 51, it is illustrated so in FIG. 21(a). In FIG. 21(a), it is assumed that the eccentricity exists. That is, the spindle motor rotation center sp0 is illustrated as a position which does not coincide with the drive reference position xy0 of the moving stage 51.

Usually, in the seek operation in an optical disk device, the spindle control and the radial position control are independently performed. These two of the control may be simultaneously performed or may be performed in turns. When following the conventional control method, the spindle control, the radial position control and the eccentricity compensation control in the present embodiment may be independently performed. However, in the case of adopting the configuration of the present embodiment, the spindle control and the eccentricity compensation control cannot be independently performed.

Now, it is assumed that a target hologram is recorded at a position indicated by the point P, and the seek of rotating the spindle motor 50 is to be performed in order to play back the hologram. Here, it is assumed that the radial position control is already completed. A moving destination of the point P is illustrated by a point TgtP. The point TgtP is a position irradiated with the reference light. Since usually the reference light is emitted almost right below the objective lens 215, it can be interpreted that the objective lens is provided right above the point TgtP. For the seek operation in the case that the eccentricity does not exist, the seek in the case of rotating the spindle motor 50 by −θ is considered.

The case of performing the spindle control before performing the eccentricity compensation control is supposed. In this case, the hologram recording medium 1 is rotated by −θ around the point sp0 which is the rotation center of the spindle motor 50. For the description, a straight line connecting the point sp0 and the point P14 is defined as L0, and a straight line for which the straight line is rotated around the point sp0 by +θ is defined as L1. Since the rotation angle detection sensor 14 installed at the point P14 detects the rotation angle, −θ rotation around the point sp0 means the rotation around the point sp0 for L1 to overlap with L0.

Figure 21B:
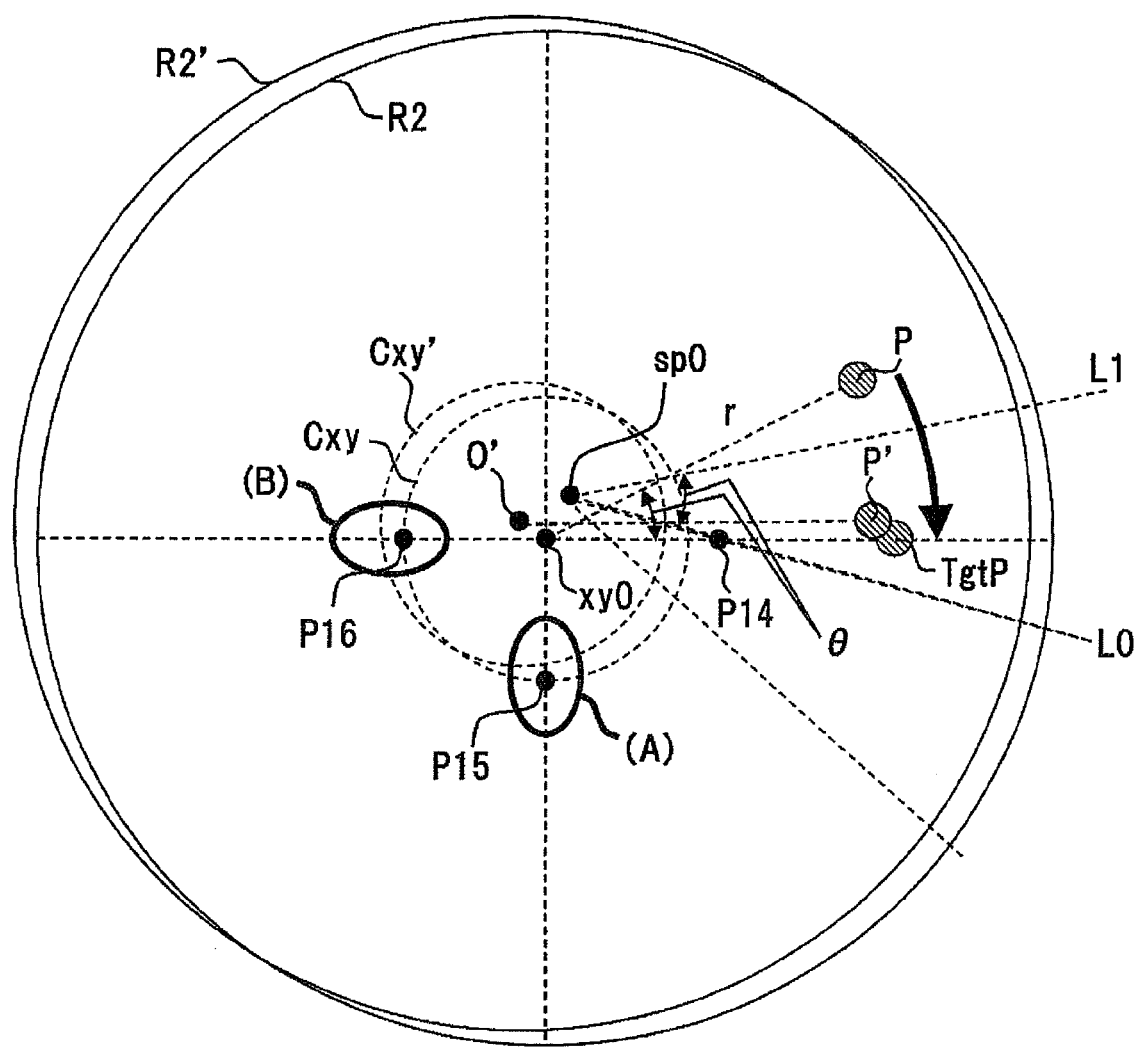
FIG. 21(b) is a diagram for illustrating problems in the case of not using the control method in the embodiment 1.

FIG. 21(b) illustrates a situation after the rotation. As a result of the rotation, the point P is moved to the point P'. Also, the center O of the hologram recording medium 1 is moved from the drive reference position xy0 of the moving stage 51 to a point O'. Similarly for the circle R2 and the circle Cxy, the circles after the rotation are illustrated by attaching "'(dash)".

As is clear from the figure, the target hologram cannot be moved to the target position TgtP just by rotating the spindle motor 50 by −θ. Also, the point O' can be made to coincide with the point xy0 when the eccentricity compensation control is performed following the rotation, however, the point P' does not coincide with the point TgtP by the movement by the eccentricity compensation control. The reason is that, in the configuration of the present embodiment, since the rotation center sp0 of the spindle motor 50 does not coincide with the drive reference position xy0, a rotation amount required for rotating the spindle motor 50 is no longer −θ.

Also, while the case of performing the spindle control before performing the eccentricity compensation control is described above, the eccentricity compensation control cannot be performed before performing the spindle control. The reason is that, in the diagram before the seek in FIG. 21(a), the edge of the outer circumference of the mark M2 for eccentricity detection is already positioned right above the two eccentricity detection sensors, and the eccentricity compensation control of the present embodiment is not operated. This is because how much the moving stage 51 should be moved when shifting to the state after the seek of rotating the spindle motor 50 by −θ is not known in a stage before the seek.

Therefore, in the seek operation of rotating the spindle motor 50, it is needed to simultaneously operate the spindle control and the eccentricity compensation control as in the present embodiment for example.

In the case of simultaneously operating the spindle control and the eccentricity compensation control, even when the state is like FIG. 21(b), since the point P15 and the circle Cxy' do not coincide at a part indicated by (A) in FIG. 21(b), the output of the first eccentricity detection sensor 15 becomes a value other than zero. Similarly, regarding a part indicated by (B) in FIG. 21(b), the output of the second eccentricity detection sensor 16 also becomes a value other than zero. Therefore, the control is performed so that the center O' of the hologram recording medium 1 coincides with the drive reference position xy0 by the eccentricity compensation control. At the time, the point P' is moved again, and the detection angle of the rotation angle detection sensor 14 is also changed by the eccentricity compensation control. As a result of simultaneously operating the two of the control, in a final state of the seek, the center O' of the hologram recording medium 1 is controlled to a position that coincides with the drive reference position xy0.

Simultaneously, since the spindle control is continuously performed during the time, in the rotation angle detection sensor 14 fixed at the position of the point P14, a change portion of the rotation angle detected during a seek period accurately becomes −θ. This means that, in the final state of the seek, a point Q illustrated in FIG. 21(a) comes onto a straight line connecting the center O' of the hologram recording medium 1 and the point P14. The point Q is a point for which the point P14 is rotated around the point xy0 by +θ. When it is considered that the center O' of the hologram recording medium 1 is controlled at the position that coincides with the drive reference position xy0 in the final state of the seek, it means that the point Q in FIG. 21(a) comes onto the X axis. That is, it means that the point P comes onto the X axis, and it means that the point P is moved to the target position TgtP. Thus, even in the configuration of the present embodiment, a highly accurate positioning operation can be achieved.

This operation is achieved by turning OFF the spindle control in step S508 by the fact that both of the SPOK signal and the XYOK signal are at the High level in step S507, in FIG. 5 which is the flowchart of the present embodiment.

In this way, even when the spindle control is converged to the vicinity of the angle command value Tgtθ and the SPOK signal is High, if the XYOK signal outputted by the eccentricity compensation determination circuit 4005 is not High, the spindle control should not be turned OFF. As in the present embodiment, until determination results of both SPOK signal and XYOK signal become OK, the spindle control and the eccentricity compensation control need to be simultaneously and continuously operated.

As described above, by simultaneously operating the spindle control and the eccentricity compensation control, the seek operation can be appropriately performed even in the configuration of the present embodiment. The fourth effect of the present embodiment is a point that a control method that achieves highly accurate positioning even in the case of the mechanical loading order of the present embodiment is provided.

By achieving the two points described above, that is, the suitable loading order for canceling the eccentricity and the control to be needed in that case, positioning control to the position where the eccentricity is cancelled can be performed even in the case that a shift, that is the eccentricity, exists between the rotation center of the spindle motor and the geometrical center of the disk-like hologram recording medium 1. More specifically, since the eccentricity compensation circuit 40 and the spindle control circuit 42 are operated according to the present embodiment, the hologram recording medium 1 is positioned with the geometrical center of the eccentricity detection mark as a reference. Thus, even in the case that the eccentricity exists, the position where the eccentricity is cancelled is irradiated with the signal light and the reference light to record or play back the hologram.

Also, of the control of the radius r, the rotation angle θ and the eccentricity, for the control of the rotation angle θ and the eccentricity, the hologram recording medium 1 is provided with a mark and the control is performed by detecting the mark. By performing positioning with the mark provided on the medium as a reference, highly accurate positioning control independent of variation among the devices is made possible. That is, though an eccentricity degree of a hologram recording medium fixing part attached to the rotary shaft of the spindle motor varies among the devices, the highly accurate positioning control independent of the variation is made possible.

In this way, a fifth effect of the present embodiment is a point that, by providing the mark for angle detection and the mark for eccentricity detection on the hologram recording medium 1, highly accurate positioning with the medium as a reference can be achieved.

While the plurality of effects of the present embodiment can be listed as described above, by the configuration of the present embodiment, suitable recording and playback to the hologram recording medium can be achieved.

In the present embodiment, the flowchart is such that change is performed to the incident angle corresponding to the page of the hologram positioned in the seek process in step S508 and the incident angle is shifted by φofs in step S602 thereafter. However, it may be shifted by φofs from the beginning in step S508.

A characteristic operation in the case of adopting the configuration of the present embodiment is a point that the incident angle of the reference light when measuring the luminance gravity center of the diffracted light in step S603 is different from the incident angle of the reference light when ending the seek process in step S518.

By the above operation, positioning can be performed at the position where the eccentricity is cancelled, the Bragg diffraction condition can be satisfied further, and the hologram can be played back. Also, since the mechanical loading order is optimized simultaneously, the costs of the device can be lowered and the service life can be prolonged.

In this way, according to the present embodiment, suitable recording and playback to the hologram recording medium can be achieved.

Embodiment 2

In the orthogonal incident angle optimization process S511 in the embodiment 1, the optimum orthogonal incident angle is calculated from the luminance gravity center of the diffracted light in the state of adding the incident angle offset. Other embodiments of the orthogonal incident angle optimization process S511 can be also considered, and the present embodiment is one example thereof.

A block diagram of the hologram recording and playback device in the present embodiment is in common with FIG. 1 which is the block diagram of the embodiment 1. Also, various kinds of components configuring the hologram recording and playback device 10 are also in common with the embodiment 1.

The present embodiment is different from the embodiment 1 only in part of an operation flow. Of the individual processes in FIG. 5 which is the flowchart of the seek process in the embodiment 1, specific process content in the orthogonal incident angle optimization process S511 is different. Hereinafter, a difference from the embodiment 1 will be described.

The orthogonal incident angle optimization process in the present embodiment will be described using a flowchart in FIG. 26.

When the orthogonal incident angle optimization process is started (step S701), a value of a counter k is turned to zero (step S702). Subsequently, the controller 80 changes the command value Tgtρ of the orthogonal incident angle to ρ[k] according to an array ρ[k] provided beforehand (step S703). Thus, the value of the orthogonal incident angle is changed to ρ[k].

Next, the controller 80 measures the intensity of the diffracted light using the diffracted light intensity measurement circuit 85, and stores it as I[k] (step S704). After step S703, 1 is added to the value of the counter k (step S705), and then whether or not the value of the counter k is N or larger is determined (step S706). In the case that the value of the counter k is not N or larger (in the case of No in step S706), the process returns to step S703. Thus, the change of the orthogonal incident angle (step S703) and the measurement of the diffracted light intensity in the state (step S704) are performed for the total of N times.

Figure 27:
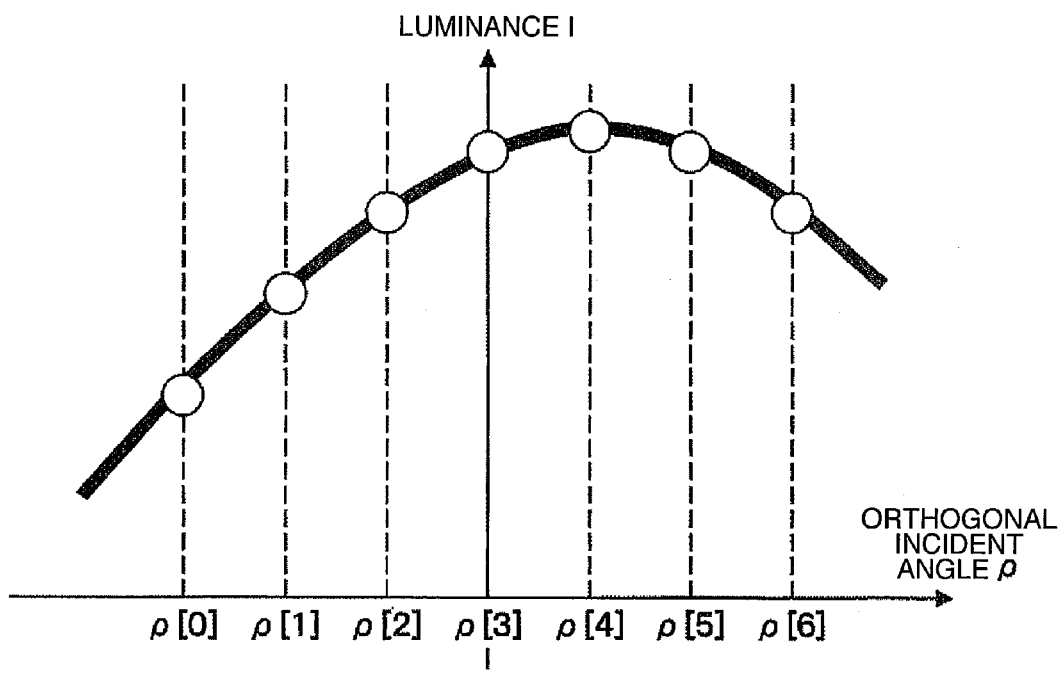
FIG. 27 is a diagram illustrating a method of calculating an optimum orthogonal incident angle in the embodiment 2.

In the case that the value of the counter k is N or larger (in the case of Yes in step S706), the controller 80 calculates the optimum orthogonal incident angle from results of measuring the diffracted light intensity for N times (step S707). In step S707, for example, when the luminance in N times in step S704 is the values illustrated in FIG. 27, measurement data of the luminance is approximated by a quadratic function illustrated by a thick line in FIG. 27, and the orthogonal incident angle at which the luminance becomes the highest is calculated. In this way, in the present embodiment, the controller 80 functions as the means that calculates the orthogonal incident angle.

After step S707, the controller 80 sets the command value Tgtρ of the orthogonal incident angle of the reference light to the optimum orthogonal incident angle calculated in step S707 (step S708). Thus, the actuator 219 is driven so as to change the incident angle of the reference light to the value calculated in step S707. As a result, the orthogonal incident angle of the reference light is changed to the optimum orthogonal incident angle calculated in step S707. After step S708, the orthogonal incident angle optimization process is ended (step S709).

Compared to the embodiment 1, the present embodiment is different only in the method of calculating the optimum orthogonal incident angle, and is common at the point of calculating and setting the optimum orthogonal incident angle in the orthogonal incident angle optimization process. Therefore, the present embodiment has the effects similar to the embodiment 1.

In this way, according to the present embodiment, suitable recording and playback to the hologram recording medium can be achieved.

Embodiment 3

In the embodiment 1 and the embodiment 2, the operation of optimizing the orthogonal incident angle is performed after positioning by the radius r and the rotation angle θ is completed. This is because, as a result of considerations using FIG. 12(b), the rotation of the hologram can be compensated by changing the orthogonal incident angle of the reference light. However, when the considerations are advanced further, a height of the vertex of the quadrangular pyramid is also changed by the occurrence of the rotation of the hologram. That is, in order to most excellently compensate the rotation of the hologram, it is desirable to change not only the orthogonal incident angle but also the incident angle. Further, in the embodiment 1 and the embodiment 2, the operation of turning OFF the radial position control and the spindle control is performed by making both RDON signal and SPON signal Low when positioning by the radius r and the rotation angle θ is completed. However, the seek process may be ended without turning OFF the control. That is, regarding the radial position control and the spindle control, the control is turned ON at all times.

The present embodiment is, as described above, the embodiment that improves accuracy regarding the compensation of the hologram rotation and positioning to the hologram.

A block diagram of the hologram recording and playback device in the present embodiment is in common with FIG. 1 which is the block diagram of the embodiment 1. Also, various kinds of components configuring the hologram recording and playback device 10 are also in common with the embodiment 1.

Figure 28:
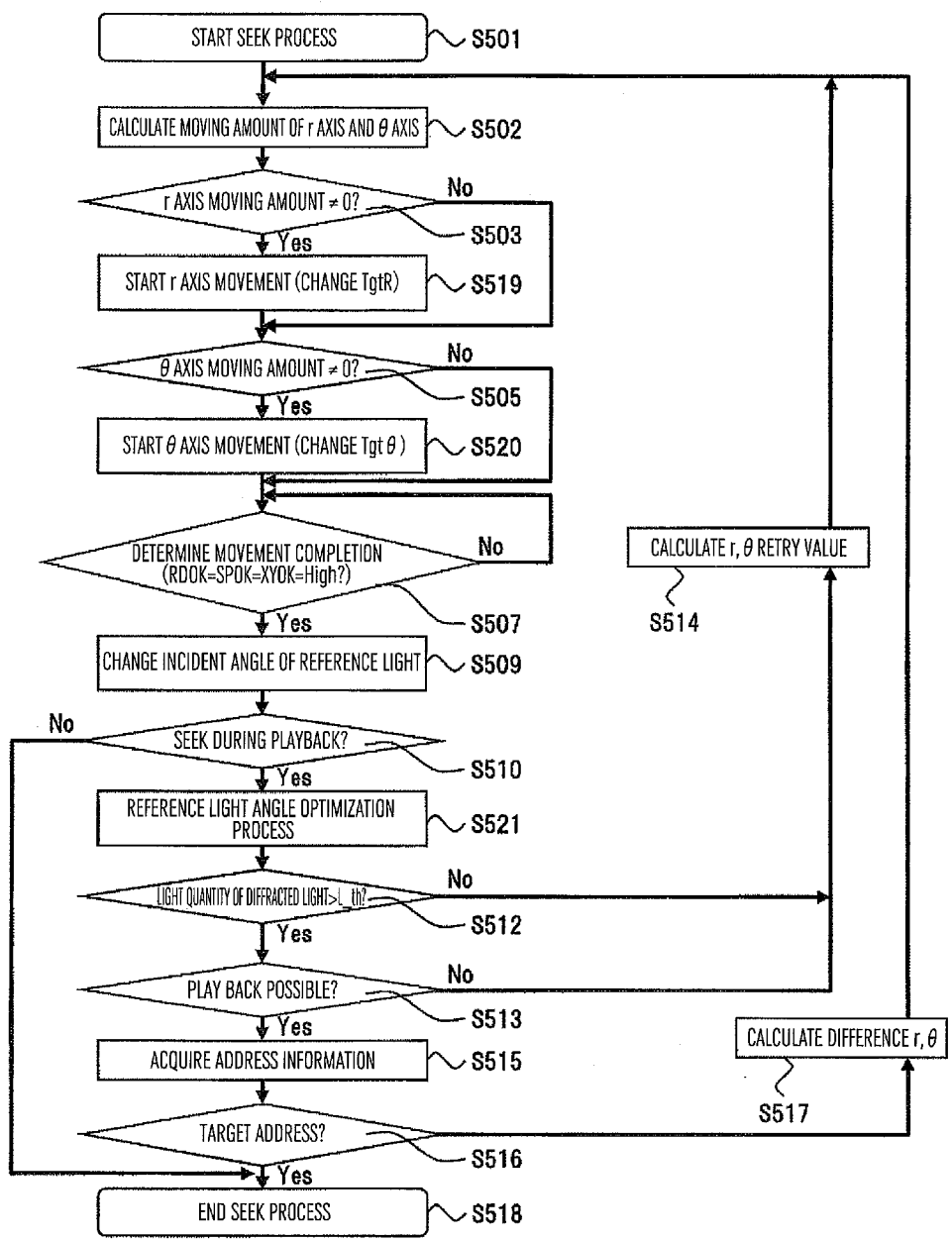
FIG. 28 is a flowchart of a seek process in an embodiment 3.

The present embodiment is, compared to the embodiment 1, different only in part of the operation flow in the seek process. The seek process S414 in the present embodiment will be described using a flowchart in FIG. 28. For steps of the same process content as FIG. 5 which is the flowchart of the embodiment 1, the same numbers are attached, and the description of the process content is omitted.

There are four differences from FIG. 5 which is the flowchart of the embodiment 1. First, when the moving amount of the r axis is other than zero (in the case of Yes in step S503), the command value TgtR is changed and the movement of the r axis is started (step S519), and the process advances to step S505. In the present embodiment, since the RDON signal is made High at all times, it is different in a point that the process of making the RDON signal High is not needed.

Also, when the moving amount of the θ axis is other than zero (in the case of Yes in step S505), the command value Tgtθ is changed and the movement of the θ axis is started (step S520), and the process advances to step S507. In the present embodiment, since the SPON signal is made High at all times, it is different in a point that the process of making the SPON signal High is not needed.

Further, in the case of determining that the movement is completed in step S507 (in the case of Yes in step S507), the process shifts to step S509. Compared to the embodiment 1, it is different in a point that step S508 is not performed, and the three differences above are all change points due to turning ON the control at all times regarding the radial position control and the spindle control.

Finally, in the case of determining that it is the seek during playback in step S510 (in the case of Yes in step S510), reference light angle optimization process is performed (step S521). After step S521, the process shifts to step S512 similarly to the embodiment 1.

Figure 29:
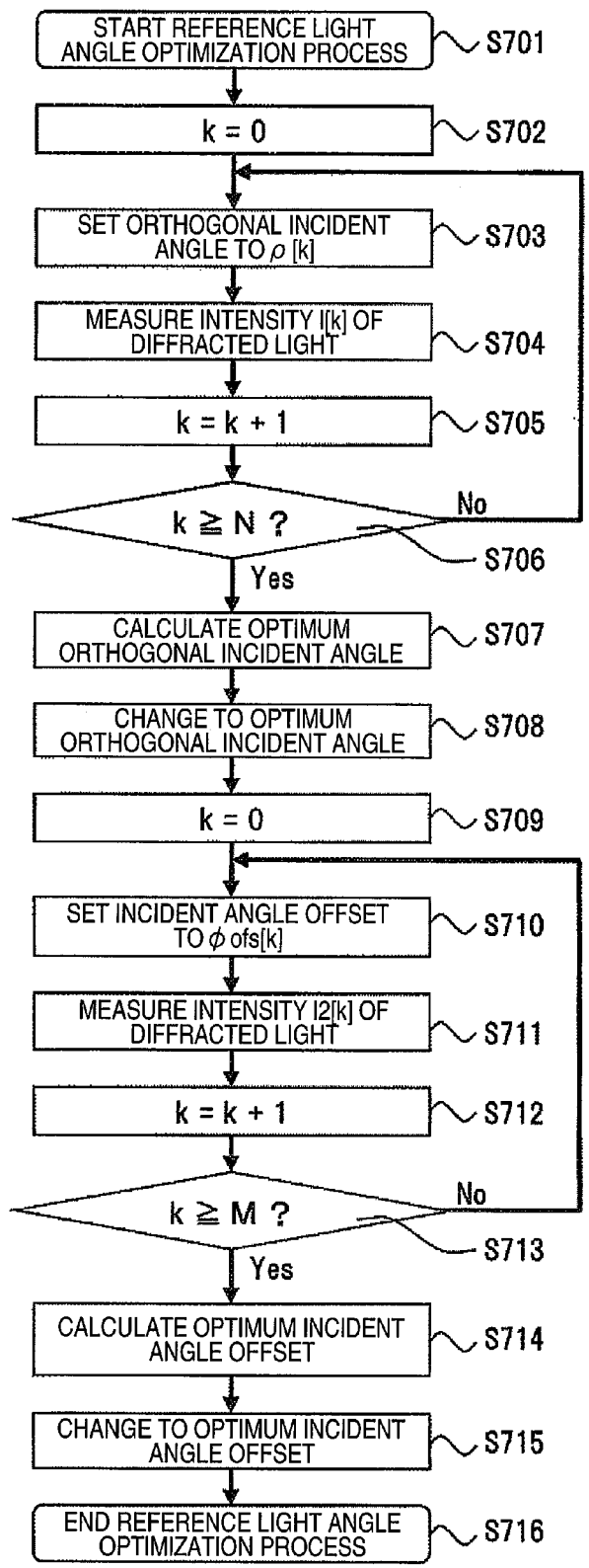
FIG. 29 is a flowchart of an orthogonal incident angle optimization process in the embodiment 3.

Subsequently, the reference light angle optimization process in the present embodiment will be described using a flowchart in FIG. 29. For steps of the same process content as FIG. 26 which is the flowchart of the orthogonal incident angle optimization process in the embodiment 2, the same numbers are attached, and the description of the process content is omitted. Compared to FIG. 26 which is the flowchart of the embodiment 2, steps from step S701 to step S708 are in common.

After the change to the optimum orthogonal incident angle in step S708, the value of the counter k is turned to zero (step S709). Subsequently, the controller 80 changes the value φofs of the incident angle offset to φofs[k] according to an array φofs[k] provided beforehand (step S710). Thus, the value of the incident angle offset is changed to φofs[k].

Next, the controller 80 measures the intensity of the diffracted light using the diffracted light intensity measurement circuit 85, and stores it as I2[k] (step S711). After step S711, 1 is added to the value of the counter k (step S712), and then whether or not the value of the counter k is M or larger is determined (step S713). In the case that the value of the counter k is not M or larger (in the case of No in step S713), the process returns to step S710. Thus, the change of the incident angle offset (step S710) and the measurement of the diffracted light intensity in the state (step S711) are performed for the total of M times.

In the case that the value of the counter k is M or larger (in the case of Yes in step S713), the controller 80 calculates the optimum incident angle offset from results of measuring the diffracted light intensity for M times (step S714). In step S714, the optimum value is calculated by a method similar to that in step S707. In this way, in the present embodiment, the controller 80 functions as the means that calculates the incident angle.

After step S714, the controller 80 instructs the incident angle offset output circuit 26, and sets the incident angle offset φofs to the optimum incident angle offset calculated in step S714 (step S715). Thus, the actuator 221 and the actuator 224 are driven so as to change the incident angle of the reference light to the value calculated in step S714. As a result, the incident angle of the reference light is changed to the optimum incident angle calculated in step S714. After step S715, the reference light angle optimization process is ended (step S716).

By the flowchart described above, the incident angle of the reference light is optimized following the optimization of the orthogonal incident angle of the reference light, with the intensity of the diffracted light from the hologram as an index.

Next, the effects by the present embodiment will be described. First, in the present embodiment, regarding the radial position control and the spindle control, the control is turned ON at all times. Thus, since the control is performed even when disturbance such as vibrations is applied to the device, the positioning accuracy to the hologram is improved.

Further, in the present embodiment, in the reference light angle optimization process S521, not only the orthogonal incident angle is optimized but also the incident angle is optimized. Specifically, after changing the orthogonal incident angle and obtaining the orthogonal incident angle at which the luminance becomes the highest, the incident angle is changed and the incident angle at which the luminance becomes the highest is obtained. Thus, it corresponds to, in FIG. 12(b) which is the Ewald sphere in the case that the rotation of the hologram occurs, changing the angle of the reference light in the lateral direction and the longitudinal direction near the reference light wave number vector Kr and searching a condition that the light quantity of the diffracted light is the largest. Therefore, while the distal end of the wave number vector of the reference light can be moved only to the point T1 in FIG. 12(b) in the embodiment 1 and the embodiment 2, it can be moved to the point T2 in FIG. 12(b) in the present embodiment. As a result, the Bragg diffraction condition can be completely satisfied, and the information can be more appropriately played back from the hologram. However, even if the distal end of the wave number vector of the reference light can be moved only to the point T1 in FIG. 12(b), when the intensity of the diffracted light is the intensity which does not cause a problem in playback of the information, the configuration of the embodiment 1 has no problem.

Also, in the present embodiment, the order is that the incident angle is optimized after the orthogonal incident angle is optimized, however, the order may be reversed.

Further, the change to the optimum orthogonal incident angle is performed after performing the measurement for calculating the optimum value of the orthogonal incident angle, and thereafter the change to the optimum incident angle is performed after performing the measurement for calculating the optimum value of the incident angle, however, the order may be replaced. For example, even by the operation of performing the measurement for calculating the optimum value of the incident angle following the measurement for calculating the optimum value of the orthogonal incident angle, and thereafter performing the change to the optimum orthogonal incident angle and the change to the optimum incident angle, the effects equal to that in the case of the present embodiment can be achieved.

In this way, according to the present embodiment, suitable recording and playback to the hologram recording medium can be achieved.

Embodiment 4

In the embodiments above, the first incident angle signal generation circuit 20 is configured to receive the output signals of the angle detection sensor provided in the actuator 221 as the input, generates the signals indicating the incident angle of the reference light reflected at the galvano mirror 220, and generates them as the signals to be used in control of the incident angle. However, a configuration not using the angle detection sensor provided in the actuator 221 is also possible.

In the present embodiment, a mechanism of optically detecting the shift amount of the incident angle of the reference light using the diffracted light diffracted from the hologram when playing back the information is provided separately from the angle detection sensor, inside the pickup 11. Then, on the basis of the output signals of the mechanism, the signals to be used in control of the incident angle of the reference light are generated.

Figure 30:
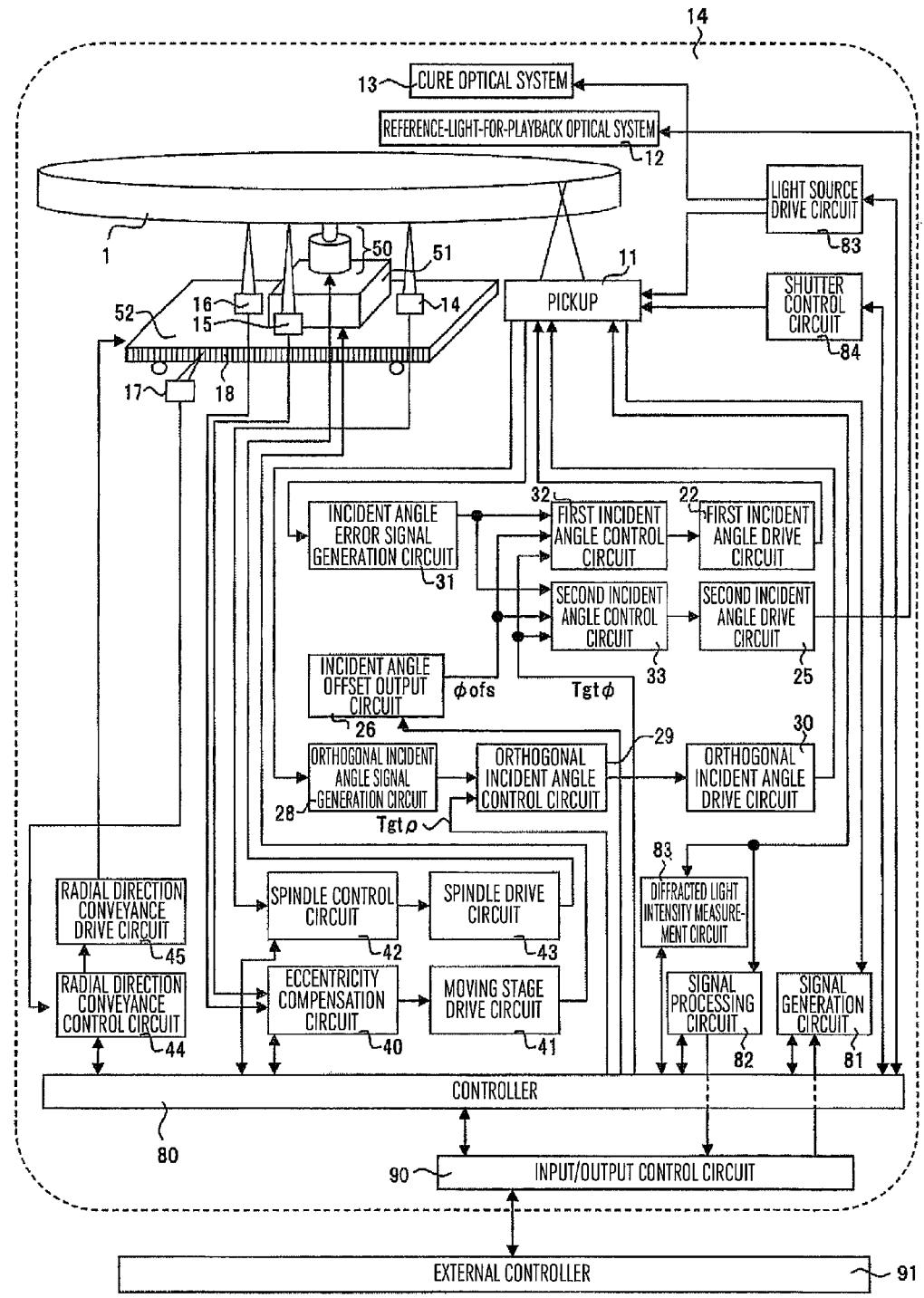
FIG. 30 is a block diagram illustrating a hologram recording and playback device in an embodiment 4.

FIG. 30 is a block diagram illustrating a hologram recording and playback device in the present embodiment. For components in common with FIG. 1 which is the block diagram of the embodiment 1, the same numbers are attached, and the description is omitted.

A hologram recording and playback device 14 in the present embodiment is not provided with the first incident angle signal generation circuit 20 and the second incident angle signal generation circuit 23 in the embodiment 1, and is provided with an incident angle error signal generation circuit 31 instead.

The incident angle error signal generation circuit 31 receives the output signals from the photodetector 226 inside the pickup 11 as the input, generates signals (called incident angle error signals, hereinafter) indicating the shift amount of the incident angle of the reference light to the hologram recording medium 1, and generates them as the signals to be used in the control of the incident angle.

A first incident angle control circuit 32 has three inputs. The first input is the incident angle error signal outputted by the incident angle error signal generation circuit 31, the second input is the command value Tgtϕ of the incident angle of the reference light outputted by the controller 80, and the third input is the incident angle offset ϕofs outputted by the incident angle offset output circuit 26. In the first incident angle control circuit 32, on the basis of the first input and the second input, the control is performed so that the shift amount of the incident angle of the reference light becomes zero. Also, when the incident angle offset ϕofs is other than zero, a control angle is offset by the incident angle offset ϕofs, and the control is performed. Drive signals outputted from the first incident angle control circuit 32 are supplied to the actuator 221 inside the pickup 11 through the first incident angle drive circuit 22.

A second incident angle control circuit 33 has three inputs. The first input is the incident angle error signal outputted by the incident angle error signal generation circuit 31, the second input is the command value Tgtϕ of the incident angle of the reference light outputted by the controller 80, and the third input is the incident angle offset ϕofs outputted by the incident angle offset output circuit 26. In the second incident angle control circuit 33, on the basis of the first input and the second input, the control is performed so that the shift amount of the incident angle of the reference light becomes zero. Also, when the incident angle offset ϕofs is other than zero, the control angle is offset by the incident angle offset ϕofs, and the control is performed. Drive signals outputted from the second incident angle control circuit 33 are supplied to the actuator 224 inside the reference-light-for-playback optical system 12 through the second incident angle drive circuit 25.

In the present embodiment, a control system that turns the shift amount of the incident angle of the reference light optically detected by using the output signals of the photodetector 226 to zero is provided.

A flowchart of the present embodiment is similar to that of the embodiment 2. That is, the flowchart of the seek process is FIG. 5, and the flowchart of the orthogonal incident angle optimization process is FIG. 26.

Though the flowchart of the present embodiment is similar to that of the embodiment 2 in this way, the effects of the present embodiment are greater than the effects of the embodiment 2, and are equal to that of the embodiment 3. Hereinafter, the reason will be described.

Figure 12B:
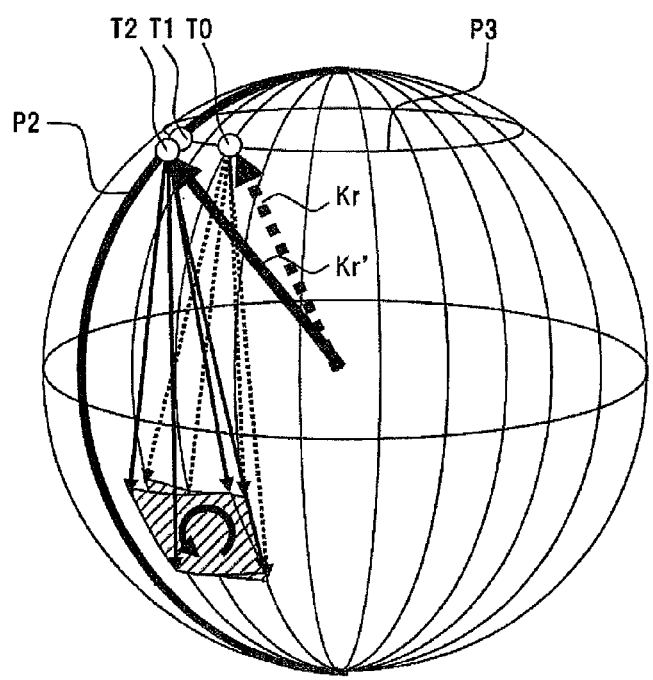
FIG. 12(b) is a diagram illustrating a compensation method in the case that rotation of a hologram occurs.

In the embodiment 2, in FIG. 12(b) which is the Ewald sphere in the case that the rotation of the hologram occurs, the distal end T0 of the reference light wave number vector Kr can be changed only within the plane P3. In contrast, in the embodiment 3, it can be changed to the point T2 which is the optimum position.

In the present embodiment, the shift amount of the incident angle of the reference light can be detected by optical detection, and the control can be performed so that the shift amount of the incident angle of the reference light becomes zero. Also, since a switch is not provided in an output stage of the first incident angle control circuit 32 and an output stage of the second incident angle control circuit 33, the control is performed at all times. That is, in FIG. 12(b), in the case of changing the orthogonal incident angle of the reference light so that the wave number vector of the reference light is moved from the plane P1 onto the plane P2, the distal end of the wave number vector of the reference light becomes the point T1. However, simultaneously, regarding the incident angle of the reference light, it is at the position shifted from the optimum point T2. Therefore, the incident angle error signal generation circuit 31 outputs the incident angle error signal indicating the shift amount of the incident angle of the reference light. Since the first incident angle control circuit 32 and the second incident angle control circuit 33 are operated on the basis of the incident angle error signal, the incident angle of the reference light is automatically optimized. That is, the distal end of the wave number vector of the reference light is at the optimum point T2.

That is, in the case of including the control system that detects the shift amount of the incident angle of the reference light by the optical detection and turns the shift amount to zero like the present embodiment, the need of searching the direction of the incident angle of the reference light like the embodiment 2 is eliminated. This has an effect of shortening the time needed for the seek process.

Figure 26:
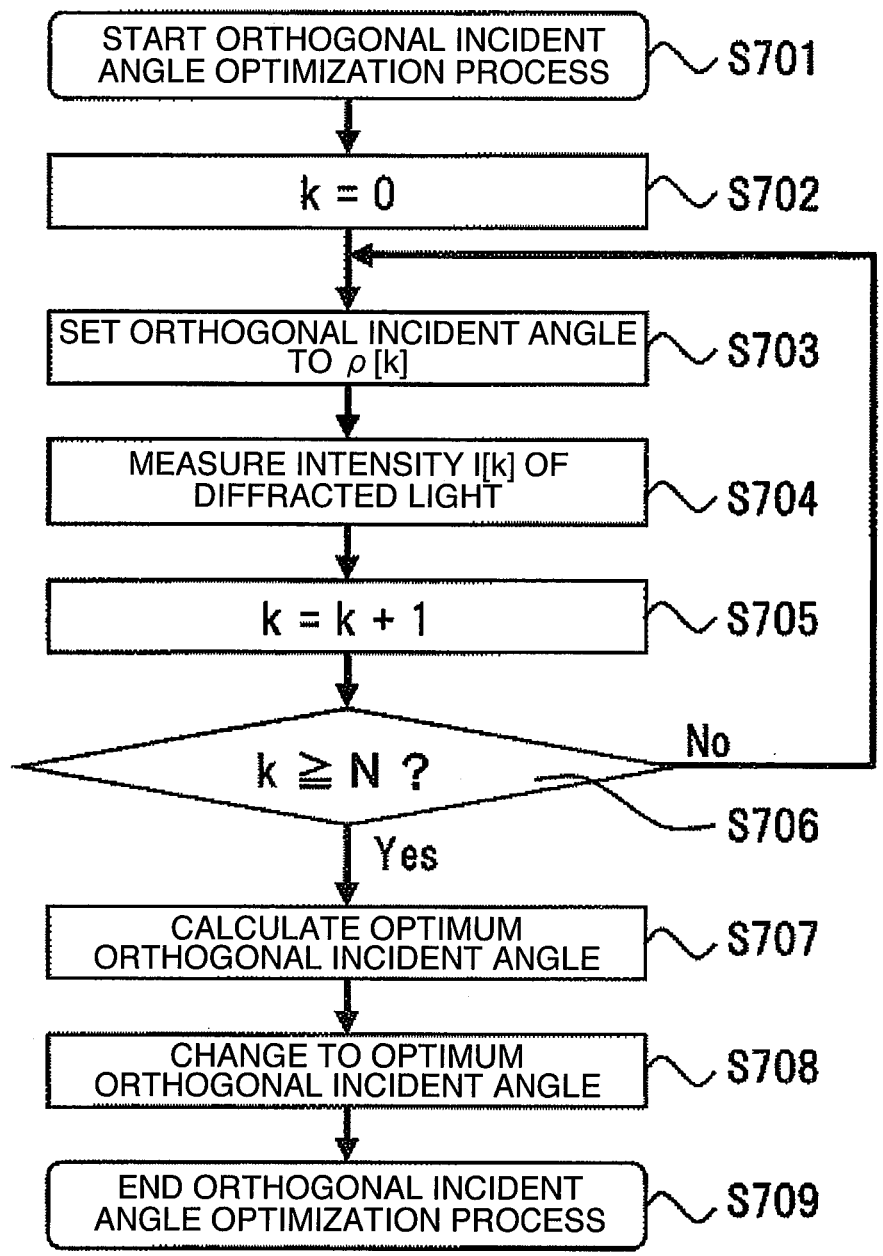
FIG. 26 is a flowchart of an orthogonal incident angle optimization process in an embodiment 2.

Also, in the present embodiment, for comparison with the embodiment 3, the optimization process of the orthogonal incident angle is described using FIG. 26 on the basis of the configuration of the embodiment 2. However, it is similarly applicable even in the case of the flowchart in FIG. 6 which is the optimization process of the orthogonal incident angle in the embodiment 1.

In this way, according to the present embodiment, suitable recording and playback to the hologram recording medium can be achieved.

In the embodiments above, every time the seek process is performed, the eccentricity compensation control is operated during the movement of the r axis and the θ axis. However, the operation may be such that the eccentricity control is not performed every time of the seek process but the eccentricity compensation control is performed once in several times of the seek process for example. In this case, when giving the description in the case of the embodiment 1, it is desirable that the orthogonal incident angle optimization process is performed only in the seek process in which the eccentricity compensation control is performed. This is because the orthogonal incident angle optimization process is for solving the problem caused by performing the eccentricity compensation control.

Therefore, the present invention can be also rephrased that the process of changing the orthogonal incident angle to the optimum value is surely performed after a hologram positioning operation accompanied by the eccentricity compensation control during playback. In the case of the embodiment 3, the orthogonal incident angle optimization process in the above description can be replaced with the reference light angle optimization process.

Further, the present invention is characterized in that only the hologram positioning operation accompanied by the eccentricity compensation control is performed during recording, and the process of changing the orthogonal incident angle to the optimum value is surely performed after the hologram positioning operation accompanied by the eccentricity compensation control during playback. That is, there is a difference between the eccentricity compensation control during recording and the eccentricity compensation control during playback. Using the present invention, the information can be played back after changing the orthogonal incident angle and optimizing the diffraction condition of the hologram by utilizing the fact that the influence of the rotation of the hologram can be determined utilizing the diffracted light during playback.

In the embodiments above, the hologram recording medium 1 is provided with the mark for angle detection and the mark for eccentricity detection as different marks. However, the same mark can be shared for the mark for angle detection and the mark for eccentricity detection. As one example, the configuration may be such that only the mark for angle detection exists on the hologram recording medium, and the first eccentricity detection sensor and the second eccentricity detection sensor perform detection using an edge on the inner circumferential side or the outer circumferential side of the mark for angle detection.

In the embodiments above, the edge of the outer circumference of the mark M2 for eccentricity detection is the edge used when performing the eccentricity compensation control. For the edge used when performing the eccentricity compensation control, an edge on the inner circumferential side of a predetermined mark provided on the medium may be detected, or an edge on the outer circumferential side of the predetermined mark may be detected.

In the embodiments above, the edge of the outer circumference of the mark M2 for eccentricity detection is the edge used when performing the eccentricity compensation control. For the edge used in the eccentricity compensation control, it is preferable that circularity is managed by a predetermined reference. For example, when the circularity is guaranteed by a standard, a positioning performance by using the eccentricity compensation control of the present invention can be guaranteed.

Also, the light of a predetermined wavelength is emitted from the first eccentricity detection sensor 15 and the second eccentricity detection sensor 16 in the embodiments above, and the light reflected at the reflection part is detected. However, the eccentricity detection sensor just needs to output a voltage according to a relative positional relation with the mark M2 for eccentricity detection as illustrated in FIG. 9(b), and a sensor which does not emit the light may be used. For example, the sensor may photograph the mark M2 for eccentricity detection by a photodetector like a camera and output the voltage according to the relative positional relation with the mark M2 for eccentricity detection from a photographed result.

In the case of using a camera as the first eccentricity detection sensor 15, "sensor center" in the present description can be rephrased as the one indicating a center position of an area photographed by the camera. That is, "sensor center" in the present description indicates the center position of the area where the sensor performs detection. Also, arranging the sensor at a point S means making the center position of the area where the sensor performs detection coincide with the point S.

Further, the first eccentricity detection sensor 15 and the second eccentricity detection sensor 16 are described as the configuration that outputs the voltage according to the relative positional relation between the light spot generated by detection light and the mark M2 for eccentricity detection, but they may be the configuration that outputs a current according to the relative positional relation for example. That is, the sensor may output a value according to the relative positional relation with the mark M2 for eccentricity detection.

In the embodiments above, as the most suitable configuration, the sensors are arranged orthogonally regarding the drive reference position xy0, and the eccentricity compensation circuit 40 is configured independently for the X axis and the Y axis. Further, the control of the X axis and the control of the Y axis are simultaneously started by the same control signal XYON. However, a different embodiment is also possible.

For example, the control of the X axis and the control of the Y axis may be performed not simultaneously but alternately. In this case, it is insufficient to perform the control of the X axis and the control of the Y axis once each, and the operation repeats the control of the X axis and the control of the Y axis for a plurality of times.

Also, a form that the sensors are not arranged at orthogonal positions regarding the drive reference position xy0 and the fixing position of the first eccentricity detection sensor 15 is turned to P15' as in FIG. 20(a) for example is possible. One embodiment of this configuration is the configuration that the drive axis of the moving stage 51 is not made to orthogonally intersect. As described above, the limitation regarding the arrangement of the sensors is that the tangent of the circle Cxy at the point P15 and the point P16 which are the points to arrange the eccentricity detection sensors are parallel to the drive axis of the moving stage 51. Therefore, for example, in order to satisfy the limitation in the case that the X axis of the moving stage 51 is the X' axis in FIG. 20(a), the fixing position of the first eccentricity detection sensor 15 needs to be P15'. In this way, the configuration of not making the drive axis of the moving stage 51 orthogonally intersect is also possible.

As another embodiment of the form of turning the fixing position of the first eccentricity detection sensor 15 to P15', a response speed of the control system of the X axis and a response speed of the control system of the Y axis are made different. Normally, for an XY stage, on a mechanism of one movable axis (assumed to be the X axis for the description), a mechanism of the other movable axis is loaded. Therefore, when the control system of the X axis and the control system of the Y axis are compared, weight of a drive part (for example, a stepping motor and a lead screw) of the Y axis is excessively applied to the control system of the X axis. By the weight, it is possible to perform design so that the response speed of the control system of the X axis becomes lower than the response speed of the control system of the Y axis. However, in this case, in addition to that mechanism design is limited, there is an aspect that the response speed of the X axis becomes slower than needed, so that the configuration of the embodiment 1 is suitable.

As a further embodiment of the form of turning the fixing position of the first eccentricity detection sensor 15 to P15', the X axis and the Y axis are not independently controlled in the eccentricity compensation circuit 40. From the output voltage of the first eccentricity detection sensor 15 and the output voltage of the second eccentricity detection sensor 16, the position of the geometrical center O of the mark M2 for eccentricity detection can be calculated by calculation. The calculation is performed in the eccentricity compensation circuit 40, and the X axis and the Y axis are controlled on the basis of the calculation amount. In the case of this configuration, the calculation is performed on the assumption that the mark M2 for eccentricity detection is a complete circle. As a result, there is an aspect that demanded accuracy of the circularity is raised and a manufacturing cost of the hologram recording medium 1 increases. Therefore, the configuration of the embodiment 1 is suitable.

As described above, for the configuration inside the eccentricity compensation circuit 40 and the arrangement of the eccentricity detection sensors that output signals to be inputted to the eccentricity compensation circuit 40, various modifications are conceivable.

The controllers in the embodiments above, the spindle controller 4202, the radial position controller 4402, the X axis compensator 4001, and the Y axis compensator 4003 in the embodiment 1 for example, can be configured by a digital filter for example. Since a gain and a phase are compensated by the digital filter, stability of the individual control systems is secured.

In the embodiments above, as a mechanism that performs the control so as to irradiate the predetermined position of the recording medium with the light beams emitted from the pickup 11 and the cure optical system 13, the hologram recording medium 1 is conveyed like the radial direction conveyance unit 52 in the embodiment 1 for example. However, the mechanism for controlling the irradiation position of the light beams is not limited thereto. For example, the configuration may be such that the hologram recording medium is fixed and the pickup 11 and the cure optical system 13 are conveyed. In this case, there is no need of using the radial direction conveyance unit 52, and the moving stage 51, the first eccentricity detection sensor 15, the second eccentricity detection sensor 16 and the rotation angle detection sensor 14 are fixed to a position-fixed member.

Recording by angle multiplexing is performed by changing the incident angle of the reference in the embodiments above, however, even in the case of using a multiplexing method other than the angle multiplexing, the present invention is similarly applicable. Further, even in the case of hologram recording not performing multiple recording, the present invention is similarly applicable.

The present invention is not limited to the above-described embodiments, and includes various modifications other than the modifications described above. For example, the above-described embodiments are described in detail in order to describe the present invention in an easy-to-understand manner, and are not necessarily limited to the ones including all the configurations described. Also, it is possible to replace part of the configuration of a certain embodiment with the configuration of another embodiment, and it is also possible to add the configuration of another embodiment to the configuration of a certain embodiment. Also, for part of the configuration of the individual embodiments, the addition/deletion/replacement of the other configuration can be performed.

Also, the individual configurations, functions, process units and process means or the like described above may be achieved by hardware by designing part or all of them by an integrated circuit or the like for example. Also, the individual configuration and functions or the like described above may be achieved by software by a processor interpreting and executing programs that achieve the respective functions. Information of programs, tables, files or the like that achieve the individual functions can be placed in a recorder such as a memory, a hard disk and an SSD (Solid State Drive) or a recording medium such as an IC card, an SD card and a DVD.

Also, control lines and information lines that are assumed to be needed for description are indicated, and all the control lines and information lines are not necessarily indicated for products. Actually, it may be considered that almost all the configurations are connected to each other.

REFERENCE SIGNS LIST

1 . . . hologram recording medium
10 . . . hologram recording and playback device
11 . . . pickup
14 . . . rotation angle detection sensor
15 . . . first eccentricity detection sensor
16 . . . second eccentricity detection sensor
17 . . . radial position detection sensor
20 . . . first incident angle signal generation circuit
21 . . . first incident angle control circuit
23 . . . second incident angle signal generation circuit
24 . . . second incident angle control circuit
26 . . . incident angle offset output circuit
27 . . . incident angle offset adder
28 . . . orthogonal incident angle signal generation circuit
29 . . . orthogonal incident angle control circuit
31 . . . incident angle error signal generation circuit
32 . . . first incident angle control circuit
33 . . . second incident angle control circuit
40 . . . eccentricity compensation circuit
42 . . . spindle control circuit
44 . . . radial direction conveyance control circuit
50 . . . spindle motor
51 . . . moving stage
52 . . . radial direction conveyance unit
80 . . . controller

The invention claimed is:

1. A hologram recording and playback device that emits signal light and reference light and records or plays back information to/from a hologram recording medium, the hologram recording and playback device comprising:
a medium rotation unit that rotates the hologram recording medium around a predetermined rotational axis;
a movement unit that is capable of moving a position of the medium rotation unit within a plane that is perpendicular to the rotational axis;
an orthogonal incident angle change unit that is capable of changing an orthogonal incident angle, at which the reference light is made incident on the hologram recording medium, to a direction orthogonal to an incident surface that includes an optical axis of the signal light and a normal line of the hologram recording medium;
a medium rotation control unit that controls the medium rotation unit so as to rotate the hologram recording medium;
an eccentricity compensation unit that performs positioning control of the movement unit;
an orthogonal incident angle control unit that controls the orthogonal incident angle change unit; and
an orthogonal incident angle calculation unit that calculates the orthogonal incident angle,
wherein, when the medium rotation control unit controls the medium rotation unit so as to rotate the hologram recording medium, subsequent to performing positioning control of the movement unit by the eccentricity compensation unit, the orthogonal incident angle control unit controls the orthogonal incident angle change unit so as to change the orthogonal incident angle of the reference light on the basis of a calculation result of the orthogonal incident angle calculation unit.

2. The hologram recording and playback device according to claim 1, further comprising a diffracted light intensity measurement unit that is capable of measuring an intensity of diffracted light diffracted from a hologram when playing back information, wherein the orthogonal incident angle calculation unit calculates the orthogonal incident angle at which the intensity of the diffracted light becomes highest, using a measurement result of the diffracted light intensity measurement unit.

3. The hologram recording and playback device according to claim 1, further comprising:

a diffracted light intensity measurement unit that is capable of measuring an intensity of diffracted light diffracted from a hologram when playing back information;

an incident angle change unit that is capable of changing an incident angle, at which the reference light is made incident on the hologram recording medium within the incident surface; and an incident angle control unit that controls the incident angle change unit, wherein, when the medium rotation control unit controls the medium rotation unit so as to rotate the hologram recording medium, subsequent to performing positioning control of the movement unit by the eccentricity compensation unit, the incident angle control unit shifts the incident angle by a predetermined offset to control the incident angle change unit, the orthogonal incident angle calculation unit calculates the orthogonal incident angle at which the intensity of the diffracted light becomes highest, using a measurement result of the diffracted light intensity measurement unit, and then an operation that the orthogonal incident angle control unit controls the orthogonal incident angle change unit to change the orthogonal incident angle of the reference light on the basis of a calculation result of the orthogonal incident angle calculation unit, and an operation that the incident angle control unit controls the incident angle change unit so as to cancel the predetermined offset given to the incident angle, are performed.

4. The hologram recording and playback device according to claim 1, further comprising a diffracted light intensity measurement unit that is capable of measuring an intensity of diffracted light diffracted from a hologram when playing back information, wherein the diffracted light intensity measurement unit is capable of measuring the intensity of the diffracted light, and is capable of detecting shift from an optical axis of a luminance gravity center of the diffracted light at the same time.

5. The hologram recording and playback device according to claim 1, further comprising a diffracted light intensity measurement unit that is capable of measuring an intensity of diffracted light diffracted from a hologram when playing back information, wherein, when the medium rotation control unit controls the medium rotation unit so as to rotate the hologram recording medium, subsequent to performing positioning control of the movement unit by the eccentricity compensation unit, the orthogonal incident angle control unit controls the orthogonal incident angle change unit to change the orthogonal incident angle of the reference light to a plurality of angles, the diffracted light intensity measurement unit measures the intensity of the diffracted light at the plurality of angles, and the orthogonal incident angle calculation unit calculates the orthogonal incident angle, using a measurement result of the intensity of the diffracted light at the plurality of angles.

6. The hologram recording and playback device according to claim 1, further comprising:

a diffracted light intensity measurement unit that is capable of measuring an intensity of diffracted light diffracted from a hologram when playing back information;

an incident angle change unit that is capable of changing an incident angle, at which the reference light is made incident on the hologram recording medium within the incident surface;

an incident angle control unit that controls the incident angle change unit; and an incident angle calculation unit that calculates the incident angle, wherein, when the medium rotation control unit controls the medium rotation unit so as to rotate the hologram recording medium, subsequent to performing positioning control of the movement unit by the eccentricity compensation unit, an operation that the orthogonal incident angle control unit controls the orthogonal incident angle change unit to change the orthogonal incident angle of the reference light on the basis of a calculation result of the orthogonal incident angle calculation unit, and an operation that the incident angle control unit controls the incident angle change unit to change the incident angle of the reference light on the basis of a calculation result of the incident angle calculation unit are performed.

7. The hologram recording and playback device according to claim 1, further comprising:

a diffracted light intensity measurement unit that is capable of measuring an intensity of diffracted light diffracted from a hologram when playing back information;

an incident angle change unit that is capable of changing an incident angle, at which the reference light is made incident on the hologram recording medium within the incident surface;

an incident angle control unit that controls the incident angle change unit; and an incident angle calculation unit that calculates the incident angle, wherein, when the medium rotation control unit controls the medium rotation unit so as to rotate the hologram recording medium, subsequent to performing positioning control of the movement unit by the eccentricity compensation unit, a first measurement operation that the orthogonal incident angle control unit controls the orthogonal incident angle change unit to change the orthogonal incident angle of the reference light to a plurality of angles, and measurement is performed by the diffracted light intensity measurement unit at the plurality of angles, an operation that the orthogonal incident angle calculation unit calculates the orthogonal incident angle using a result of the first measurement operation, an operation that the orthogonal incident angle control unit controls the orthogonal incident angle change unit to change the orthogonal incident angle of the reference light on the basis of a calculation result of the orthogonal incident angle calculation unit, a second measurement operation that the incident angle control unit controls the incident angle change unit to change the incident angle of the reference light to a plurality of angles, and measurement is performed by the diffracted light intensity measurement unit at the plurality of angles, an operation that the incident angle calculation unit calculates the incident angle using a result of the second measurement operation, and an operation that the incident angle control unit controls the incident angle change unit to change the incident angle of the reference light on the basis of a calculation result of the incident angle calculation unit, are performed.

8. The hologram recording and playback device according to claim 1, further comprising:

an incident angle shift detection unit that detects a shift amount of the incident angle of the reference light using diffracted light diffracted from a hologram when playing back information;

an incident angle change unit that is capable of changing an incident angle, at which the reference light is made incident on the hologram recording medium within the incident surface; and an incident angle control unit that controls the incident angle change unit, wherein the incident angle control unit performs control on the basis of output signals of the incident angle shift detection unit.

9. The hologram recording and playback device according to claim 1, further comprising:

a diffracted light intensity measurement unit that is capable of measuring an intensity of diffracted light diffracted from a hologram when playing back information;

an incident angle change unit that is capable of changing an incident angle, at which the reference light is made incident on the hologram recording medium within the incident surface;

an incident angle command value output unit that outputs a command value of the incident angle an incident angle offset output unit that outputs an incident angle offset to be added to the incident angle;

an adder that adds an output value of the incident angle command value output unit and an output value of the incident angle offset; and an incident angle control unit that controls the incident angle change unit so that an output value of the adder becomes a predetermined value, wherein, when the medium rotation control unit controls the medium rotation unit so as to rotate the hologram recording medium, subsequent to performing control of the movement unit by the eccentricity compensation unit, the incident angle offset output unit outputs a predetermined incident angle offset, the orthogonal incident angle calculation unit calculates the orthogonal incident angle at which the intensity of the diffracted light becomes highest, using a measurement result of the diffracted light intensity measurement unit, and then an operation that the orthogonal incident angle control unit controls the orthogonal incident angle change unit to change the orthogonal incident angle of the reference light on the basis of a calculation result of the orthogonal incident angle calculation unit, and an operation of turning the incident angle offset to zero are performed.

10. The hologram recording and playback device according to claim 1, wherein the eccentricity compensation unit and the medium rotation unit perform control so as to position an irradiation position of the signal light and the reference light at a position where influence of eccentricity of the hologram recording medium is corrected.

11. The hologram recording and playback device according to claim 1, further comprising:

a position detection unit that detects a position of the hologram recording medium using a mark for eccentricity detection provided on the hologram recording medium, wherein, the eccentricity compensation unit controls the movement unit on the basis of output signals of the position detection unit, and the eccentricity compensation unit and the medium rotation unit perform control so as to position an irradiation position of the signal light and the reference light with a geometrical center of the mark for eccentricity detection as a reference.

12. The hologram recording and playback device according to claim 1, further comprising:

a position detection unit that detects a position of the hologram recording medium using a mark for eccentricity detection provided on the hologram recording medium, wherein, the eccentricity compensation unit controls the movement unit on the basis of output signals of the position detection unit, the position detection unit is formed of at least two sensors, and the sensors output a value according to a relative positional relation with the mark for eccentricity detection.

13. The hologram recording and playback device according to claim 1, comprising:

a position detection unit that detects a position of the hologram recording medium using a mark for eccentricity detection provided on the hologram recording medium, wherein, the movement unit includes a first drive axis and a second drive axis, the position detection unit is formed of a first sensor and a second sensor, the first sensor and the second sensor output a value according to a relative positional relation with the mark for eccentricity detection, the first sensor is fixed to a predetermined member so as to be positioned on the first drive axis with a drive reference position of the movement unit as a reference, the second sensor is fixed to the predetermined member so as to be positioned on the second drive axis with the drive reference position of the movement unit as a reference, and the eccentricity compensation unit drives the first drive axis so that an output signal of the first sensor becomes a predetermined value, and drives the second drive axis so that an output signal of the second sensor becomes a predetermined value.

14. The recording and playback device according to claim 1, further comprising
- a position detection unit that detects a position of the hologram recording medium using a mark for eccentricity detection provided on the hologram recording medium,
- wherein the position detection unit performs detection by irradiating the hologram recording medium with light of a wavelength different from a wavelength of the reference light.

15. A hologram playback method in a hologram recording and playback device that emits signal light and reference light and records or plays back information to/from a hologram recording medium, including
- a medium rotation unit that rotates the hologram recording medium around a predetermined rotational axis,
- a movement unit that is capable of moving a position of the medium rotation unit within a plane that is perpendicular to the rotational axis,
- an orthogonal incident angle change unit that is capable of changing an orthogonal incident angle, at which the reference light is made incident on the hologram recording medium, to a direction orthogonal to an incident surface that includes an optical axis of the signal light and a normal line of the hologram recording medium,
- a medium rotation control unit that controls the medium rotation unit so as to rotate the hologram recording medium,
- an eccentricity compensation unit that performs positioning control of the movement unit,
- an orthogonal incident angle control unit that controls the orthogonal incident angle change unit, and
- an orthogonal incident angle calculation unit that calculates the orthogonal incident angle, and comprising:
- a step that the medium rotation control unit controls the medium rotation unit to rotate the hologram recording medium;
- a step that the positioning control of the movement unit is performed by the eccentricity compensation unit; and
- a step that the orthogonal incident angle control unit controls the orthogonal incident angle change unit to change the orthogonal incident angle of the reference light on the basis of a calculation result of the orthogonal incident angle calculation unit.

16. The hologram playback method according to claim 15, including
- a diffracted light intensity measurement unit that is capable of measuring intensity of diffracted light diffracted from a hologram when playing back information,
- an incident angle change unit that is capable of changing an incident angle, at which the reference light is made incident on the hologram recording medium within the incident surface, and
- an incident angle control unit that controls the incident angle change unit, and comprising:
- a step that the medium rotation control unit controls the medium rotation unit to rotate the hologram recording medium;
- a step that the positioning control of the movement unit is performed by the eccentricity compensation unit;
- a step that the incident angle control unit shifts the incident angle by a predetermined offset to control the incident angle change unit;
- a step that the orthogonal incident angle calculation unit calculates the orthogonal incident angle at which the intensity of the diffracted light becomes highest as the orthogonal incident angle, using a measurement result of the diffracted light intensity measurement unit;
- a step that the orthogonal incident angle control unit controls the orthogonal incident angle change unit to change the orthogonal incident angle of the reference light on the basis of a calculation result of the orthogonal incident angle calculation unit; and
- a step that the incident angle control unit controls the incident angle change unit so as to cancel the predetermined offset given to the incident angle.

* * * * *